US009083985B2

(12) United States Patent
Suzuki et al.

(10) Patent No.: US 9,083,985 B2
(45) Date of Patent: Jul. 14, 2015

(54) MOTION IMAGE ENCODING APPARATUS, MOTION IMAGE DECODING APPARATUS, MOTION IMAGE ENCODING METHOD, MOTION IMAGE DECODING METHOD, MOTION IMAGE ENCODING PROGRAM, AND MOTION IMAGE DECODING PROGRAM

(75) Inventors: Yoshinori Suzuki, Saitama (JP); Choong Seng Boon, Yokohama (JP); Mitsuru Kobayashi, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 165 days.

(21) Appl. No.: 13/357,191

(22) Filed: Jan. 24, 2012

(65) Prior Publication Data
US 2012/0121020 A1    May 17, 2012

Related U.S. Application Data

(62) Division of application No. 11/328,492, filed on Jan. 6, 2006, now Pat. No. 8,126,052.

(30) Foreign Application Priority Data

| Jan. 7, 2005 | (JP) | ................................. | 2005-002992 |
| Apr. 25, 2005 | (JP) | ................................. | 2005-126461 |
| Dec. 27, 2005 | (JP) | ................................. | 2005-375721 |

(51) Int. Cl.
*H04N 19/57* (2014.01)
*H04N 19/00* (2014.01)
(Continued)

(52) U.S. Cl.
CPC ............... *H04N 19/57* (2014.11); *H04N 19/00* (2013.01); *H04N 19/0009* (2013.01);
(Continued)

(58) Field of Classification Search
CPC ............ H04N 19/00; H04N 19/00684; H04N 19/0009; H04N 19/00569; H04N 19/00278; H04N 19/00775; H04N 19/57; H04N 19/56; H04N 19/52; H04N 19/176; H04N 19/119; H04N 19/61; H04N 19/11; H04N 19/132; H04N 19/33; H04N 19/53; H04N 19/523

USPC ............ 375/240.03, 240.11, 240.16, 240.01, 375/240.12, 240.18, 240.24–240.26; 382/236, 232, 233, 239, 250, 252
See application file for complete search history.

(56) References Cited

U.S. PATENT DOCUMENTS

| 7,359,558 B2 | 4/2008 | Klein Gunnewiek et al. |
| 2003/0112870 A1* | 6/2003 | Fukuda et al. ........... 375/240.12 |

(Continued)

FOREIGN PATENT DOCUMENTS

| JP | 2001-045475 A | 2/2001 |
| JP | 2002-354486 A | 12/2002 |

(Continued)

OTHER PUBLICATIONS

Sullivan, G. et al., "Text of ISO/IEC 14496 10 Advanced Video Coding 3$^{rd}$ Edition", ISO/IEC JTC 1/SC 29/WG 11N6540, Jul. 2004, 330 pages.

(Continued)

*Primary Examiner* — Daniel Washburn
*Assistant Examiner* — Eboni Hughes
(74) *Attorney, Agent, or Firm* — Brinks Gilson & Lione

(57) ABSTRACT

A motion image decoding apparatus for generating a prediction signal in blocks is provided with a low-resolution block decoder for generating a low-resolution block with a smaller number of pixels than that of a prediction block by decoding encoded data. The motion image decoding apparatus is further provided with an enhanced block generator for enhancing a low-resolution block generated by a decoded low-resolution block to a block with the same number of pixels as that of the prediction block using a decoded image. Furthermore, the motion image decoding apparatus is provided with a block divider for generating plural small blocks by dividing an enhanced block based on a predetermined division rule and a small block predictor for generating a predicted small block of a small block using a decoded image and the plural small blocks.

8 Claims, 38 Drawing Sheets

(51) Int. Cl.
*H04N 19/124* (2014.01)
*H04N 19/51* (2014.01)
*H04N 19/56* (2014.01)
*H04N 19/52* (2014.01)
*H04N 19/119* (2014.01)
*H04N 19/61* (2014.01)
*H04N 19/11* (2014.01)
*H04N 19/132* (2014.01)
*H04N 19/33* (2014.01)
*H04N 19/53* (2014.01)
*H04N 19/523* (2014.01)
*H04N 19/176* (2014.01)
*H04N 19/60* (2014.01)
*H04N 19/50* (2014.01)

(52) U.S. Cl.
CPC ........ *H04N 19/00684* (2013.01); *H04N 19/11* (2014.11); *H04N 19/119* (2014.11); *H04N 19/132* (2014.11); *H04N 19/176* (2014.11); *H04N 19/33* (2014.11); *H04N 19/52* (2014.11); *H04N 19/523* (2014.11); *H04N 19/53* (2014.11); *H04N 19/56* (2014.11); *H04N 19/61* (2014.11); *H04N 19/00278* (2013.01); *H04N 19/00569* (2013.01); *H04N 19/00775* (2013.01)

(56) References Cited

U.S. PATENT DOCUMENTS

| | | | |
|---|---|---|---|
| 2005/0175099 A1* | 8/2005 | Sarkijarvi et al. | 375/240.16 |
| 2006/0008008 A1* | 1/2006 | Song | 375/240.16 |
| 2006/0251330 A1 | 11/2006 | Toth et al. | |
| 2007/0025438 A1* | 2/2007 | Bruls | 375/240.1 |

FOREIGN PATENT DOCUMENTS

| | | | |
|---|---|---|---|
| JP | 2003-102005 A | | 4/2003 |
| WO | WO 03/036983 A2 | | 5/2003 |

OTHER PUBLICATIONS

Office Action from Japanese Application No. 2005-375721, dated Oct. 12, 2010, 6 pages. (with translation).

* cited by examiner

BLOCK PIXEL DISPOSITION

MOTION IMAGE ENCODING APPARATUS, MOTION IMAGE DECODING APPARATUS, MOTION IMAGE ENCODING METHOD, MOTION IMAGE DECODING METHOD, MOTION IMAGE ENCODING PROGRAM, AND MOTION IMAGE DECODING PROGRAM

This application is a divisional application of application Ser. No. 11/328,492 filed Jan. 6, 2006 now U.S. Pat. No. 8,126,052, which claims priority to JP2005-375721 filed Dec. 27, 2005, JP2005-126461 filed Apr. 25, 2005 and JP2005-002992 filed Jan. 7, 2005, the entire contents of which are incorporated herein by reference.

BACKGROUND OF THE INVENTION

1. Field of the Invention

The present invention relates to a motion image decoding technology and a motion image encoding technology for generating a prediction block in blocks.

2. Related Background Art

Conventionally, as an already existing encoding system for generating a prediction signal (a prediction block) of a target block to be predicted in blocks, for example, a technology described in Japanese Patent Laid-Open (Kokai) 2002-354486 is proposed. Such a technology reduces relative redundancy in the time direction by entropy encoding a motion vector indicating motion between frames and an error block between a prediction block and a target block to be predicted generated from the motion vector. Here, a target block to be predicted is a divided block of an input frame for which a predicting process is performed next.

SUMMARY OF THE INVENTION

In order to improve time prediction performance in an image region including representation of fine motions, information such as many motion vectors (hereinafter, referred to as "motion information") is required. In the above-mentioned conventional system, however, since encoding of motion information becomes necessary, the amount of code of so-called additional information including motion information increases. This constitutes a factor that makes it difficult to improve the processing efficiency in an encoding process and a decoding process.

Therefore, an object of the present invention is to improve the processing efficiency in an encoding and a decoding process by suppressing an increase in the amount of code of the additional information described above.

A motion image encoding apparatus according to the present invention is a motion image encoding apparatus for generating a prediction block in blocks, including: a storing means (memory) for storing a decoded image; a first dividing means for dividing an inputted target image to be encoded into plural target blocks to be predicted; a generating means for transforming the target block to be predicted into a low-resolution block with a smaller number of pixels than that of the target block to be predicted, encoding the low-resolution block and generating a decoded low-resolution block by decoding the encoded data of the low-resolution block; an enhancing means for enhancing the generated decoded low-resolution block to a block with the same number of pixels as that of the target block to be predicted; a second dividing means for generating plural small blocks by dividing the enhanced block based on a predetermined division rule; a predicting means for generating a predicted small block of the small block using the decoded image and the generated small block; and a combining means for generating a generated block by combining the generated plural predicted small blocks based on the division rule.

A motion image decoding apparatus according to the present invention is a motion image decoding apparatus for generating a prediction block in blocks, including: a storing means (for example, memory) for storing a decoded image; a decoding means for generating a low-resolution block with a smaller number of pixels than that of a prediction block by decoding inputted encoded data; an enhancing means for enhancing the generated low-resolution block to a block with the same number of pixels as that of the prediction block; a dividing means for generating plural small blocks by dividing the enhanced block based on a predetermined division rule; a predicting means for generating a predicted small block of the small block using the decoded image and the divided small block; and a combining means for generating a prediction block by combining the generated plural predicted small blocks based on the division rule.

In order to perform highly precise prediction encoding between a motion image encoding apparatus and a motion image decoding apparatus, it is preferable to compress and encode a low-resolution block with a smaller number of pixels than that of a prediction block in the motion image encoding apparatus and transmit the encoded data to the motion image decoding apparatus. As to this point, according to the present invention, since the number of pixels of the low-resolution block is smaller than that of the prediction block, the compressed low-resolution block includes smaller amount of code of additional information than that of the conventional motion information. Due to this, an increase in the amount of code of additional information is suppressed and as a result, the processing efficiency in the encoding process and decoding process is improved.

Particularly, in a motion image decoding apparatus, first, an enhanced block is divided to obtain small blocks and a predicted small block is generated from the small block and a decoded image. Due to this, plural predicted small blocks capable of performing highly precise prediction of a region with fine motion images. Then, by combining these, a prediction block is generated. Therefore, it is made possible to perform highly precise prediction by utilizing the low-resolution block with a small amount of code and to improve the above-mentioned processing efficiency.

It is preferable for the above-mentioned motion image encoding apparatus to further include: a third dividing means for dividing the target image to be encoded into target blocks to be encoded; a subtracting means for generating an error block by making subtraction between the divided target block to be encoded and the prediction block in pixels; an encoding means for encoding the generated error block; a decoding means for generating a decoded error block by decoding the encoded data; and an outputting means for generating a decoded block by adding the prediction block and the decoded error block in pixels and outputting the decoded block to the storing means.

Further, in the motion image encoding apparatus, it is preferable for the enhancing means to generate a block with the same number of pixels as that of a target block to be predicted using the pixels of the generated decoded low-resolution block and the pixels of decoded blocks adjacent to the upper side and the left side of the target block to be predicted.

Moreover, in the motion image encoding apparatus, it is preferable: for the generating means to be configured so as to have: a means for transforming the target block to be predicted into a low-resolution target block to be predicted with a smaller number of pixels than that of the target block to be predicted based on a predetermined transformation rule; a low-resolution prediction block generating means for generating a low-resolution prediction block; a means for generating a low-resolution error block by making subtraction between the low-resolution target block to be predicted and the low-resolution prediction block in pixels; a means for encoding the low-resolution error block and generating a decoded low-resolution error block by decoding the encoded data of the low-resolution error block; and a means for decoding the low-resolution block by adding the decoded low-resolution error block to the low-resolution prediction block in pixels; for the low-resolution prediction block generating means to be configured so as to have: a means for generating a second prediction block with the same number of pixels as that of the prediction block; and a means for generating the low-resolution prediction block from the second prediction block based on the transformation rule; and for the generating means to be configured so as to further have a means for outputting the second prediction block as the prediction block when all of the pixel difference values in the low-resolution error block are zero.

It is preferable for the motion image decoding apparatus described above to further have: a generating means for generating an error block by decoding the encoded data; and an outputting means for generating a decoded block by adding the prediction block and the error block in pixels and outputting the decoded block to the storing means.

Moreover, in the motion image decoding apparatus, it is preferable for the enhancing means to generate a block with the same number of pixels as that of a prediction block using the pixels of the generated low-resolution block and the pixels of decoded blocks adjacent to the upper side and the left side of the prediction block.

Furthermore, in the motion image decoding apparatus, it is preferable: for the decoding means to be configured so as to have: a means for decoding a low-resolution error block by decoding the encoded data; a low-resolution prediction block generating means for generating a low-resolution prediction block; and a means for generating the low-resolution block by adding the low-resolution error block to the low-resolution prediction block in pixels; for the low-resolution prediction block generating means to be configured so as to have: a means for generating a second prediction block with the same number of pixels as that of the prediction block; and a means for generating the low-resolution prediction block from the second prediction block based on a predetermined rule; and for the decoding means to be configured so as to further include a means for outputting the second prediction block as the prediction block when all of the pixel difference values in the low-resolution error block are zero.

Further, the motion image encoding/decoding technology according to the present invention can adopt a form of method or program, in addition to apparatus, and a motion image encoding method, a motion image decoding method, a motion image encoding program, and a motion image decoding program, the characteristics of which are explained below, exert the same effects as those of the motion image encoding apparatus and motion image decoding apparatus described above.

In other words, the motion image encoding method according to the present invention is a motion image encoding method for generating a prediction block using a decoded image in blocks, including: a first dividing step for dividing an inputted target image to be encoded into plural target blocks to be predicted; a generating step for transforming the target block to be predicted into a low-resolution block with a smaller number of pixels than that of the target block to be predicted, and encoding the low-resolution block and generating a decoded low-resolution block by decoding the encoded data of the low-resolution block; an enhancing step for enhancing the generated decoded low-resolution block to a block with the same number of pixels as that of the target block to be predicted using the decoded image; a second dividing step for generating plural small blocks by dividing the enhanced block based on a predetermined division rule; a predicting step for generating a predicted small block of the small block using the decoded image and the generated small block; and a combining step for generating a prediction block by combining the generated plural predicted small blocks based on the division rule.

The motion image decoding method according to the present invention is a motion image decoding method for generating a prediction block using a decoded image in blocks, including: a decoding step for generating a low-resolution block with a smaller number of pixels than that of a prediction block by decoding encoded data; an enhancing step for enhancing the generated low-resolution block to a block with the same number of pixels as that of the prediction block using the decoded image; a dividing step for generating plural small blocks by dividing the enhanced block based on a predetermined division rule; a predicting step for generating a predicted small block of the small block using the decoded image and the divided small block; and a combining step for generating a prediction block by combining the generated plural predicted small blocks based on the division rule.

Further, the motion image encoding program according to the present invention causes a computer provided with a storing means for storing a decoded image and a motion image encoding program having a function of generating a prediction block in blocks to perform: a first dividing process for dividing a target image to be encoded into plural target blocks to be predicted; a generating process for transforming the target block to be predicted into a low-resolution block with a smaller number of pixels than that of the target block to be predicted, encoding the low-resolution block and generating a decoded low-resolution block by decoding the encoded data of the low-resolution block; an enhancing process for enhancing the generated decoded low-resolution block to a block with the same number of pixels as that of the target block to be predicted using the decoded image; a second dividing process for generating plural small blocks by dividing the enhanced block based on a predetermined division rule; a predicting process for generating a predicted small block of the small block using the decoded image and the generated small block; and a combining process for generating a prediction block by combining the generated plural predicted small blocks based on the division rule.

The motion image decoding program according to the present invention causes a computer provided with a storing means for storing a decoded image and a motion image decoding program having a function of generating a prediction block in blocks to perform: a decoding process for generating a low-resolution block with a smaller number of pixels than that of a prediction block by decoding encoded data; an enhancing process for enhancing the generated low-resolution block to a block with the same number of pixels as that of the prediction block using the decoded image; a dividing process for generating plural small blocks by dividing the enhanced block based on a predetermined division rule; a predicting process for generating a predicted small block of the small block using the decoded image and the divided small block; and a combining process for generating a prediction block by combining the generated plural predicted small blocks based on the division rule.

In order to achieve the above-mentioned objects, the motion image decoding apparatus according to the present invention is a motion image decoding apparatus for generating a prediction block by decoding target encoded data to be decoded in predetermined blocks, including: a storing means for storing a decoded image; an entropy decoding means for generating low-resolution block information, which is an encoded low-resolution block having a smaller number of pixels than that of the decoded block and having temporally and spatially the same position as that of the decoded block, by entropy decoding inputted encoded data; a low-resolution block decoding means for decoding the low-resolution block information generated by the entropy decoding means and generating the low-resolution block while referring to the decoded image; a low-resolution block dividing means for generating plural low-resolution divided blocks by dividing the low-resolution block generated by the low-resolution block decoding means based on a predetermined division rule; a predicted small block generating means for generating a predicted small block having a larger number of pixels than that of the low-resolution divided block and having temporally and spatially the same position as that of the low-resolution divided block using the decoded image stored by the storing means and the low-resolution divided block generated by the low-resolution block dividing means; and a block combining means for generating a prediction block by combining the predicted small blocks generated by the predicted small block generating means based on a predetermined combination rule in accordance with the division rule.

In order to achieve the above-mentioned objects, the motion image encoding apparatus according to the present invention is a motion image encoding apparatus for generating a prediction block by encoding a target image to be encoded in predetermined blocks, including: a storing means for storing a decoded image; a coding block dividing means for dividing an inputted image into plural target blocks to be encoded; a decoded low-resolution block generating means for generating low-resolution block information upon encoding a low-resolution block having a smaller number of pixels than that of the target block to be encoded divided by the coding block dividing means and having temporally and spatially the same position as that of the target block to be encoded, decoding the low-resolution block information, and generating a decoded low-resolution block upon referring to the decoded image; a low-resolution block dividing means for generating plural low-resolution divided block blocks by dividing the decoded low-resolution block generated by the decoded low-resolution block generating means based on a predetermined division rule; a predicted small block generating means for generating a predicted small block having a larger number of pixels than that of the low-resolution divided block and having temporally and spatially the same position as that of the low-resolution divided block from the decoded image stored by the storing means and the low-resolution divided block generated by the low-resolution block dividing means; and a block combining means for generating a prediction block by combining the predicted small blocks generated by the predicted small block generating means based on a predetermined combination rule in accordance with the division rule.

In order to perform highly precise prediction encoding between a motion image encoding apparatus and a motion image decoding apparatus, it is preferable to entropy encode low-resolution block information, which is a compressed and encoded low-resolution block with a smaller number of pixels than that of a target block to be encoded, in the motion image encoding apparatus and transmit it to the motion image decoding apparatus. Since a low-resolution block has a smaller number of pixels than that of a target block to be encoded and a low-resolution block information has a smaller amount of code of additional information than that of conventional prediction information required for prediction of a target block to be encoded, it is possible to avoid an increase in the amount of code of additional information and to improve processing efficiency.

Further, in the motion image decoding apparatus, it is preferable to generate a prediction block by: decoding a low-resolution block from a low-resolution block information; dividing the obtained low-resolution block into plural low-resolution divided blocks; generating a predicted small block with a larger number of pixels than that of the low-resolution divided block and having temporally and spatially the same position as that of the low-resolution divided block from each low-resolution divided block and the decoded image; and combining the predicted small blocks. In this case, it is possible to generate a prediction block by: obtaining a low-resolution divided block by further dividing a low-resolution block; obtaining a predicted small block capable of performing highly precise prediction of a region with fine motion images by generating a predicted small block from the low-resolution divided block and a decoded image; and combining the predicted small blocks. In other words, it is possible to perform highly precise prediction and to improve processing efficiency while using low-resolution block information with a small amount of code.

In the motion image decoding apparatus according to the present invention, it is preferable for the entropy decoding means to further generate error block information included in the encoded data and indicating an error between a target block to be encoded and a prediction block by entropy decoding the encoded data; and for the motion image decoding apparatus to further include: an error block decoding means for generating an error block by decoding the error block information generated by the entropy decoding means; and a decoded block generating means for generating a decoded block based on the prediction block generated by the block combining means and the error block generated by the error block decoding means.

It is preferable for the motion image encoding apparatus according to the present invention to further include: an error block generating means for generating an error block indicating an error between the coding block divided by the coding block dividing means and the prediction block generated by the block combining means in pixels; an error block encoding means for generating error block information by encoding the error block generated by the error block generating means; an error block decoding means for generating a decoded error block by decoding the error block information generated by the error block encoding means; and a decoded block generating means for generating a decoded block based on the prediction block generated by the block combining means and the decoded error block generated by the error block decoding means.

It is preferable for the motion image encoding apparatus according to the present invention to further include an entropy encoding means for entropy encoding the low-resolution block information generated by the decoded low-resolution block generating means and the error block information generated by the error block encoding means.

Incidentally, the present invention can be regarded as a motion image decoding method, a motion image encoding method, a motion image decoding program, and a motion image encoding program and can be described as follows. These exert the same effects as those of the motion image decoding apparatus and the motion image encoding apparatus described above.

The motion image decoding method according to the present invention is a motion image decoding method for a motion image decoding apparatus having a storing means for storing a decoded image and generating a prediction block by decoding target encoded data to be decoded in predetermined blocks, including: an entropy decoding process for generating low-resolution block information, which is an encoded low-resolution block having a smaller number of pixels than that of the decoded block and having temporally and spatially the same position as that of the decoded block, by entropy decoding inputted encoded data to be decoded; a low-resolution block decoding process for decoding the low-resolution block information generated in the entropy decoding process and generating the low-resolution block while referring to the decoded image; a low-resolution block dividing process for generating plural low-resolution divided blocks by dividing the low-resolution block generated in the low-resolution block decoding process based on a predetermined division rule; a predicted small block generating process for generating a predicted small block with a larger number of pixels than that of the low-resolution divided block and having temporally and spatially the same position as that of the low-resolution divided block using the decoded image stored by the storing means and the low-resolution divided block generated in the low-resolution block dividing process; and a block combining process for generating a prediction block by combining the predicted small blocks generated in the predicted small block generating process based on a predetermined combination rule in accordance with the division rule.

The motion image encoding method according to the present invention is a motion image encoding method for a motion image encoding apparatus having a storing means for storing a decoded image and generating a prediction block by encoding a target image to be encoded in predetermined blocks, including: a coding block dividing process for dividing a target image to be encoded into plural target blocks to be encoded; a decoded low-resolution block generating process for generating low-resolution block information upon encoding a low-resolution block having a smaller number of pixels than that of the target block to be encoded divided in the coding block dividing process and having temporally and spatially the same position as that of the target block to be encoded, decoding the low-resolution block information, and generating a decoded low-resolution block upon referring to the decoded image; a low-resolution block dividing process for generating plural low-resolution divided blocks by dividing the decoded low-resolution block generated in the decoded low-resolution block generating process based on a predetermined division rule; a predicted small block generating process for generating a predicted small block having a larger number of pixels than that of the low-resolution divided block and having temporally and spatially the same position as that of the low-resolution divided block using the decoded image stored by the storing means and the low-resolution divided block generated in the low-resolution block dividing process; and a block combining process for generating a prediction block by combining the predicted small blocks generated in the predicted small block generating process based on a predetermined combination rule in accordance with the division rule.

The motion image decoding program according to the present invention causes a computer provided in a motion image decoding apparatus having a storing means for storing a decoded image and generating a prediction block by decoding target encoded data to be decoded in predetermined blocks to function as: an entropy decoding means for generating low-resolution block information, which is an encoded low-resolution block having a smaller number of pixels than that of the decoded block and having temporally and spatially the same position as that of the decoded block, by entropy decoding inputted encoded data to be decoded; a low-resolution block decoding means for decoding the low-resolution block information generated by the entropy decoding means and generating the low-resolution block while referring to the decoded image; a low-resolution block dividing means for generating plural low-resolution divided blocks by dividing the low-resolution block generated by the low-resolution block decoding means based on a predetermined division rule; a predicted small block generating means for generating a predicted small block having a larger number of pixels than that of the low-resolution divided block and having temporally and spatially the same position as that of the low-resolution divided block using the decoded image stored by the storing means and the low-resolution divided block generated by the low-resolution block dividing means; and a block combining means for generating a prediction block by combining the predicted small blocks generated by the predicted small block generating means based on a predetermined combination rule in accordance with the division rule.

The motion image encoding program according to the present invention causes a computer provided in a motion image encoding apparatus having a storing means for storing a decoded image and generating a prediction block by encoding a target image to be encoded in predetermined blocks to function as: a coding block dividing means for dividing an inputted image to be encoded into plural target blocks to be encoded; a decoded low-resolution block generating means for generating low-resolution block information upon encoding a low-resolution block having a smaller number of pixels than that of the target block to be encoded divided by the coding block dividing means and having temporally and spatially the same position as that of the target block to be encoded, decoding the low-resolution block information, and generating a decoded low-resolution block upon referring to the decoded image; a low-resolution block dividing means for generating plural low-resolution divided blocks by dividing the decoded low-resolution block generated by the decoded low-resolution block generating means based on a predetermined division rule; a predicted small block generating means for generating a predicted small block having a larger number of pixels than that of the low-resolution divided block and having temporally and spatially the same position as that of the low-resolution divided block using the decoded image stored by the storing means and the low-resolution divided block generated by the low-resolution block dividing means; and a block combining means for generating a prediction block by combining the predicted small blocks generated by the predicted small block generating means based on a predetermined combination rule in accordance with the division rule.

According to the present invention, it is possible to improve processing efficiency in an encoding and decoding process because an increase in the amount of code of additional information is suppressed.

DESCRIPTION OF THE PREFERRED EMBODIMENTS

First Embodiment

Figure 1:
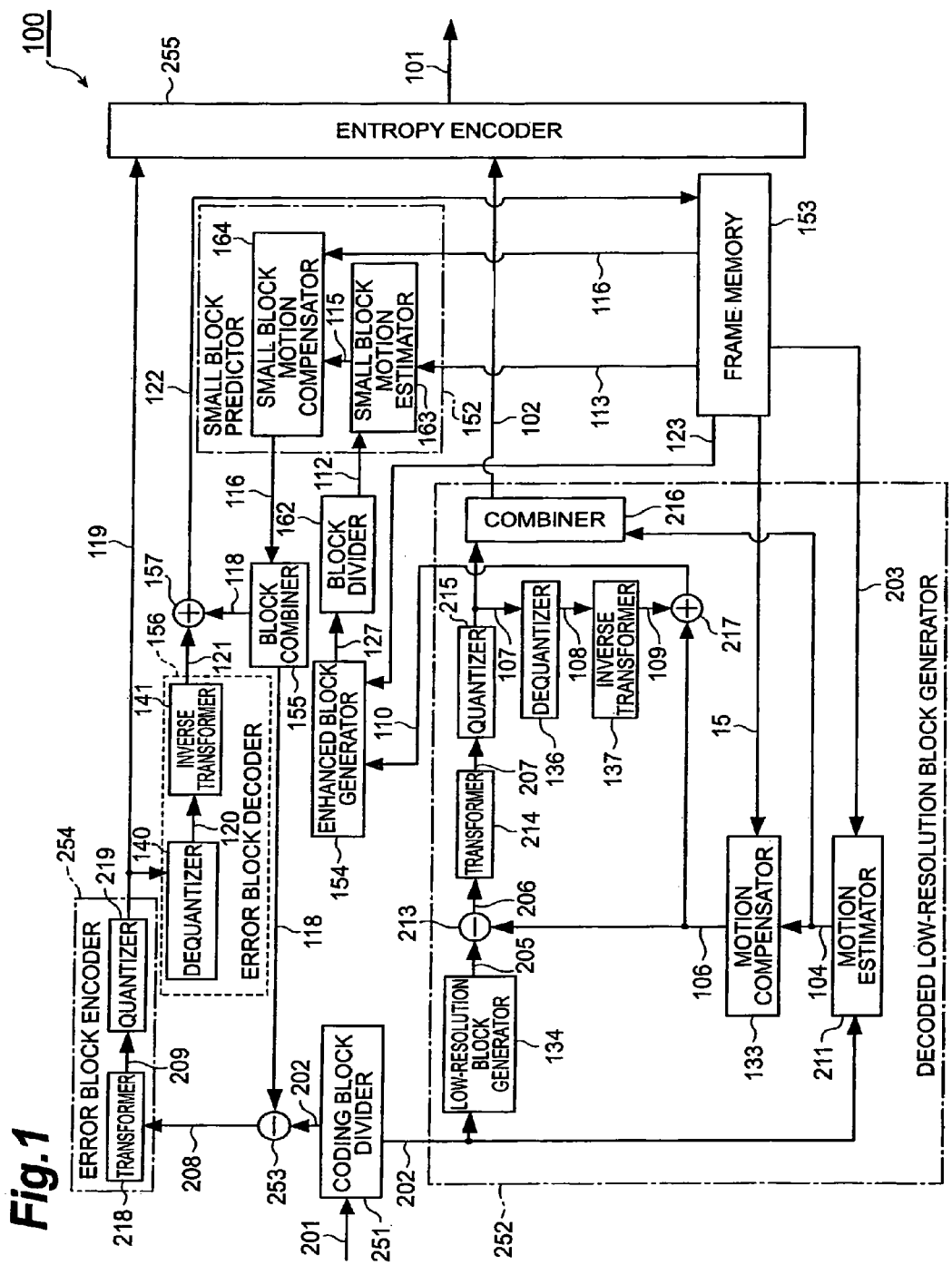
FIG. 1 is a view showing a configuration of a motion image encoding apparatus according to a first embodiment.
Figure 2:
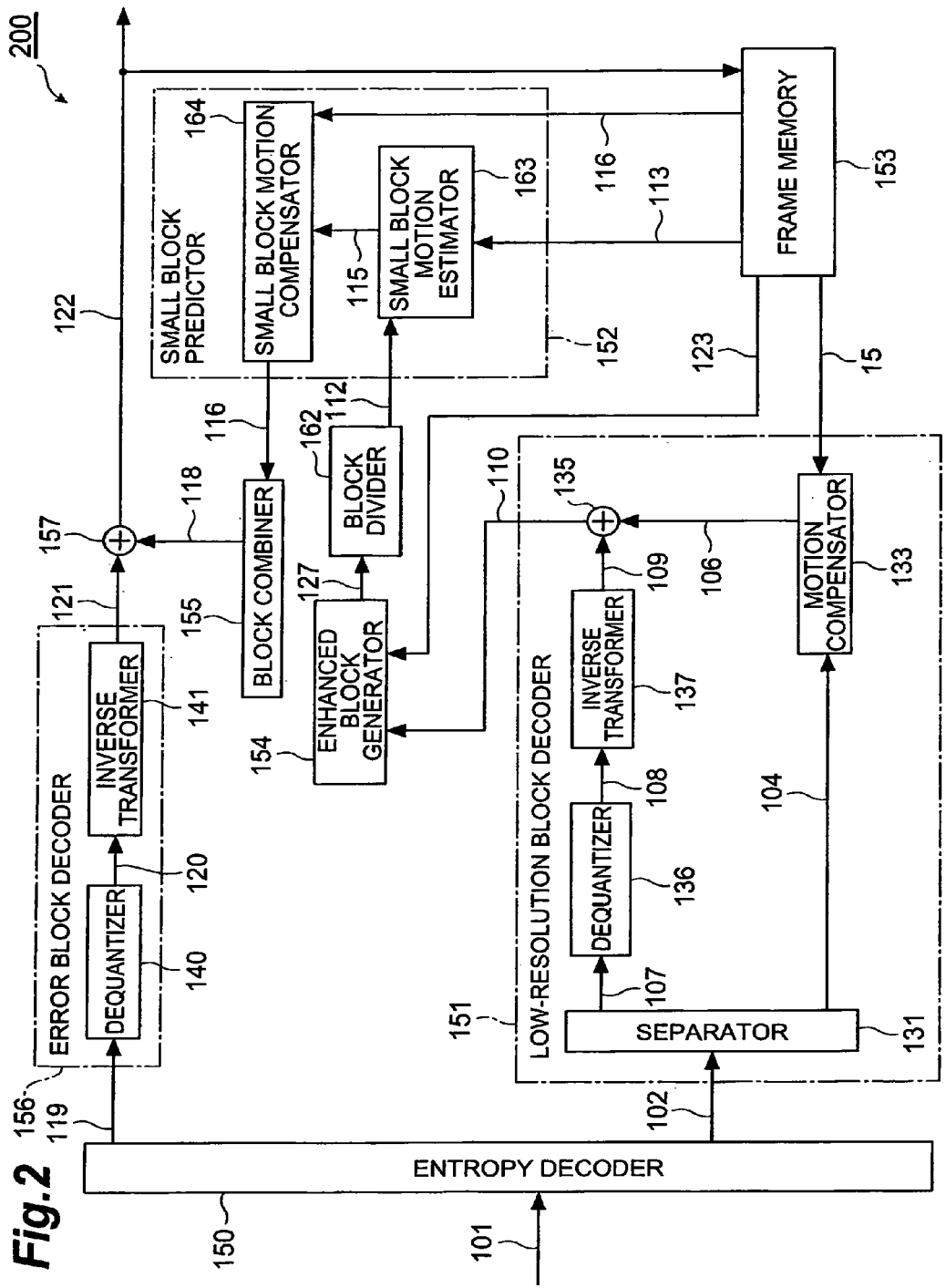
FIG. 2 is a view showing a configuration of a motion image decoding apparatus according to the first embodiment.

Hereinafter, a first embodiment of the present invention will be described with reference to the accompanying drawings. FIG. 1 is a view showing a configuration of a motion image encoding apparatus (hereinafter, simply referred to as "encoding apparatus 100") capable of realizing prediction encoding according to the present invention. Likewise, FIG. 2 is a view showing the configuration of a motion image decoding apparatus (hereinafter, simply referred to as "decoding apparatus 200") realizing prediction decoding according to the present invention. The respective apparatus's components are connected such that mutual input/output signals are possible via a bus. Further, in FIGS. 1 and 2, the components with the same function have the same reference numeral.

First, referring to FIG. 1, the configuration of the encoding apparatus will be described. The encoding apparatus 100 divides an input frame 201 into 16×16 pixels of target blocks to be encoded (target blocks to be predicted) 202 with a coding block divider 251. Also the encoding apparatus 100 predicts and encodes plural target blocks to be encoded (target blocks to be predicted) 202 obtained by dividing the input frame 201 in a raster scan order.

Here, by the term "target block to be predicted" is meant a block being the next target to be predicted in the blocks obtained by dividing the input frame 201. By the term "target block to be encoded" is meant a block being the next target to be encoded in the blocks obtained by dividing the input frame 201. In the present embodiment, in order that the size of the target block of predicting process and the target block of encoding process are identical to each other, the target block to be predicted and the target block to be encoded should agree with each other. In addition, by the term "prediction block" is meant a block being generated through the predicting process from previously decoded pixels.

First, the target block to be encoded (target block to be predicted) 202 is input to a decoded low-resolution block generator 252. The decoded low-resolution block generator 252 generates a decoded low-resolution block 110 with a smaller number of pixels than that of the target block to be predicted 202, and low-resolution block information 102. The target block to be predicted 202 is input to a motion estimator 211', in a raster scan order. The motion estimator 211 performs block matching between the target block to be predicted 202 and plural candidate prediction blocks 203 extracted from previously decoded frames stored in a frame memory 153 to detect a motion vector 104 for predicting low-resolution block.

Figure 3:
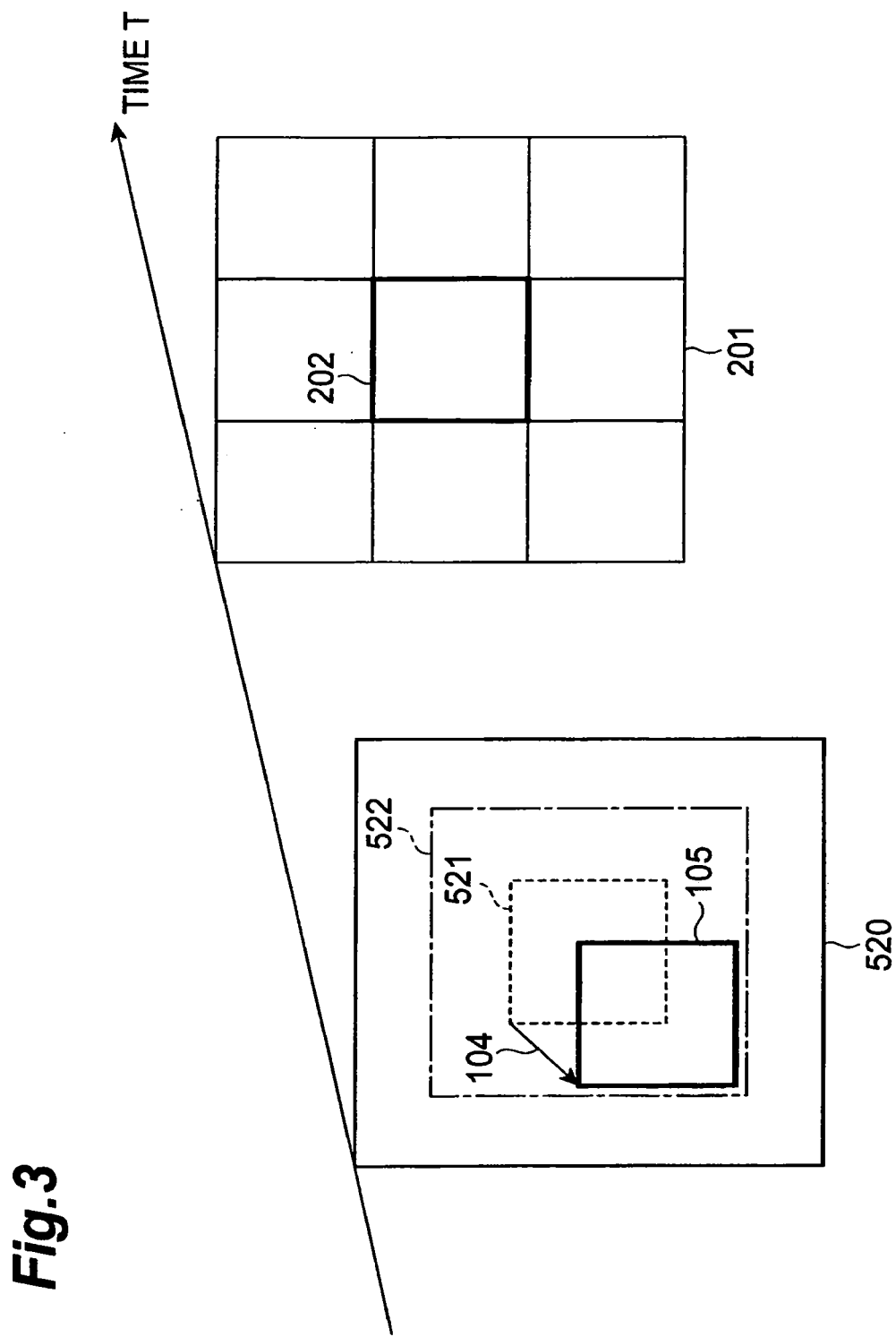
FIG. 3 is a view illustrating a block matching.

Here, referring to FIG. 3, the block matching will be described. The block matching is a technology for detecting a motion vector of a target block to be predicted. In the block matching, the motion estimator 211 sets a search range 522 on a decoded frame 520, which is previously decoded, and searches within the search range. Next, there is detected a position of a block 105 having a minimum estimated difference value from the target block to be predicted 202. Then, on the decoded frame, a shift amount from a virtual block 521 at the spatially same position as the target block to be predicted 202 to the detected block 105 is taken to as the motion vector 104. Note that it is possible to apply sum of absolute difference values of pixels corresponding between a target block to be detected and a target block to be encoded, and a value in which the sum of absolute difference values is added with a corresponding value encoding amount of the motion vector, and the like as the estimated difference value.

Figure 4:
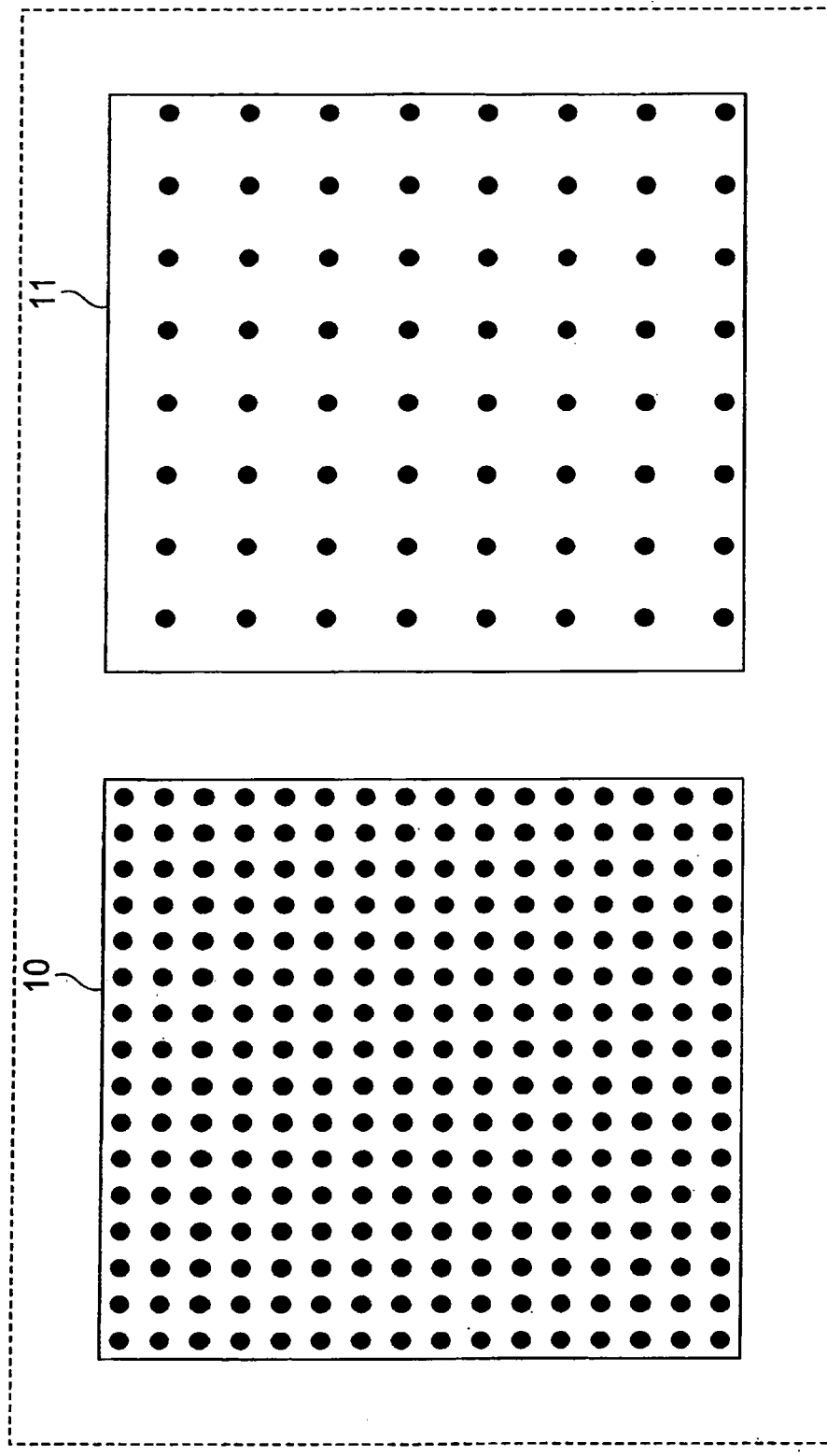
FIG. 4 is a view illustrating a low-resolution block generating process.

A motion compensator 133 generates a low-resolution prediction block 106 corresponding to the motion vector 104 for predicting low-resolution block. To be concrete, pixels corresponding to a block of 8×8 pixels are obtained from the previously decoded frame 520 stored in the frame memory 153 based on the motion vector 104 for predicting low-resolution block and are taken to as the low-resolution prediction block 106. FIG. 4 shows correspondence relationship between a block 10 of 16×16 pixels size and a low-resolution block 11 of 8×8 pixels size. As shown in FIG. 4, the low-resolution block 11 of 8×8 pixels size is a block in which pixels are extracted from the block 10 of 16×16 pixels size every other one line interval in vertical and horizontal directions.

There is an effect that, by generating the low-resolution block according to pixel extraction, the prediction performance of small block predicting process, which will be described later, is improved. That is, since each pixel in the low-resolution block keeps high frequency component, when detecting motion, the encoding apparatus 100 can easily find detailed characteristics. As a result, prediction performance is improved.

With respect to the target block to be encoded (target block to be predicted) 202, which is also transformed into a low-resolution target block to be encoded (low-resolution target block to be predicted) 205 with a smaller number of pixels than that of the target block to be encoded 202, depending on a low-resolution block generator 134 in accordance with the rule shown in FIG. 4. A subtracter 213 subtracts the pixels of the low-resolution prediction block 106 from those of the low-resolution target block to be encoded (low-resolution target block to be predicted) 205 to generate a low-resolution error block 206.

A transformer 214 divides the low-resolution error block 206 into four 4×4 blocks, and then performs a 4×4 discrete cosine transform (DCT) on each of the 4×4 blocks. And then, there are generated transformation coefficients 207 in terms of each of the 16 low-resolution error blocks. A quantizer 215 quantizes the transformation coefficients 207 to generate quantized transformation coefficients 107 for the low-resolution error block. A combiner 216 combines the motion vector 104 and the quantized transformation coefficients 107 for the low-resolution error block and outputs the same to an entropy encoder 255 as the low-resolution block information 102.

A dequantizer 136 dequantizes the quantized transformation coefficients 107 to generate dequantized transformation coefficients 108 for the low-resolution error block. An inverse transformer 137 performs an inverse DCT transformation on the dequantized transformation coefficients 108 to generate a decoded low-resolution error block 109. An adder 217 adds the pixels of the low-resolution prediction block 106 to those of the decoded low-resolution error block 109 to generate the decoded low-resolution block 110.

Figure 5:
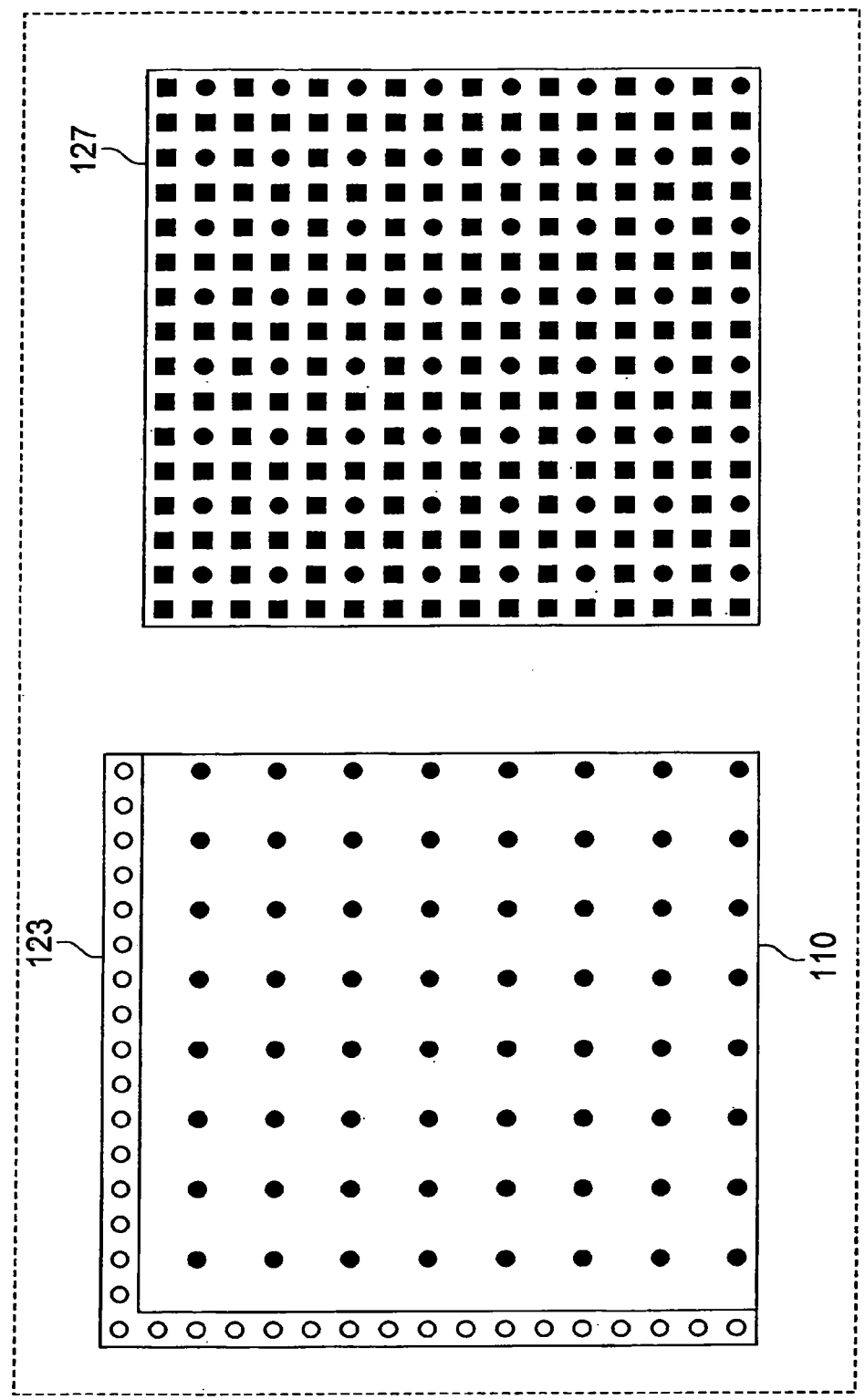
FIG. 5 is a first view illustrating an enhanced block generating process.

An enhanced block generator 154 enhances the decoded low-resolution block 110 to an enhanced block 127 shown in FIG. 5. That is, the enhanced block generator 154 obtains decoded pixels in the blocks adjacent to the upper side and the left side of the position of a block being the present target to be predicted from the decoded pixels of the current frame stored in the frame memory 153 as a boundary decoded pixel group 123, and allocates the pixels around the decoded low-resolution block 110 as shown in FIG. 5.

Figure 6:
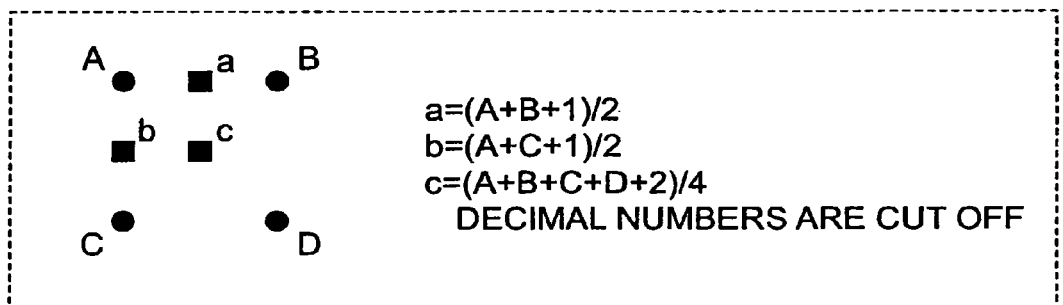
FIG. 6 is a second view illustrating an enhanced block generating process.

Succeedingly, the enhanced block generator 154 calculates an interpolation value of pixels indicated with black squares according to interpolative calculation process shown in FIG. 6 to generate the enhanced block 127. According to this processing, the decoded low-resolution block 110 of 8×8 block size is enhanced to the enhanced block 127 of the same block size (16×16) as that of a prediction block generated with the later described predicting process. Note that in the case that a target block to be predicted is a block on the edge of the current frame, since there is no adjacent block, the enhanced block generator 154 cannot obtain the boundary decoded pixel group 123. In this case, boundary pixels of the decoded low-resolution block 110 are used instead of the boundary decoded pixel group 123.

Figure 7:
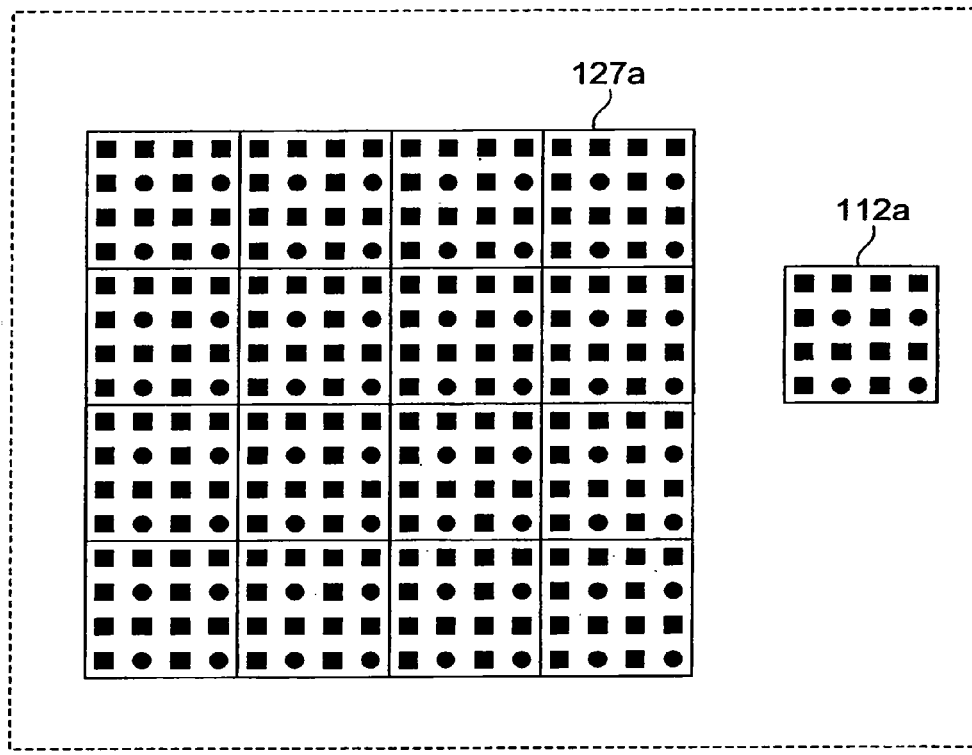
FIG. 7 is a view illustrating 4×4 division of an enhanced block.

A block divider 162 divides the enhanced block 127 into sixteen 4×4 small blocks 112a as shown in a block 127a of FIG. 7. Further, the block divider 162 divides the enhanced block 127 into sixty-four 2×2 small blocks 112b as shown in a block 127b of FIG. 8. Each of the divided small blocks is sequentially input to a small block predictor 152 as a set of one 4×4 small blocks 112a and four 2×2 small blocks 112b located at the spatially identical position thereof.

The small block predictor 152 is composed of a small block motion estimator 163 detecting a motion vector 115 of a small block 112 according to the block matching and a small block motion compensator 164 generating a predicted small block 116 of the small block 112 using the detected small block motion vector 115. In the present embodiment, the small block predictor 152 generates predicted small blocks 116b of respective 2×2 small blocks 112b using these functions.

Figure 9:
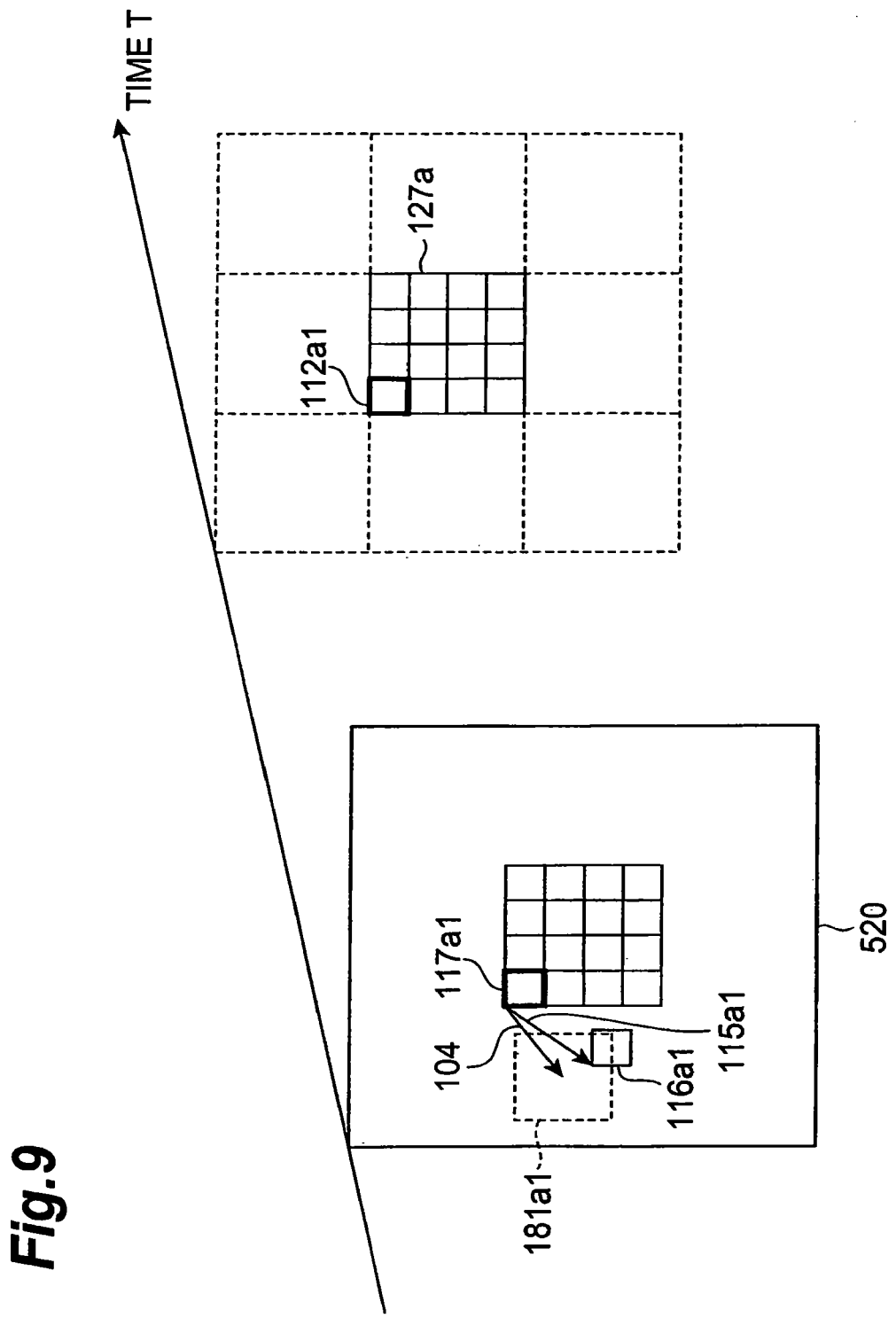
FIG. 9 is a view illustrating a 4×4 small block motion estimating process.

More specifically:

(1) The small block motion estimator 163 performs a motion vector detecting process of the 4×4 small blocks. Here, the function of the small block predictor 152 will be described particularly in terms of a block 112a1 located at the left-upper end shown in FIG. 9 among 16 of 4×4 small blocks 112a. The other 15 of 4×4 small blocks are processed in the same manner except the point that the spatial position of the block is different from each other. FIG. 9 is a view illustrating a detecting method of a motion vector 115a1 of the 4×4 small block 112a1 positioned at the left-upper end in the 16-divided 4×4 small blocks. When the 4×4 small blocks 112a are input to the small block motion estimator 163, the small block motion estimator 163 sets a search range 181a1 on the previously decoded frame 520 (stored in frame memory 153). Succeedingly, the small block motion estimator 163 performs a search within the search range in accordance with a predetermined rule and detects a position of a 4×4 small blocks 116a1 in which a estimated difference value on the 4×4 small blocks 112a1 (sum of absolute difference values of the pixels within the small block) becomes minimum, and it is taken to as the 4×4 predicted small blocks 116a1. Then, the small block motion estimator 163 determines that the shift amount between the 4×4 blocks 117a1 on the decoded frame 520 located at the same spatial position as the 4×4 small block 112a1, and the detected 4×4 predicted small blocks 116a1 is taken to as the motion vector 115a1 of the 4×4 small blocks 112a1.

Incidentally, the search range 181a1 has a predetermined size, and is set to a position around the motion vector 104 for predicting low-resolution block, which has been used for generating the low-resolution prediction block. The reason is that the motion vector of the 4×4 small blocks to be detected has a high possibility to be close to the motion vector 104 for predicting low-resolution block; and has such effects that search accuracy is improved and the search range can be set small in size. Therefore, the center point of the search range of sixteen 4×4 small blocks belonging to the same target block to be encoded also is set to a position indicated by the motion vector 104 for predicting low-resolution block.

Figure 10:
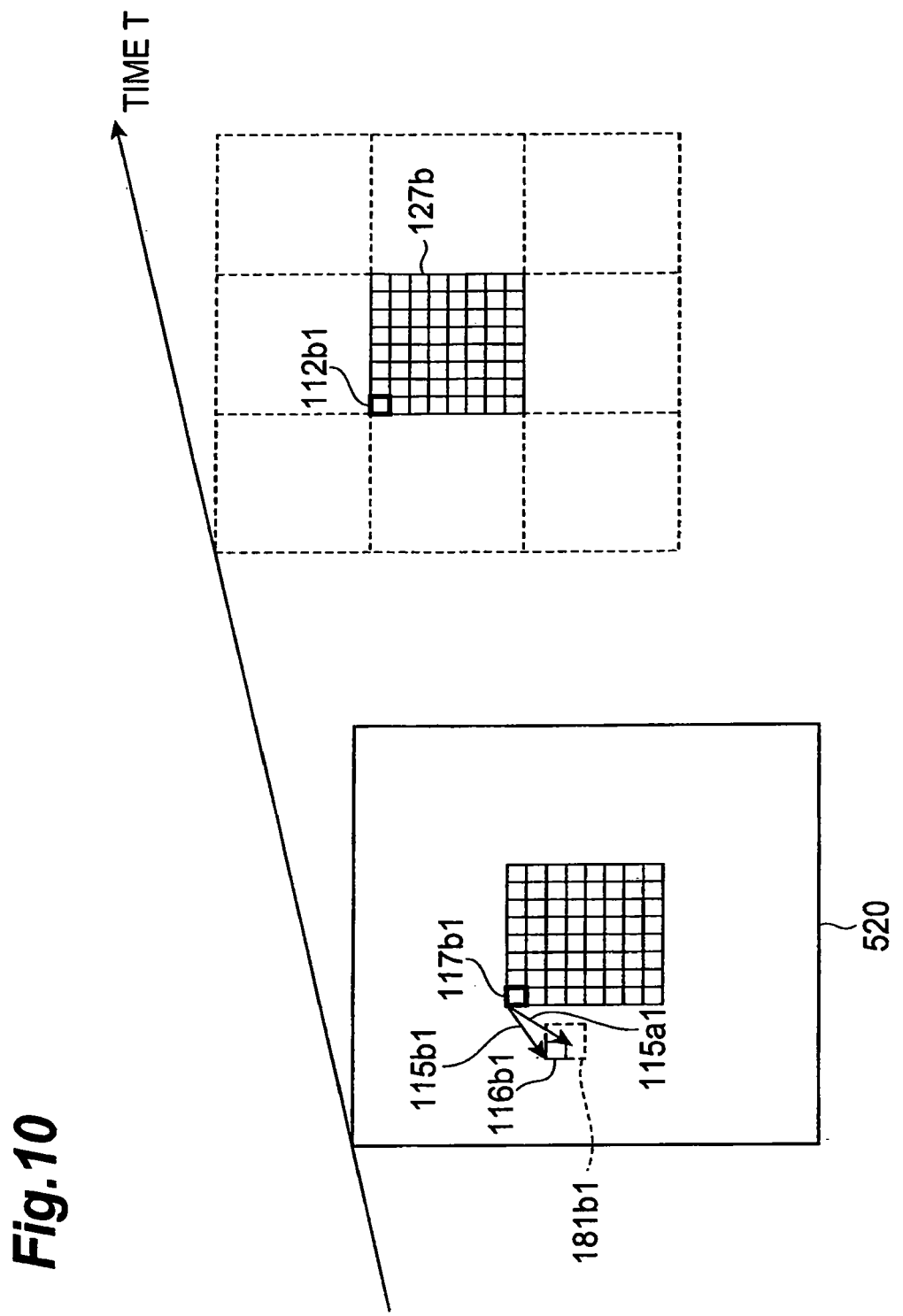
FIG. 10 is a view illustrating 2×2 small block motion estimating process.

(2) The small block motion estimator 163 detects the motion vector of four 2×2 small blocks belonging to the same group as the 4×4 small block 112a1 of which motion vector has been detected in the above (1). Here, there will be given a description while particularly aiming at a block 112b1 located at the left-upper end in FIG. 10 of the four 2×2 small blocks. FIG. 10 is a view illustrating a method detecting a motion vector 115b1 of the 2×2 small blocks 112b1 located at the left-upper end of the 64-divided 2×2 small blocks. The small block motion estimator 163 sets, when the 2×2 small blocks 112b1 are input to the small block motion estimator 163, a search range 181b1 on the previously decoded frame 520 (stored in the frame memory 153). Succeedingly, a search is carried out within the search range in accordance with a predetermined rule to detect a position of the 2×2 small blocks 116b1 where the estimated difference value pertaining to the 2×2 small blocks 112b1 (sum of the absolute difference value of the pixels within the small block) becomes minimum, and it is taken to as the 2×2 predicted small blocks 116b1. Then, the small block motion estimator 163 determines that the shift amount between the 2×2 blocks 117b1 on the decoded frame 520 located in the same spatial position as the 2×2 predicted small blocks 112b1 and the detected 2×2 small blocks 116b1 are taken to as the motion vector 115b1 of the 2×2 small blocks 112b1. Further, about the remaining three 2×2 small blocks, the motion vectors of the 2×2 small blocks are detected in the same manner as above.

Additionally, the search range 181b1 has a predetermined size and is set to a position around the motion vector 115a1 of the 4×4 small blocks 112a1 belonging to the same group as the 2×2 small blocks 112b1. The reason is that the motion vector of the 2×2 small blocks to be detected is at the same spatial position; i.e., the motion vector has a high possibility to be close to the motion vector of the 4×4 small blocks belonging to the same group, thus, there is the effect that the search range can be set in a small size. Therefore, likewise the small block motion estimator 163 sets the center point of the search range of the four 2×2 small blocks belonging to the same group also to a position indicated by the motion vector 115a1 of the 4×4 small blocks located in the same spatial position.

(3) The motion vector 115b of the detected four 2×2 small blocks is input to the small block motion compensator 164. The small block motion compensator 164 acquires the predicted small block 116b corresponding to the motion vector 115b of the 2×2 small blocks from the decoded frame 520 (stored in the frame memory 153). Since such a process of the small block predictor 152 is performed using only the data, which the decoding apparatus 200 can generate from the encoded data, the decoding apparatus 200 also can obtain the same process result. That is, the decoding apparatus 200 also can detect the same motion vector as that of the encoding apparatus 100. Therefore, the motion vector of each 2×2 small blocks does not require to be encoded.

A block combiner 155 arranges to combine each of the sixty-four 2×2 predicted small blocks to the original position before being divided based on division rule in the block divider 162, and thereby generates a prediction block 118 of 16×16 pixels. A subtracter 253 calculates difference value of the respective pixels between the target block to be encoded 202 and the prediction block 118 to generate an error block 208.

The error block encoder 254 generates error block information 119 while encoding the error block 208 to output it to the entropy encoder 255. As shown in FIG. 1, the error block encoder 254 includes a transformer 218 and a quantizer 219 as the functions thereof. The transformer 218 performs a 4×4 discrete cosine transform (DCT) on the error block 208 in 4×4, and generates sixteen transformation coefficients 209 about each of the sixteen 4×4 blocks. The quantizer 219 quantizes each of the transformation coefficients 209 to generate error block information (for example, quantized transformation coefficient) 119.

The error block decoder 156 decodes the error block information 119 to generate a decoded error block 121. As shown in FIG. 1, the error block decoder 156 includes a dequantizer 140 and an inverse transformer 141 as the functions thereof. The dequantizer 140 dequantizes the sixteen quantized transformation coefficients 119 on each of the sixteen 4×4 blocks to generate dequantized transformation coefficients 120. The inverse transformer 141 performs an inverse DCT transformation on the dequantized transformation coefficient 120 of respective 4×4 blocks to generate the decoded error block 121.

The adder 157 adds respective pixels in the prediction block 118 and the decoded error block 121 to generate a decoded block 122. The generated decoded block 122 is stored in the frame memory 153. As a result, the decoded image is updated. The entropy encoder 255 performs entropy encoding on the low-resolution block information 102 and the error block information 119 to multiplex into an encoded data 101.

Figure 11:
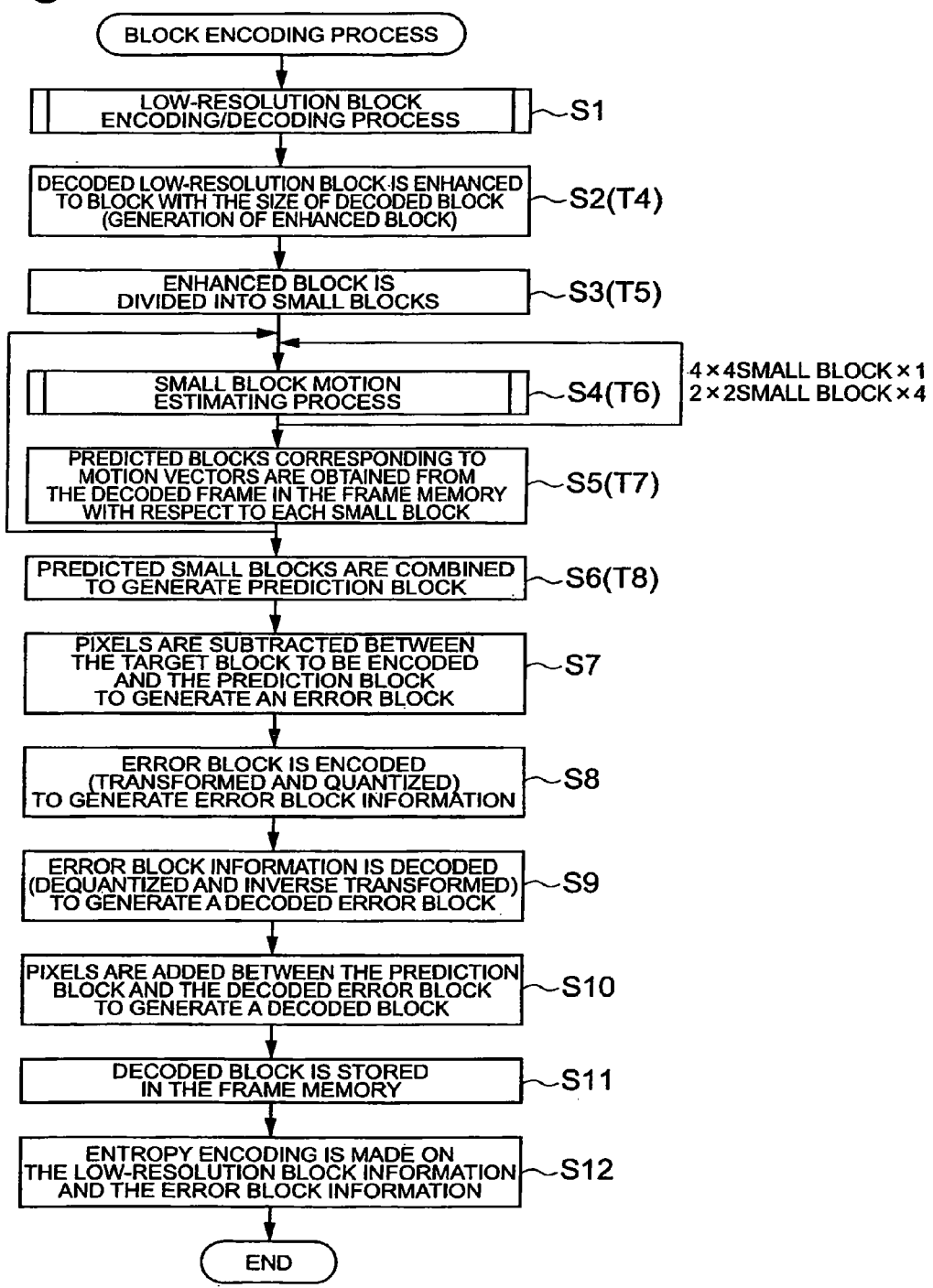
FIG. 11 is a flowchart illustrating a block encoding process.

Next, the operation of the encoding apparatus 100 will be described. Here, the steps constituting motion image encoding method according to the present invention will be also described. FIG. 11 is a flowchart illustrating encoding process of a target block to be predicted and encoded. Additionally, in the block encoding process shown in FIG. 11, the reference symbol and numerals of the steps, of which operation and process result are the identical to those of the block decoding process, which will be described later, are indicated by the figure in parentheses.

First, when the coding block divider 251 divides the input frame 201, the encoding apparatus 100 obtains the target block to be encoded 202. In S1, the decoded low-resolution block generator 252 performs a low-resolution block encoding/decoding process shown in FIG. 12.

Figure 12:
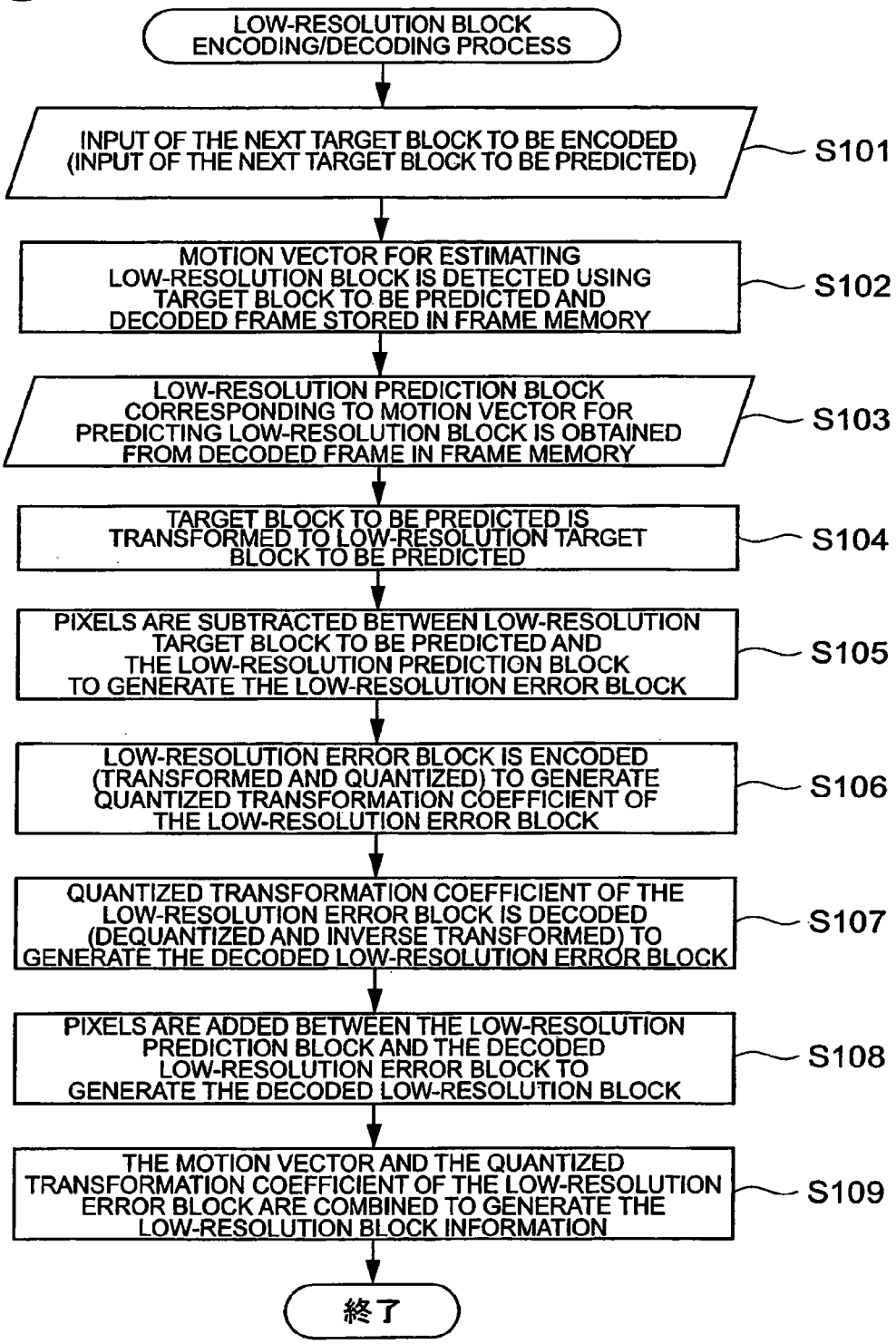
FIG. 12 is a flowchart illustrating a low-resolution block encoding/decoding process.

In S101 of FIG. 12, the next target block to be encoded (target block to be predicted) is input. In S102, the motion estimator 211 detects the motion vector for estimating low-resolution block using the target block to be predicted and the previously decoded frame stored in the frame memory. Incidentally, since the detecting method of the motion vector has been described in the description of configuration of the decoded low-resolution block generator 252, the description thereof is omitted.

In S103, the motion compensator 133 obtains the low-resolution prediction block corresponding to the motion vector for predicting the low-resolution block using the decoded frame in the frame memory. In S104, the low-resolution block generator 134 transforms the target block to be predicted into the low-resolution target block to be predicted based on the above-described transformation rule referring to FIG. 4. In S105, the subtracter 213 subtracts the respective pixels between low-resolution target block to be predicted and the low-resolution prediction block to generate the low-resolution error block.

In S106, after the transformer 214 performs DCT transformation on the low-resolution error block, the quantizer 215 quantizes the DCT coefficient. As a result, the quantized transformation coefficient of the low-resolution error block is generated. Additionally, the quantizing accuracy in S106 is set to be higher than the quantizing accuracy in S8 of FIG. 11 to be described later. There is obtained an effect that, when the encoding apparatus 100 sets the image quality of the low-resolution block to be higher, the detecting accuracy of the 2×2 small prediction blocks in S3 and S4 can be increased.

In S107 of FIG. 12, the dequantizer 136 and the inverse transformer 137 decode (dequantize and inverse transform) the quantized transformation coefficient of the low-resolution error block. As a result, the decoded low-resolution error block is generated. In S108, the adder 217 adds the respective pixels between the low-resolution prediction block and the decoded low-resolution error block to generate the decoded low-resolution block. Then, the combiner 216 combines the motion vector and the quantized transformation coefficient of the low-resolution error block to generate the low-resolution block information (S109).

Returning to FIG. 11, in S2, the enhanced block generator 154 enhances the decoded low-resolution block to the enhanced block 127, which is the same size (16×16 pixels) as that of the prediction block, as shown in FIGS. 5 and 6. Since the generating method of the enhanced block has been described in the description of the function of the enhanced block generator 154 with reference to FIGS. 5 and 6, the description thereof is omitted.

Figure 8:
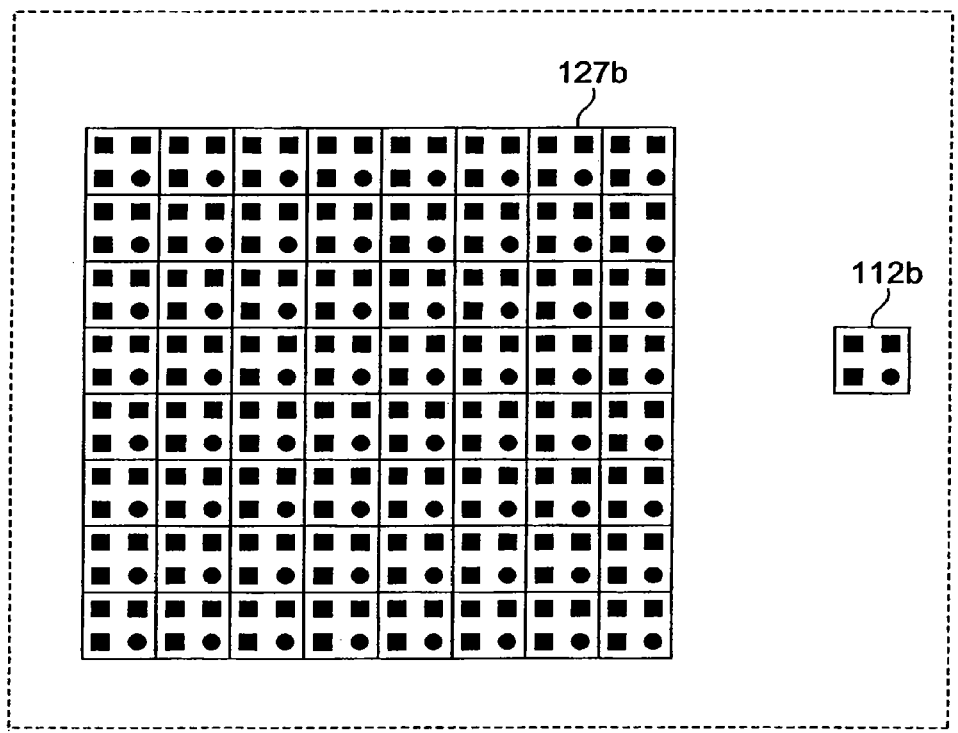
FIG. 8 is a view illustrating 2×2 division of an enhanced block.

In S3, the block divider 162 divides the enhanced block into the 4×4 small blocks and the 2×2 small blocks as shown in FIGS. 7 and 8. The divided small blocks are input to the small block motion estimator 163 as a group of 4×4 small blocks and four 2×2 small blocks located at the spatially same position.

In S4, the small block motion estimator 163 detects the motion vector of four 2×2 small blocks in the above-described group. The small block motion estimating process is carried out on one 4×4 small block and four 2×2 small blocks respectively. The processes are carried out on the 4×4 small block first, and then on the four 2×2 small blocks.

Figure 13:
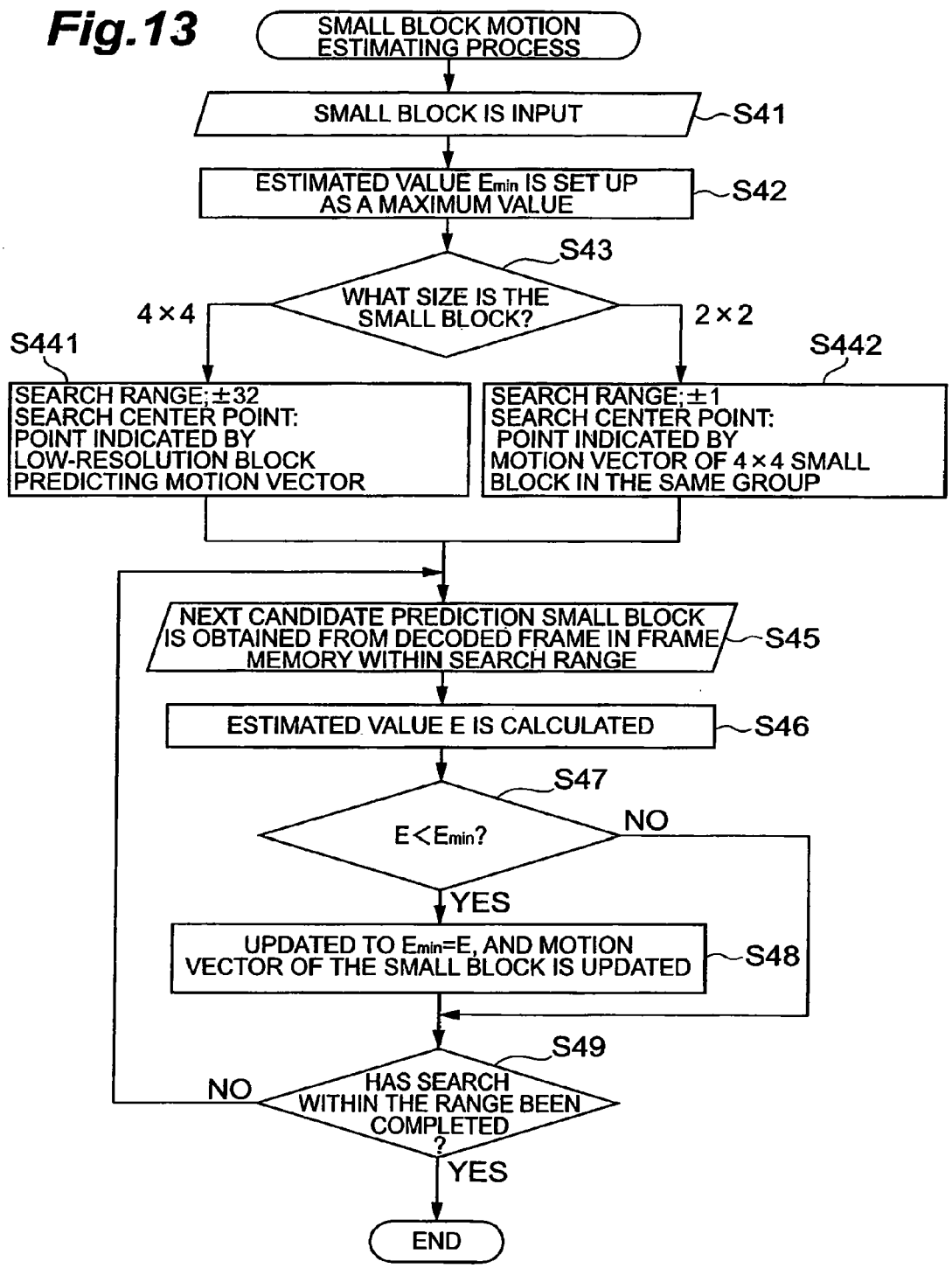
FIG. 13 is a flowchart illustrating a small block motion estimating process.

Here, referring to FIG. 13, the small block motion estimating process will be described. First, in S41, the small block is input, and an estimated value Emin is set as a maximum integer value (initial value) (S42). Next, in S43, the size of the small block is determined. Then, a process depending on the determination result is carried out (S441 or S442). That is, on the previously decoded frame 520 (stored in the frame memory 153), the size of the search range and the center point of the search range (search center point) are set.

Succeedingly, within the search range on the decoded frame 520, a candidate of the predicted small block is searched in spiral order from the search center point. As a result, the predicted small block having the minimum estimated value Emin is found. More specifically, the small block motion estimator 163 obtains the next candidate prediction small block 113 from the decoded frame in the frame memory 153 (S45), and calculates the estimated value E (S46). The estimated value E is a sum of the absolute difference values in pixels between the small block and the predicted small block.

In S47, it is determined whether or not the estimated value E is smaller than the estimated value Emin. When the estimated value E is smaller than the estimated value Emin (S47; YES), the estimated value Emin is updated to the estimated value E, and the motion vector of the small block is updated to a shift amount from the position of the small block to a position of the present candidate block of the predicted small block (S48). While, when the estimated value E is larger than the estimated value Emin (S47; NO), the process in S48 is omitted and the process proceeds to S49.

In S49, it is determined whether or not the search of all candidate predicted small blocks in the search range has been completed. After that, the sequential processes S45 to S49 are repeatedly carried out until the search of all candidate predicted small blocks within the search range has been completed in S49. Then, at the time point when it is determined that the search has been completed, the small block motion estimating process is terminated.

Returning to FIG. 11, in S5, the small block motion compensator 164 obtains the 2×2 predicted small blocks 116 corresponding to four motion vectors of the 2×2 small blocks detected in S3 and S4 respectively from the decoded frame in the frame memory 153. The respective processes S3 to S5 are carried out on the 16 groups of the small blocks.

In S6, the block combiner 155 arranges sixty-four 2×2 predicted small blocks at the position before division based on the division rule used in S3 to combine the same to the prediction block of 16×16 pixels. In S7, the subtracter 253 subtracts the respective pixels between the target block to be encoded and the prediction block to generate an error block. In S8, the error block encoder 254 encodes (transforms and quantizes) the error block to generate error block information (for example, quantized transformation coefficient).

In S9, the error block decoder 156 decodes (dequantizes and inverse transforms) the error block information to generate a decoded error block. In S10, the adder 157 adds the respective pixels between the prediction block and the decoded error block to generate a decoded block. When the generated decoded block is stored in the present decoded frame in the frame memory 153 (S11), the entropy encoder 255 performs entropy encoding on the low-resolution block information and the error block information (S12), and the block encoding process is terminated.

Next, the configuration of the decoding apparatus 200 shown in FIG. 2 will be described. The decoding apparatus 200 is an apparatus for performing predicting process on the basis of block and decoding process of the encoded data 101, and for reproducing the decoded block 122 in a raster scan order on the basis of block. In this embodiment, the prediction block generated in the predicting process and the decoded block have the same sizes of 16×16 pixels respectively.

When an entropy decoder 150 receives an input of encoded data 101 required for generating a decoded block as the target to be decoded, the entropy decoder 150 separates the encoded data 101 into low-resolution block information 102 and error block information 119 according to an entropy decoding. The low-resolution block decoder 151 decodes the low-resolution block information 102 and thereby generates a decoded low-resolution block 110 of 8×8 pixels with the smaller number of pixels than that of the prediction block.

The separator 131 separates the low-resolution block information 102 into a motion vector 104 for predicting low-resolution block and low-resolution error block information 107 (for example, a quantized transformation coefficient of a low-resolution error block). A motion compensator 133 obtains a low-resolution prediction block 106 corresponding to the motion vector 104 for predicting low-resolution block from a decoded frame 520 stored in the frame memory 153.

A dequantizer 136 dequantizes the quantized transformation coefficient 107 of the low-resolution error block to generate a dequantized transformation coefficient 108 of the low-resolution error block. An inverse transformer 137 performs an inverse DCT transformation on the dequantized transformation coefficient 108 to generate the decoded low-resolution error block 109. An adder 135 calculates additional values of the respective pixels in the low-resolution prediction block 106 and the decoded low-resolution error block 109 to generate a decoded low-resolution block 110.

Incidentally, the respective functions and processed results of an enhanced block generator 154, a block divider 162, a small block predictor 152 and a block combiner 155 are identical to those in the description of the encoding apparatus 100. Therefore, the description and illustration of the above are omitted.

Additionally, an error block decoder 156 decodes an error block information 119 (for example, quantized transformation coefficient) to generate a decoded error block 121. The error block decoder 156 has a dequantizer 140 and an inverse transformer 141. The dequantizer 140 dequantizes the quantized transformation coefficient 119 to generate a dequantized transformation coefficient 120. The inverse transformer 141 performs an inverse DCT transformation on the dequantized transformation coefficient 120 to generate a decoded error block 121.

An adder 157 calculates additional values about the respective pixels of a prediction block 118 between the pixels located at a position spatially coincident with the decoded error block 121 and the relevant pixels to generate a decoded block 122 thereby. The decoded block 122 is stored in the frame memory 153 and the decoded image is updated.

Succeedingly, the operation of the decoding apparatus 200 will be described along with the respective steps constituting the motion image decoding method according to the present invention. Incidentally, in the block decoding process in FIG. 14, the reference symbol and numerals of the steps thereof which are identical to those of the block encoding process illustrated in FIG. 11 are indicated in the parentheses.

When the decoding process of the next block is started, first the encoded data for one block required for decoding the block are input to the entropy decoder 150 in T1. In T2, the entropy decoder 150 performs entropy decoding on the encoded data to obtain low-resolution block information and error block information. Among the above information, the low-resolution block information is input to the low-resolution block decoder 151 according to a low-resolution block decoding process 404 and decoded to a decoded low-resolution block.

Figure 15:
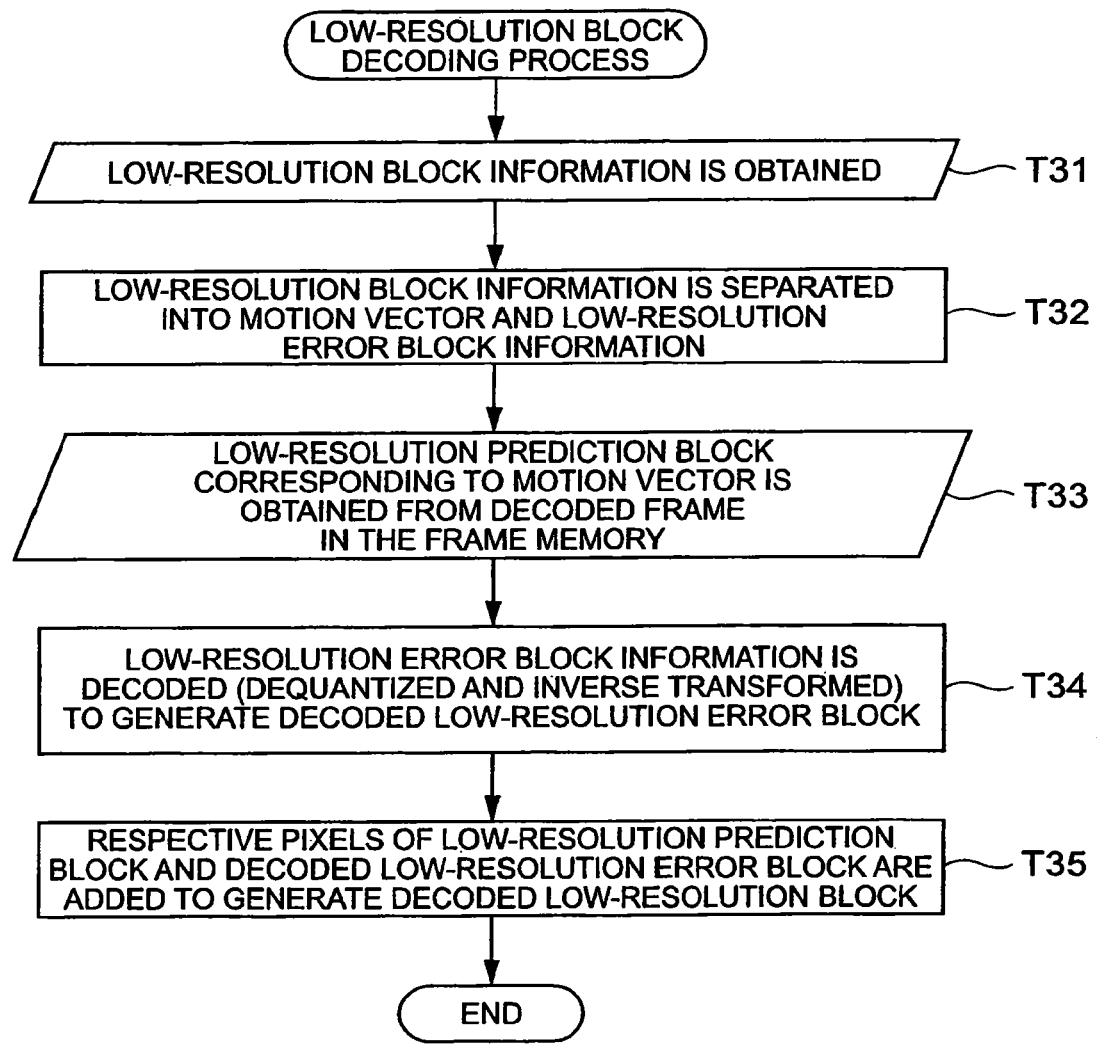
FIG. 15 is a flowchart illustrating a low-resolution block decoding process.

Here, referring to FIG. 15, a low-resolution block decoding process in T3 will be described. In T31, the low-resolution block information is input to the separator 131. The separator 131 separates the low-resolution block information into a motion vector and low-resolution error block information in T32. In T33, the motion compensator 133 obtains a low-resolution prediction block 106 corresponding to the motion vector 104 for predicting low-resolution block from the previously decoded frame 520 (stored in the frame memory 153).

In T34, the dequantizer 136 dequantizes the quantized transformation coefficient 107 as the low-resolution error block information to generate the dequantized transformation coefficient 108.

Further, the inverse transformer 137 performs an inverse DCT transformation on the dequantized transformation coefficient 108 to generate the decoded low-resolution error block 109. In T35, the adder 135 adds the respective pixels of the low-resolution prediction block 106 and the decoded low-resolution error block 109 to generate the decoded low-resolution block 110.

Returning to FIG. 14, the enhanced block generator 154 enhances the decoded low-resolution block 110 to the enhanced block 127, which has the same size (16×16 pixels) as that of the prediction block as shown in FIGS. 5 and 6 (T4). Since the generating method of the enhanced block has been described in the description of the function of the enhanced block generator 154 referring to FIGS. 5 and 6; the description thereof is omitted.

Figure 14:
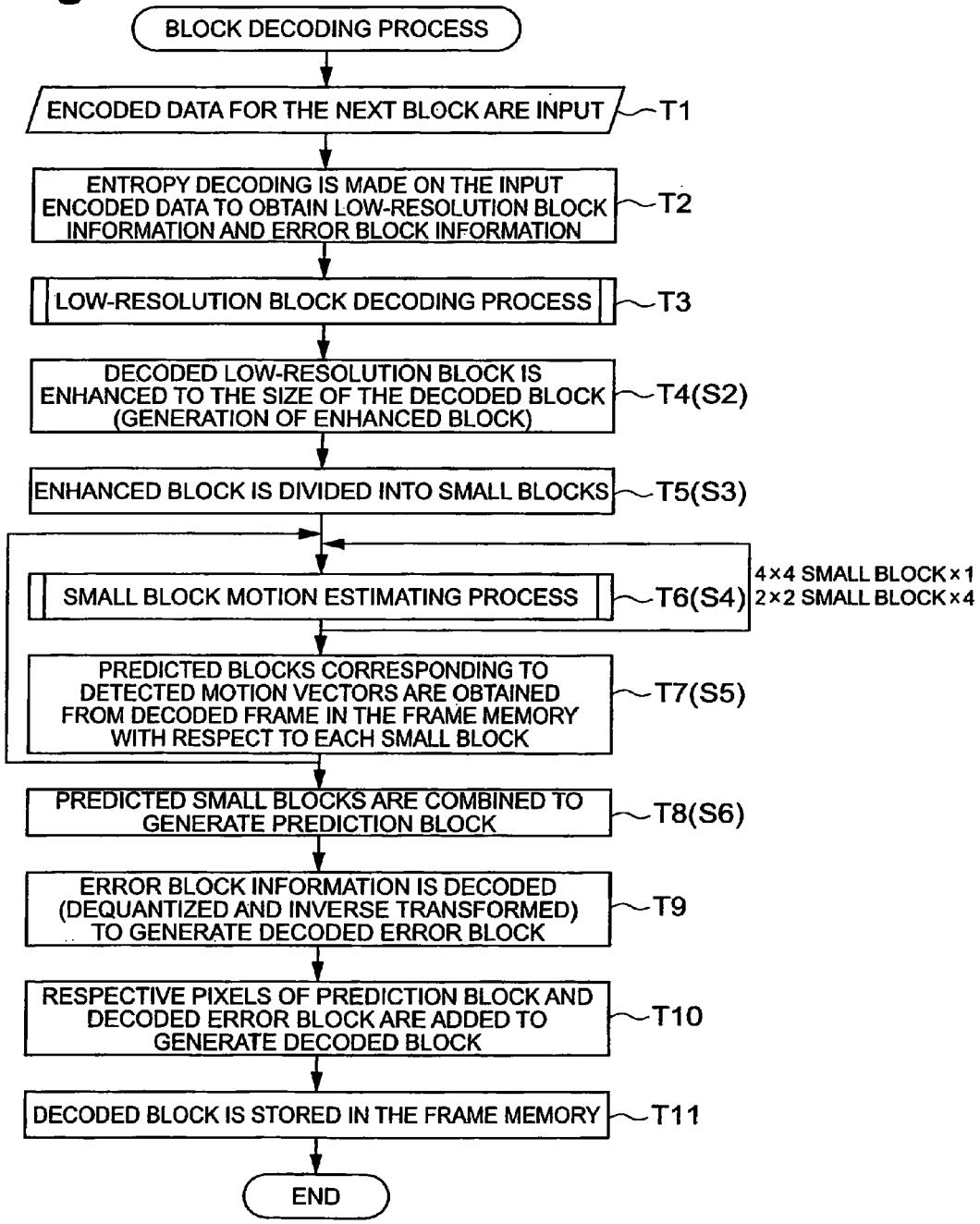
FIG. 14 is a flowchart illustrating a block decoding process.

In T5 to T7, the block divider 162 divides the enhanced block into sixty-four 2×2 small blocks and the small block predictor 152 generates sixty-four 2×2 predicted small blocks. Incidentally, since the respective processes in T5 and T6 in FIG. 14 are identical to the respective processes in S3 and S4 shown in FIG. 11; detailed descriptions thereof are omitted. Further, since the process in T7 is identical to the process in S5 of FIG. 11, the description thereof is omitted.

In T8, the block combiner 155 arranges the sixty-four 2×2 predicted small blocks generated in T6 and T7 to the original position before division based on the division rule in T5. Thus, the predicted small blocks are combined into a prediction block of 16×16 pixels.

In T9, the error block decoder 156 decodes (dequantizes and inverse transforms) the error block information (for example, quantized transformation coefficient) to generate the decoded error block. In T10, the adder 157 adds the respective pixels of the prediction block and the decoded error block to generate the decoded block. In T11, the decoded block is stored in the frame memory 153; and as a result thereof, the decoded image is updated.

Figure 16:
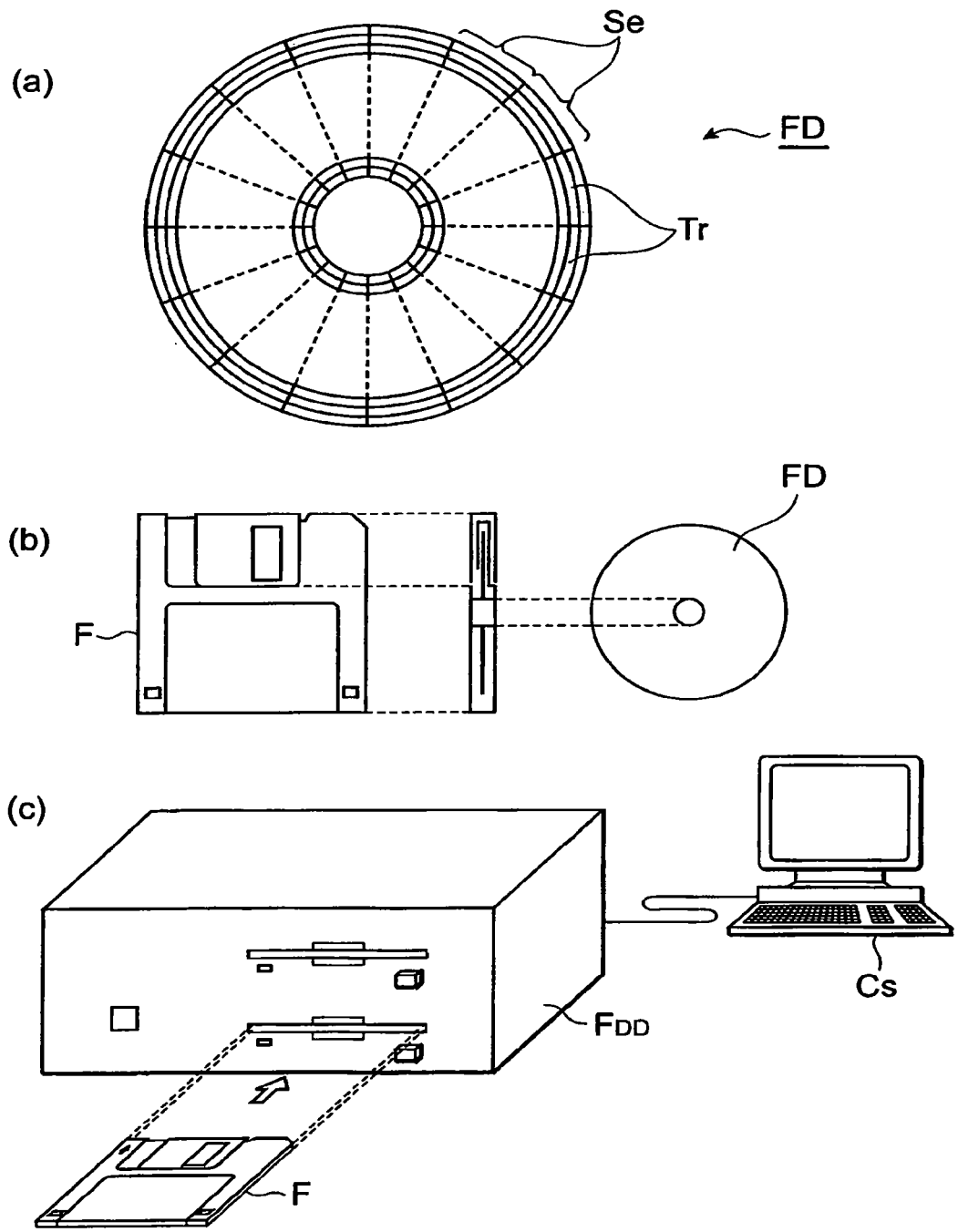
FIG. 16 is a view illustrating a data storing medium storing a program for carrying out the motion image encoding process or motion image decoding process in accordance with a computer system.

FIG. 16(*a*) exemplifies physical format of a flexible disk storing a motion image encoding program for carrying out an image encoding process and a motion image decoding program for carrying out an image decoding process according to the embodiment. Also, FIG. 16(*b*) shows a front appearance and a sectional structure of the flexible disk. A flexible disk FD is contained within a case F. On the surface of the disk, plural tracks Tr are formed concentrically from the periphery toward the inside thereof. Each of the tracks is divided into 16 sectors Se in the angular direction. The above-described programs are stored as the data in the regions allotted on the flexible disk FD.

As shown in FIG. 16(*c*), the programs are recorded on the flexible disk FD from a computer system Cs via a flexible disk drive FDD. When building the encoding apparatus 100 or the decoding apparatus 200 in the computer system Cs according to the program in the flexible disk FD, the flexible disk drive FDD reads and transfers the program from the flexible disk FD to the computer system Cs.

Figure 17:
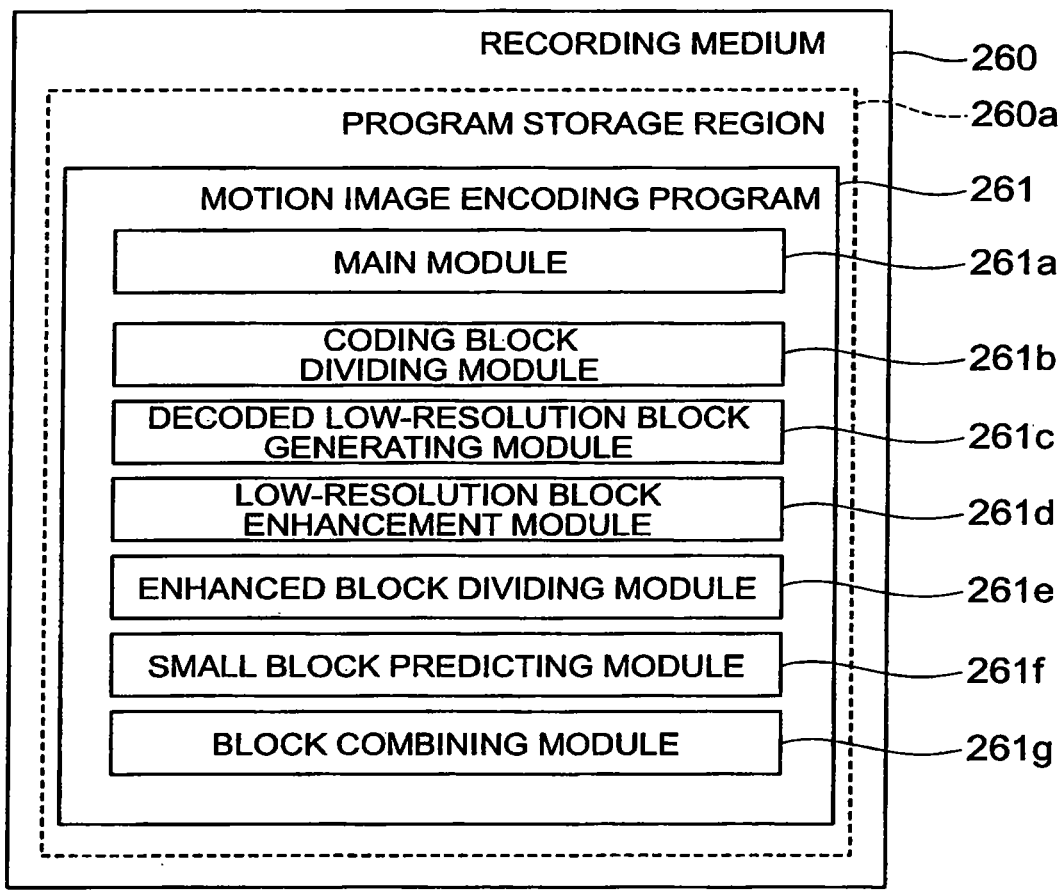
FIG. 17 is a view showing a configuration of a motion image encoding program according to the first embodiment.

FIG. 17 shows a structure of a motion image encoding program 261 according to the present invention. The motion image encoding program 261 is recorded in a recording medium 260. The recording medium 260 is of, for example, the above-described flexible disk. However, optical disk, IC card, CD-ROM, DVD and semiconductor memory are also available. The computer system Cs includes not only a PC (Personal Computer) but also a DVD player, set-top box, mobile phone and the like equipped with a CPU for performing and controlling the information processing and using software.

Next, the structure of the motion image encoding program and the motion image decoding program according to the present invention will be described. The motion image encoding program 261 is stored in a program storage region 260*a* formed in the recording medium 260 as shown in FIG. 17. The motion image encoding program 261 has a main module 261*a* for totally controlling the motion image encoding process, a coding block dividing module 261*b*, a decoded low-resolution block generating module 261c, a low-resolution block enhancement module 216d, an enhanced block dividing module 261e, a small block predicting module 261f and a block combining module 261g as the component unit. The functions carried out by executing these modules are the same as the functions of the coding block divider 251, the decoded low-resolution block generator 252, the enhanced block generator 154, the block divider 162, the small block predictor 152 and the block combiner 155 in the above-described motion image encoding apparatus 100 respectively.

Figure 18:
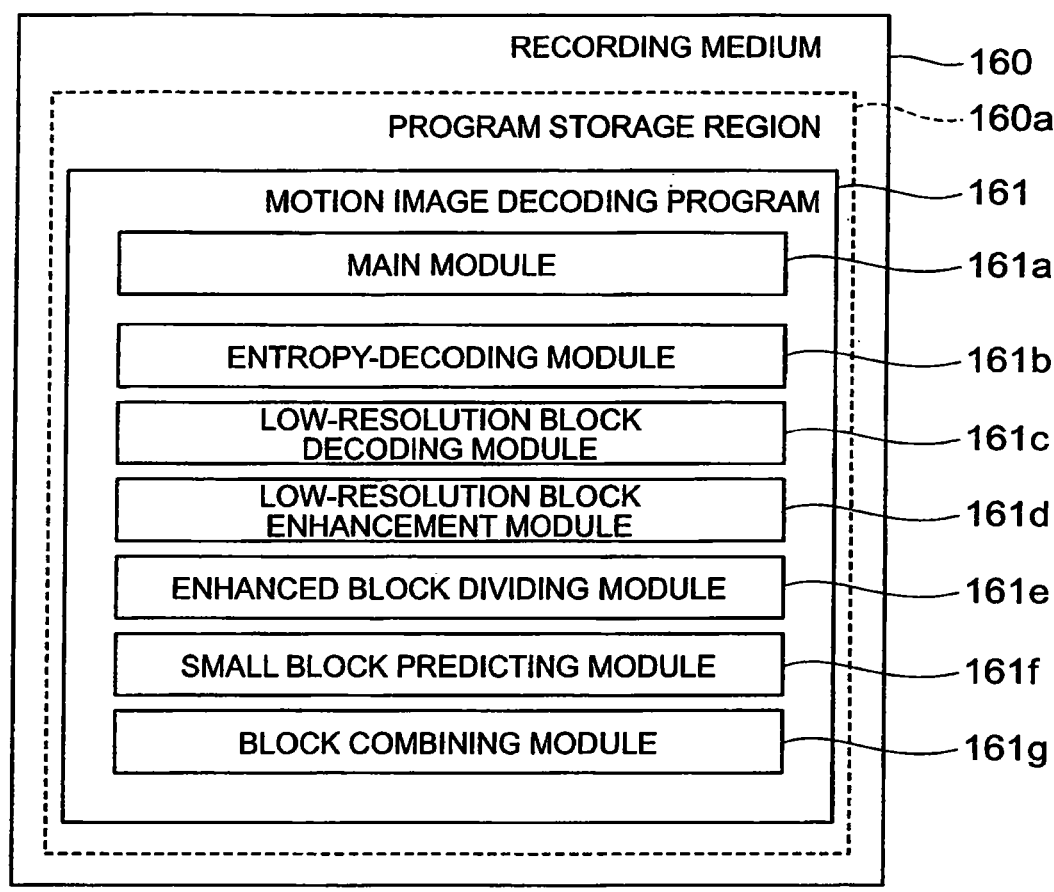
FIG. 18 is a view showing a configuration of a motion image decoding program according to the first embodiment.

A motion image decoding program 161 is stored in a program storage region 160a formed in a recording medium 160 as shown in FIG. 18. The motion image decoding program 161 has a main module 161a for totally controlling the motion image decoding process, an entropy decoding module 161b, a low-resolution block decoding module 161c, a low-resolution block enhancement module 161d, an enhanced block dividing module 161e, a small block predicting module 161f and a block combining module 161g as the component unit. The functions carried out by executing the above-modules are the same as the functions of the entropy decoder 150, the low-resolution block decoder 151, the enhanced block generator 154, the block divider 162, the small block predictor 152 and the block combiner 155 in the above-described motion image decoding apparatus 200 respectively.

Incidentally, the motion image encoding program 261 may also have a configuration such that a part or the entire program is transmitted via transmission medium such as a communication line, received by another device and recorded thereon (including installation). Likewise, the motion image decoding program 161 also may have a configuration such that a part or the entire program is transmitted via a transmission medium such as a communication line, received by another device and recorded thereon (including installation).

Additionally, the above-described modes of embodiments are given as a preferred example of a motion image encoding and decoding technology according to the present invention. However, the present invention is not limited to the above modes.

(First Modification)

A first modification relates to the motion vector detecting method of the small block. In the above-described embodiment, the search range for detecting the motion vector of the small block is set to ±32 for 4×4 small blocks; ±1 for 2×2 small blocks. However, the search range may be set to a different value. Further, about the accuracy of the motion vector component for the small block, not only integer value but also a fractional value is also available. As the fractional value, ½ pixel, ¼ pixel and the like are available. When a fractional value is employed for the vector component as the calculating method of the predicting pixels, for example, a method set forth in H. 264 ("Text of ISO/IEC 14496-10 Advanced Video Coding 3rd Edition", September 2004.) is applicable.

Furthermore, in the above embodiment, as the center point of the search range, when detecting the motion vector of the small block, there are used motion vector for estimating low-resolution block for the 4×4 small blocks; and for the 2×2 small blocks, a motion vector of the 4×4 small blocks located at the spatially same position. However, any value, which uniquely agrees with each other at the encoding side and the decoding side, is applicable. For example, 0 vector or a prediction vector, which is selected from the motion vectors of the adjacent small blocks in a manner of median prediction, may be set to the center point of the search range.

Further, as the estimated value for detecting the motion vector of a small block, the sum of absolute difference values in pixels is used, but it is not limited thereto. Any method that capable of uniquely determining at the encoding side and the decoding side is applicable. For example, a modification such as sum of square difference value in pixels, weighted sum of absolute difference values (sum of square difference values) in pixels corresponding to the position of pixels or the like is possible. The decoded frame for the reference of prediction is limited to one frame. However, using plural decoded frames as the references, predicted small blocks may be generated from different decoded frames for each small block. Here, when the same estimated value is used as estimated value at the encoding side and the decoding side such as sum of absolute difference values in pixels, selection information of decoded frame does not require to be encoded; thus the efficiency is increased.

(Second Modification)

A second modification relates to the prediction method. The prediction method has been described while being limited to the temporal prediction. The same method is applicable to the spatial prediction using an image decoded in the same frame as the target block to be encoded or decoded block. That is, the decoded low-resolution block can be enhanced using an Intra prediction. More specifically, the following case is also included in the present invention. That is, the decoding apparatus 200 divides a decoded low-resolution block again, determines an optimum mode for respective small divided block from plural Intra prediction modes of, for example, H.264 ("Text of ISO/IEC 14496-10 Advanced Video Coding 3rd Edition", September 2004.), and then predicts a block of high-resolution signal corresponding to the decoded low-resolution block using adjacent decoded pixels within the same frame. In this case, since the prediction mode of the respective small divided blocks does not require to be transmitted explicitly, a superior effect such that target block can be accurately predicted with less additional information can be obtained. Also, by combining the temporal prediction and the spatial prediction, a precise prediction may preferably be made. For example, the following method is also effective. That is, using the enhanced block generator 154, enhancing process of the decoded low-resolution block is carried out according to Intra prediction, and the enhanced block is divided into small blocks to carry out the process with the small block predictor 152.

(Third Modification)

A third modification relates to the encoding of the error block. The encoding process of the error block between the prediction block and the target block to be encoded is not indispensable. That is, the error block encoder 254 (FIG. 1) and the error block decoder 156 (FIG. 1 and FIG. 2) may be omitted. It may be determined whether or not the encoding should be carried out for each of the target block to be encoded or the decoded block. Concrete encoding and decoding methods of the error block and the low-resolution error block are not limited to the above-described method. Further, in the above embodiment, the target block to be encoded and the target block to be predicted have the same block size. However, the prediction method of the present invention is applicable to the case that the sizes of the both are different from each other. Also, the encoding of the error signal is not limited to the block basis, but may be carried out on a frame basis. However, in this case, in order to prepare decoded pixels at the boundary between the blocks used for enhancing process of the low-resolution block, it is necessary to carry out the generating process of the adjacent prediction block and the decoding process of the prediction error signal before carrying out enhancing process of the low-resolution block.

(Fourth Modification)

Figure 19:
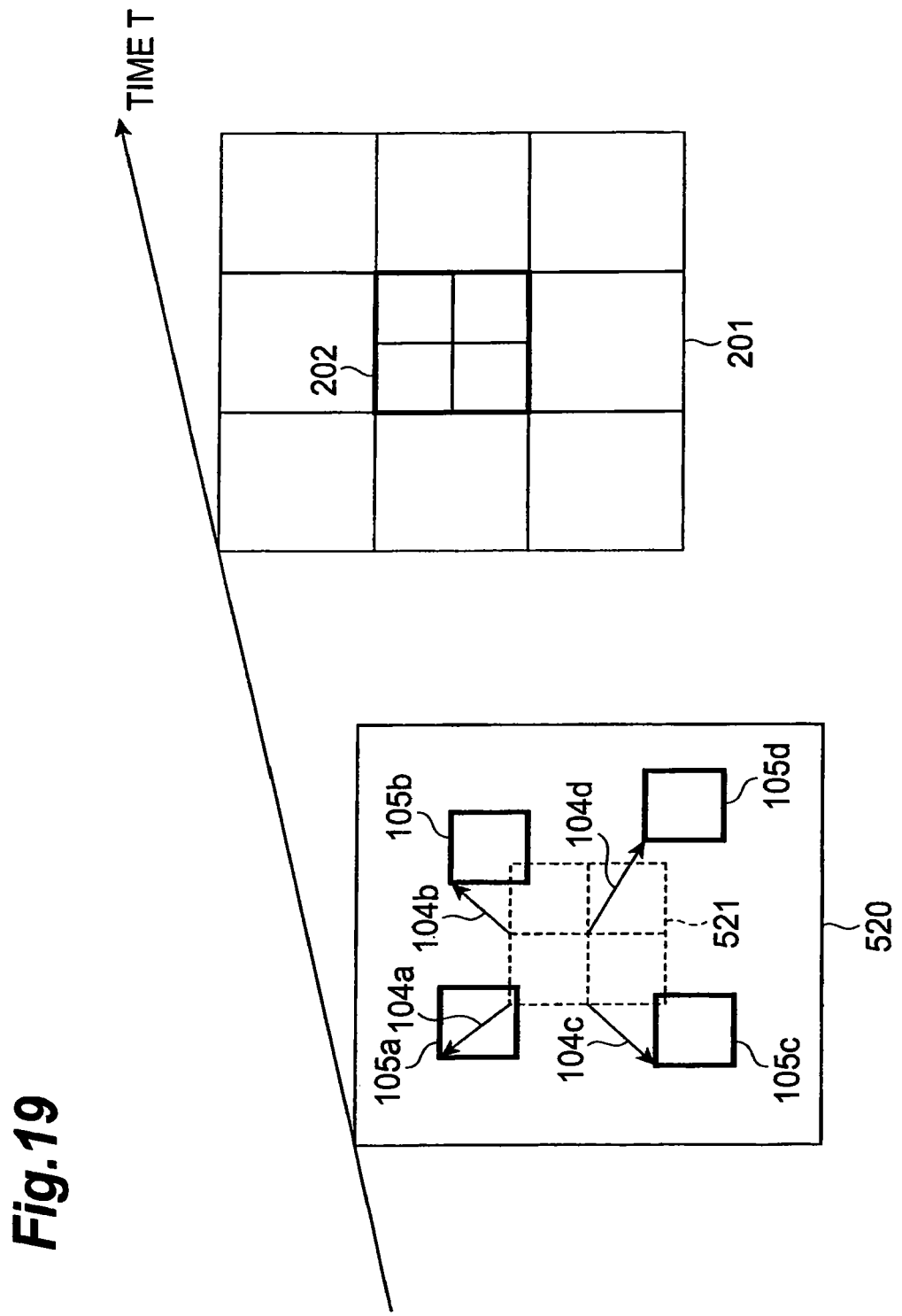
FIG. 19 is a view illustrating a block matching with block division.

A fourth modification relates to the block size. In the above embodiment, each one motion vector for predicting the low-resolution block is generated for the target block to be encoded and the decoded block respectively. However, as shown in FIG. 19, the prediction method according to the present invention is applicable to a method in which the target block to be encoded is divided into plural blocks and the block matching is carried out on a divided block basis. In this case, the size of the small blocks is determined based on the target block to be encoded, the size information of the divided blocks and plural motion vectors (104*a*, 104*b*, 104*c* and 104*d*) are encoded.

Further, in the example shown in FIG. 19, the center point of the search range for detecting the motion vectors of 4×4 small blocks can be set to a position indicated by the motion vectors, which are located at the spatially same position as the motion vectors for predicting four low-resolution blocks.

Additionally, in FIG. 19, the dividing method is carried out on an 8×8 basis, but is not limited thereto. Plural dividing methods such as H.264 ("Text of ISO/IEC 14496-10 Advanced Video Coding 3rd Edition", September 2004.) are adaptively applicable. Also, the size of the target block to be encoded and the decoded block size are not limited to 16×16. That is, even when the block size is different like 32×32, 8×8 and 4×4, the invention is applicable by changing the size of the small block depending on the block size of the target block.

Figure 20:
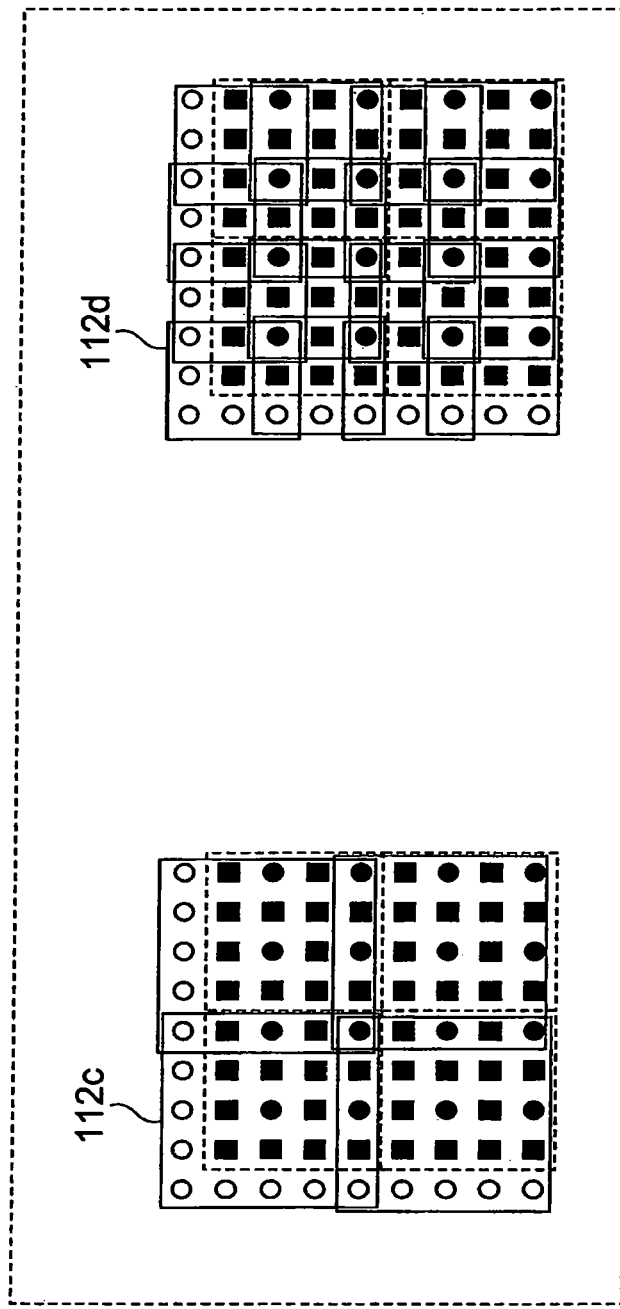
FIG. 20 is a view illustrating a fourth modification in terms of a block size.

Also, the size of the small blocks in the small block predictor 152 (S3 and S4 in FIG. 11) is not limited to 4×4 and 2×2. For example, like the 5×5 small blocks 112*c* and the 3×3 small blocks 112*d* shown in FIG. 20, by overlapping the adjacent small blocks with each other, the size of the small block may be enhanced. When the small block size has little characteristics within the block, the prediction performance tends to decrease. However, by adopting the above mode, it is expected the prediction performance of any local area is increased. In addition, a method in which the small block size is adaptively changed between 5×5, and 4×4, and between 3×3 and 2×2 are also effective. Likewise, the block size when carrying out the transforming and quantizing also is not limited. That is, the encoding apparatus 100 and the decoding apparatus 200 may carry out the transforming and quantizing on the error block on a basis of, for example, 8×8 blocks unit or 16×16 blocks unit.

(Fifth Modification)

Figure 21:
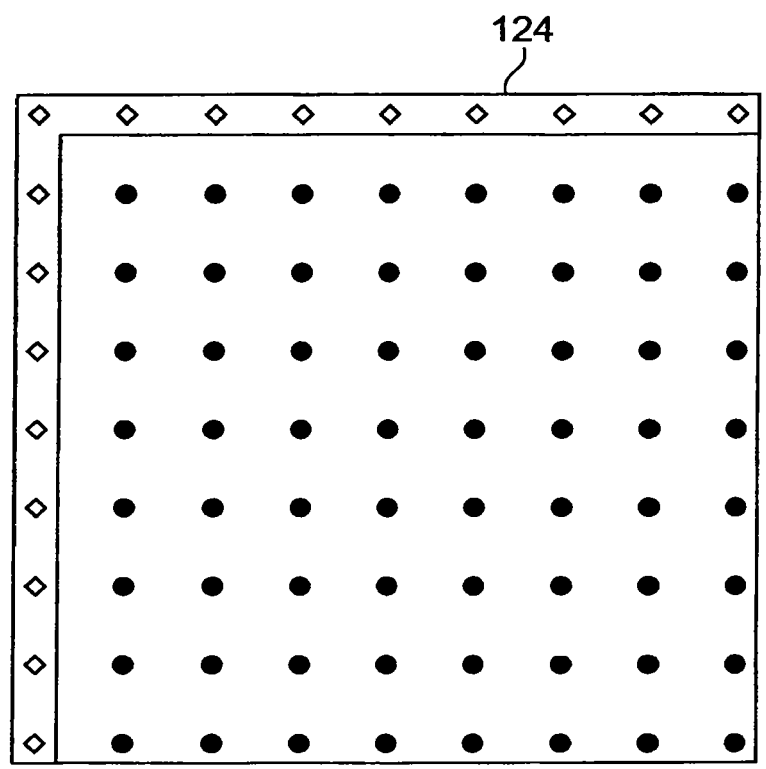
FIG. 21 is a view illustrating an enhanced block generating process according to a fifth modification.

A fifth modification relates to the enhancement method of the decoded low-resolution block. In the above embodiment, the enhanced block generator 154 obtains the boundary decoded pixel group 123, which is referred to for enhancing the decoded low-resolution block, from the decoded pixels in the blocks adjacent to the upper side and the left side of the prediction block. However, as shown in FIG. 21, also the boundary decoded pixel group 123 may be obtained from the decoded pixels of the adjacent decoded low-resolution block to generate the enhanced block.

Figure 22:
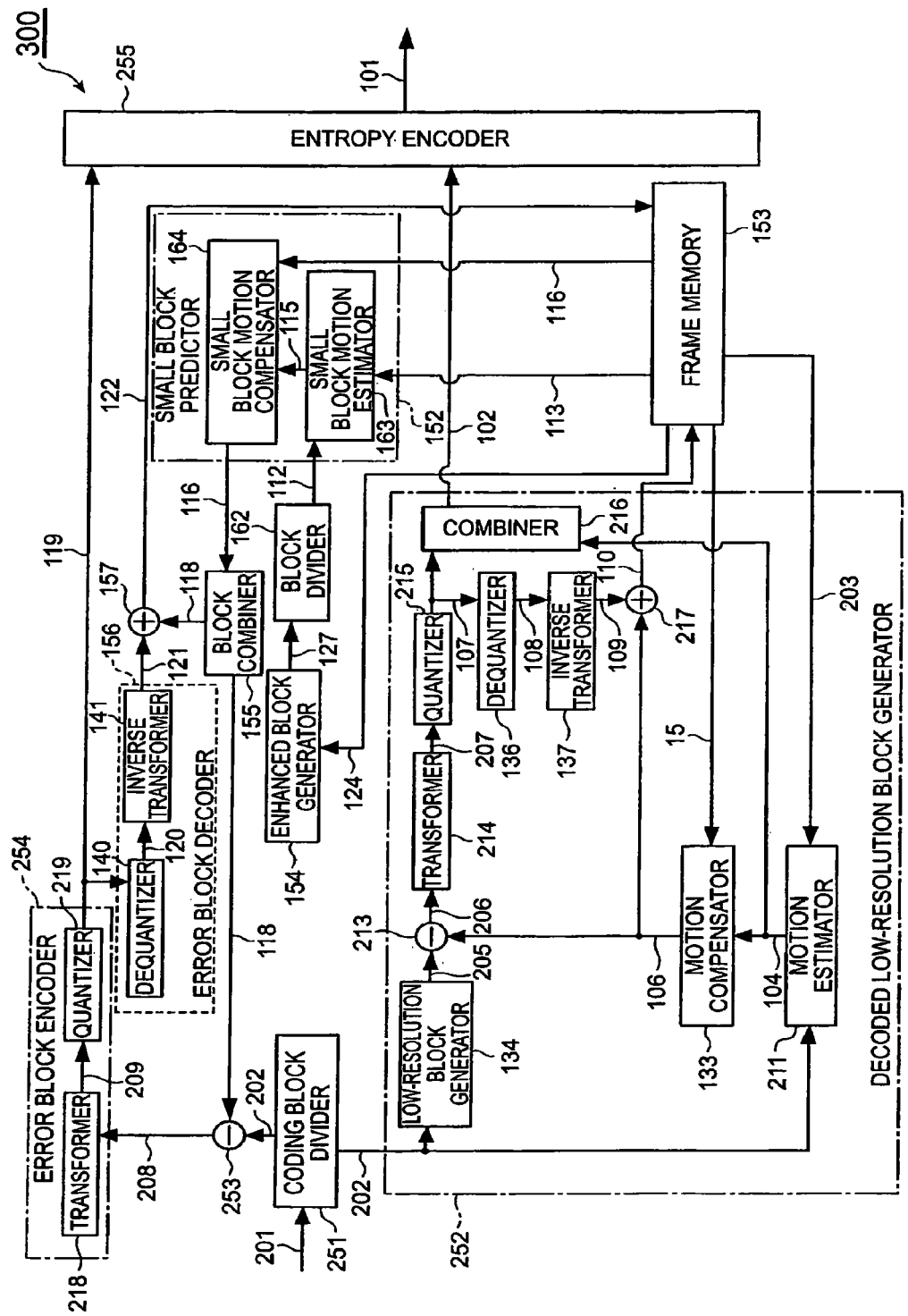
FIG. 22 is a view showing a configuration of a motion image encoding apparatus according to the fifth modification.
Figure 23:
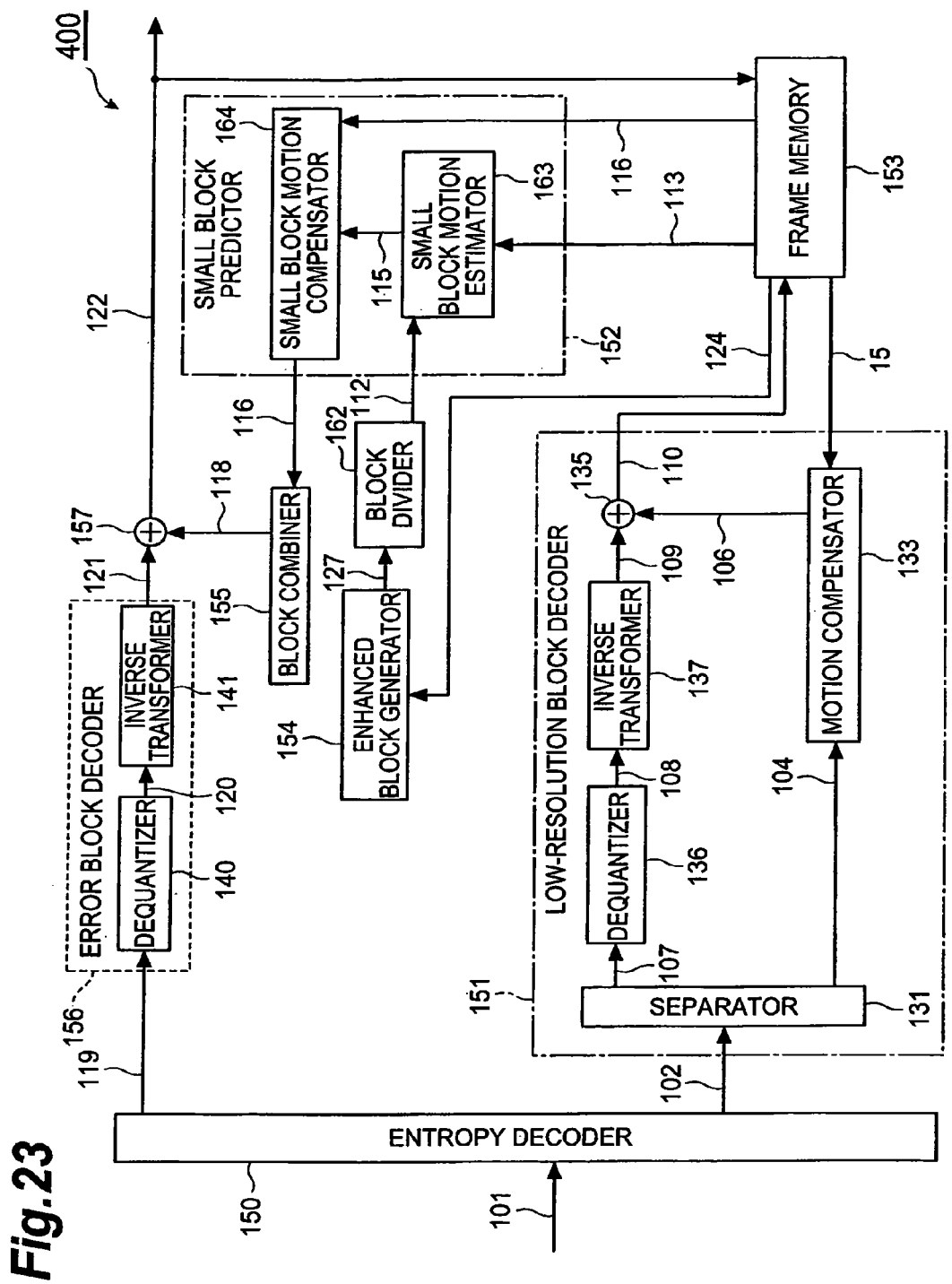
FIG. 23 is a view showing a configuration of a motion image decoding apparatus according to the fifth modification.

FIGS. 22 and 23 show an encoding apparatus 300 and a decoding apparatus 400 for carrying out the above modification. The encoding apparatus 300 and the decoding apparatus 400 are different from the encoding apparatus 100 and the decoding apparatus 200 in the following points.

(i) a point that the decoded low-resolution block 110 is stored once in the frame memory 153;

(ii) a point that the decoded pixels of the decoded low-resolution block spatially corresponding to the adjacent block are combined with the decoded low-resolution block as the boundary decoded pixels; and (iii) a point that the low-resolution block 124 (refer to FIG. 21) including the boundary decoded pixels is input to the enhanced block generator 154 as a unit. By configuring the encoding apparatus 300 and the decoding apparatus 400 as described above, the boundary decoded pixels can be changed.

Incidentally, characteristics of the respective apparatuses shown in FIGS. 1 and 2 and characteristics of the respective apparatuses shown in FIGS. 22 and 23 may be adaptively combined according to the conditions. For example, in the case that the motion vector for the low-resolution block of the adjacent block is the same as the present target block to be predicted, the apparatuses may use the decoded pixels of the decoded low-resolution block as the boundary decoded pixels. In the case the above are different, the decoded pixels of the decoded frame may be used as the boundary decoded pixels. Also, in an encoding method such that plural prediction methods are adaptively switched on a block basis, the boundary decoded pixels may be changed using the prediction method of the block adjacent to the present target block to be predicted as the conditions.

Further, like the process at the frame edge, a method in which the enhanced block is generated using the pixels only within the low-resolution prediction block without using the boundary decoded pixels may be employed. Furthermore, in the above embodiment, the boundary decoded pixels are extracted from the decoded image of the current frame. However, the decoded pixels of the previously decoded frame located at the spatially same position may be used. As the boundary decoded pixels, the pixels adjacent to the target block to be predicted are used. However, the decoded pixels are not limited thereto, but decoded pixels away from the boundary between the blocks, or, pixels generated from plural decoded pixels may be used.

(Sixth Modification)

Figure 24:
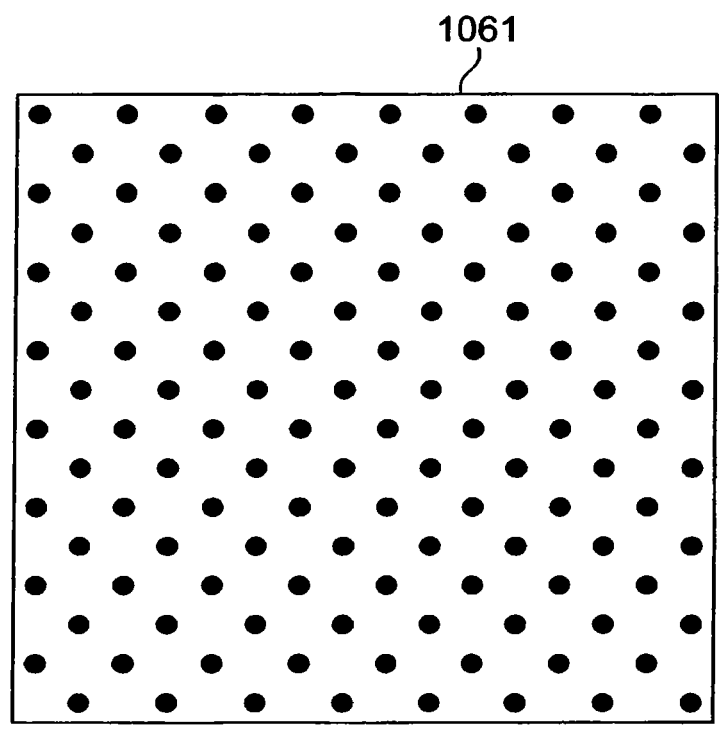
FIG. 24 is a view illustrating low-resolution block generating process according to a sixth modification.

A sixth modification relates to the low-resolution block generating method. In the above embodiment, as shown in FIG. 4, the method in which pixels are extracted from block 10 every other one line in the vertical and horizontal directions to obtain the small block is employed, but it is not limited to the above method. For example, the number of pixels of the low-resolution block may be predetermined between the encoding apparatus 100 and the decoding apparatus 200, and an arbitrary configuration with a smaller number of pixels than that of the decoded block (target block to be encoded) may be selected. The present invention is applicable to, for example, a block in which the pixels of the low-resolution prediction block 106 is displaced by one pixel in the vertical and horizontal directions as shown in FIG. 4; or a block in which the number of pixels is reduced to a half as a low-resolution prediction block 1061 shown in FIG. 24.

Moreover, in the above embodiment, the small block is generated only by the pixel extracting process. However, the pixel extracting process may be carried out after carrying out low-pass filtering process on the pixels of the block. Note that to increase the accuracy of the motion search, it is necessary to carry out the same low-pass filtering process on the candidate prediction block 113 also that is the input to the small block motion estimator 163.

(Seventh Modification)

A seventh modification relates to the low-resolution block prediction. In the above embodiment, the respective apparatuses obtain the low-resolution prediction block directly from the frame memory 153. However, also the data 15 required for generating the low-resolution prediction block 106 may be obtained from the previously decoded frame 520 stored in the frame memory 153. After that, the prediction block 105 of 16×16 pixels size shown in FIG. 3 may be generated within the motion compensator 133, and the prediction block 105 may be transformed to the low-resolution prediction block 106 of 8×8 pixels size.

Furthermore, in the above-described embodiment, the respective apparatuses use the target block to be predicted of 16×16 pixels as the input to the motion estimator 211. However, the low-resolution block prediction is not limited to the method described in the present embodiment. For example, the low-resolution block in which the target block to be predicted is subjected to the transformation rule shown in FIG. 4 may be used as the input. In this case, the following effect is obtained. That is, by selecting the motion vector for predicting the low-resolution block so that the prediction error between the low-resolution prediction block and the low-resolution target block to be encoded (low-resolution target block to be predicted) is small, the coding bits of the low-resolution error block is reduced.

(Eighth Modification)

An eighth modification relates to the encoding of plural prediction modes. In the above embodiment, the prediction method of the target block to be encoded (decoded block) is limited to the prediction method according to the present invention. However, it may be adapted so that either one of the conventional block prediction method, which encodes plural motion vectors as described in the background art, and the prediction method according to the invention is appropriately selected on a basis of unit of the target block to be encoded (decoded block).

Figure 25:
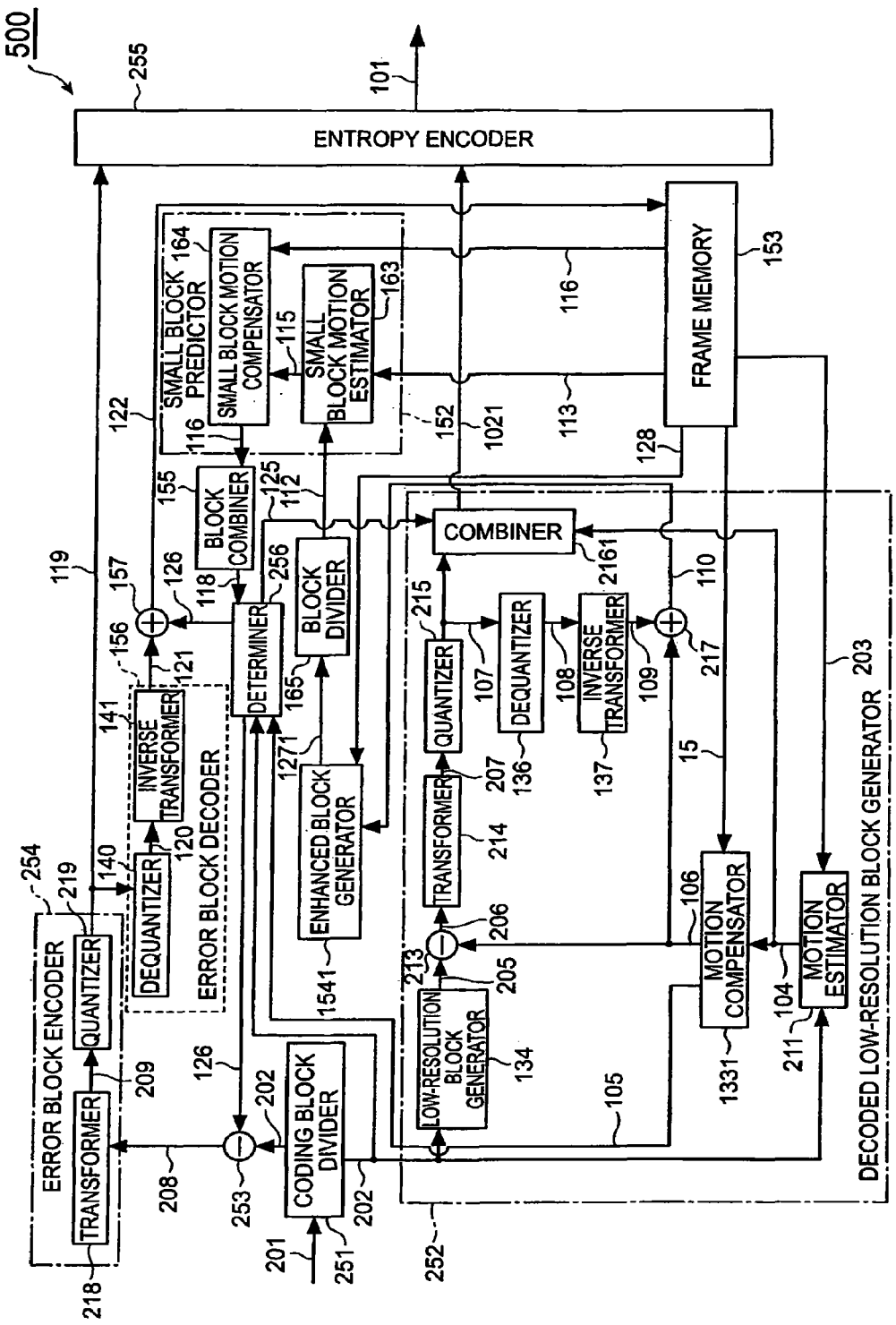
FIG. 25 is a view showing a configuration of a motion image encoding apparatus according to an eighth modification.
Figure 26:
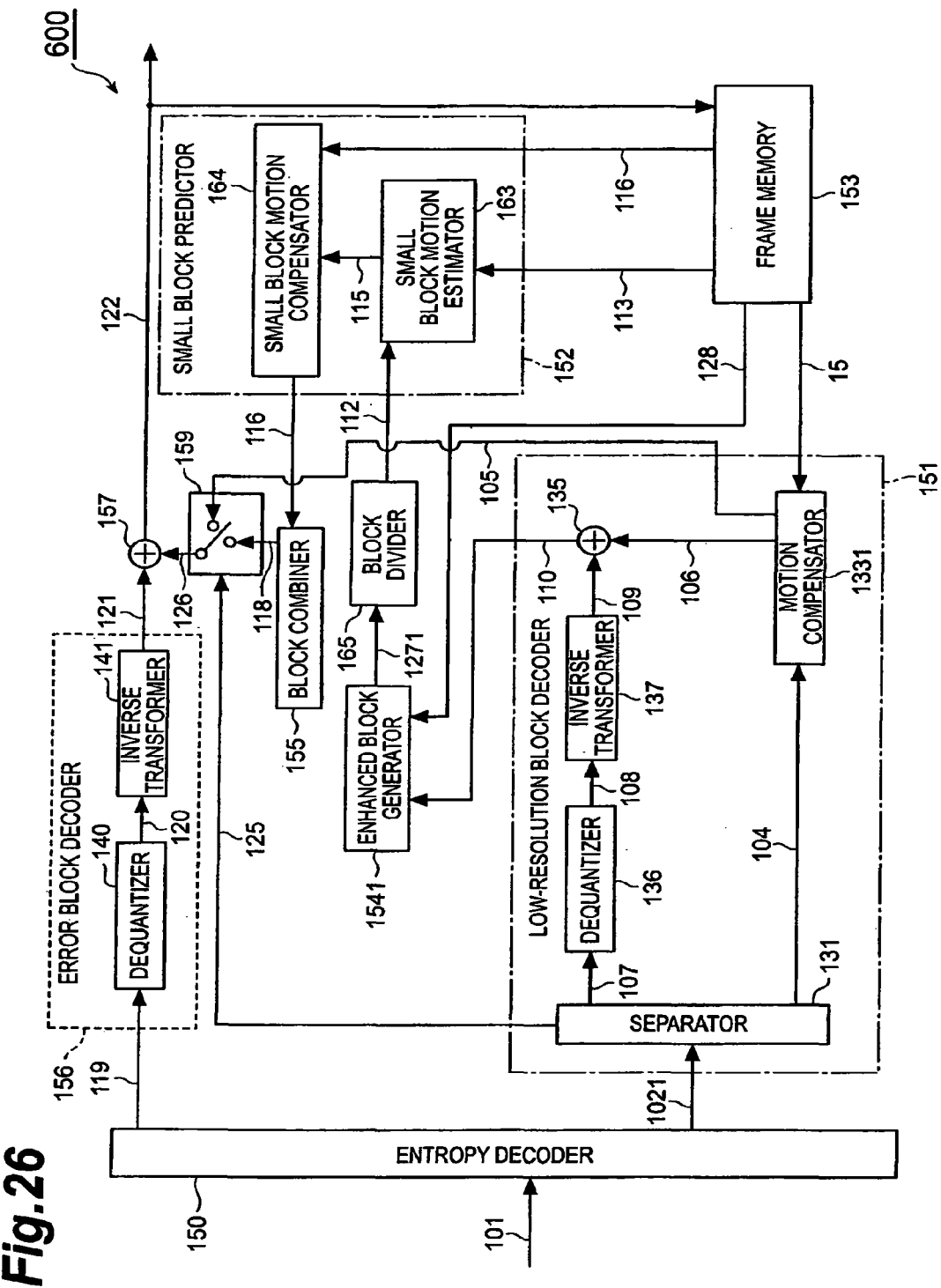
FIG. 26 is a view showing a configuration of a motion image decoding apparatus according to the eighth modification.
Figure 27:
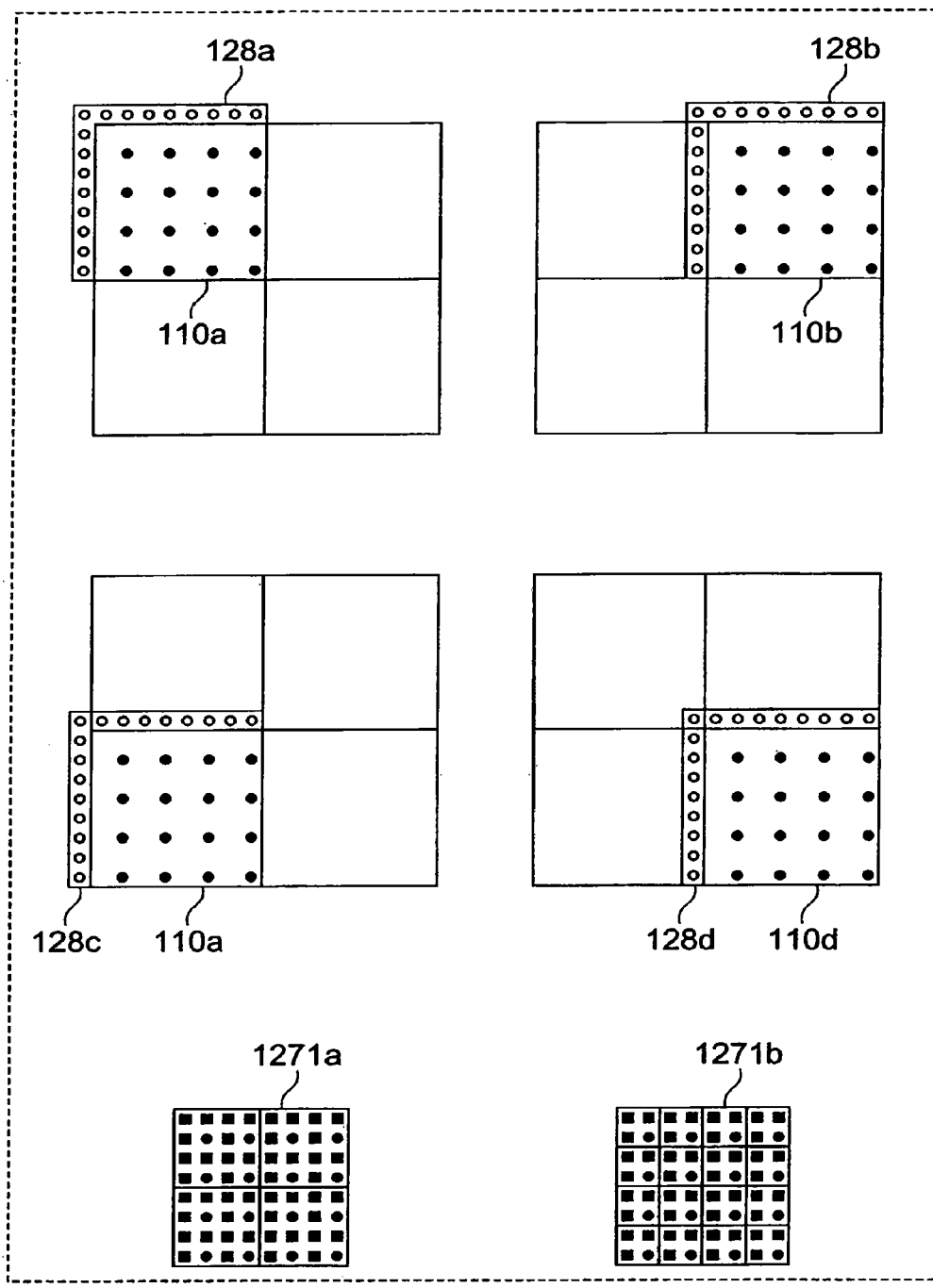
FIG. 27 is a view illustrating enhanced block generating process according to the eighth modification.

Further, in the above prediction method, it is adapted so that all of the pixels within the 16×16 blocks are predicted with the prediction method according to the present invention. However, it may be adapted so as to divide the 16×16 blocks, and on a basis of the divided block, to adaptively switch between the prediction method according to the present invention and an inter-frame prediction using the motion vector for predicting the low-resolution block. FIG. 25 shows an encoding apparatus 500, which divides, for example, 16×16 target blocks to be encoded (decoded block) into four 8×8 blocks and performs adaptive prediction on a basis of 8×8 blocks basis. FIG. 26 shows a decoding apparatus 600 having the same function. FIG. 27 shows decoded low-resolution blocks and enhanced blocks in the eighth modification.

The encoding apparatus 500 shown in FIG. 25 is different from the encoding apparatus 100 shown in FIG. 1 in the following points. Firstly, an enhanced block generator 1541 performs an enhancing process on the decoded low-resolution block by an 8×8 unit basis. That is, the enhanced block generator 1541 enhances the decoded low-resolution block to 8×8 enhanced blocks on a 4×4 unit basis to output to the block divider 165. The enhanced block generator 1541 divides the 8×8 decoded low-resolution blocks 110 into four 4×4 low-resolution blocks 110a, 110b, 110c and 110d as shown in FIG. 27; and combines these blocks with boundary decoded pixel groups 128a to 128d on a 4×4 block basis to enhance to 8×8 enhanced blocks 1271. A block divider 165 divides the 8×8 enhanced blocks into 4×4 small blocks and 2×2 small blocks as shown with block 1271a and block 1271b to input to a small block predictor 152.

Additionally, since decoded pixels are used for the boundary decoded pixel group 128a to 128d, in this adaptive prediction method, an encoding process of the prediction error has to be carried out on an 8×8 basis. In the conventional encoding method, since the encoding process of the prediction error is ordinarily carried out on an 8×8 basis, by only changing the execution unit of the predicting process and the error encoding process, the conventional encoding method is applicable to the above described adaptive prediction method.

Secondly, a determiner 256 selects the prediction method and the prediction block on 8×8 blocks basis. To the determiner 256, the target block to be predicted 202 and 16×16 prediction blocks 105, which are read out from the frame memory 153 by a motion compensator 1331 using the motion vector 104 for predicting low-resolution block, are input. Then, these blocks are divided into four 8×8 target blocks to be encoded and 8×8 prediction blocks, which are candidates of low-resolution prediction block, obtained by dividing the 16×16 prediction blocks into four.

On the other hand, 8×8 prediction blocks 118 generated by the small block prediction method according to the present invention is input to the determiner 256 from a block combiner 155. The determiner 256 calculates the sum of absolute difference values about the target block to be encoded on the two kinds of prediction blocks on 8×8 basis, selects the 8×8 prediction blocks having a smaller value, and combines these 8×8 prediction blocks with prediction block 126 of 16×16 pixels. Then, the selection information 125 of the selected prediction method is outputted to the combiner 2161.

Thirdly, the combiner 2161 combines the selection information 125 with low-resolution block information 1021. In the case that the selection information 125 selects a prediction method using the motion vector 104 for predicting low-resolution block, the information of the corresponding 4×4 blocks region among the decoded low-resolution blocks of 8×8 blocks size is not required. Therefore, in this case, since the quantized transformation coefficients of the corresponding 4×4 low-resolution error blocks results in zero, the combination with the low-resolution block information 1021 is not carried out.

The decoding apparatus 600 shown in FIG. 26 is different from the decoding apparatus 200 shown in FIG. 2 in the following points. Firstly, the enhanced block generator 1541 performs an enhancing process on the decoded low-resolution block by an 8×8 unit basis. Since the method of the above has been described with reference to FIG. 27, detailed description thereof is omitted. At the decoding side also, the decoding process of the corresponding 8×8 prediction error blocks should be carried out to decode the 8×8 decoded blocks at a time point the 8×8 prediction blocks are generated.

Secondly, a switch 159 switches two kinds of prediction methods in accordance with the selection information 125 separated from the low-resolution block information 1021. In the case that the selection information 125 selects a prediction method using the motion vector 104, the information of the corresponding 4×4 blocks region among the 8×8 decoded low-resolution blocks are not included in the low-resolution block information 1021. That is, all quantizing coefficients of the low-resolution error block result in zero. Therefore, in this region, the decoding process of the corresponding 4×4 low-resolution blocks and the small block predicting process according to the present invention are not carried out.

Additionally, in the eighth modification also, the block enhancement method described in the fifth modification is applicable. The block enhancement method may be adaptively switched depending on the prediction method of the adjacent block of the target block to be predicted.

Second Embodiment

Hereinafter, an embodiment according to the present invention will be described with reference to figures.

[Apparatus Configuration]

Figure 28:
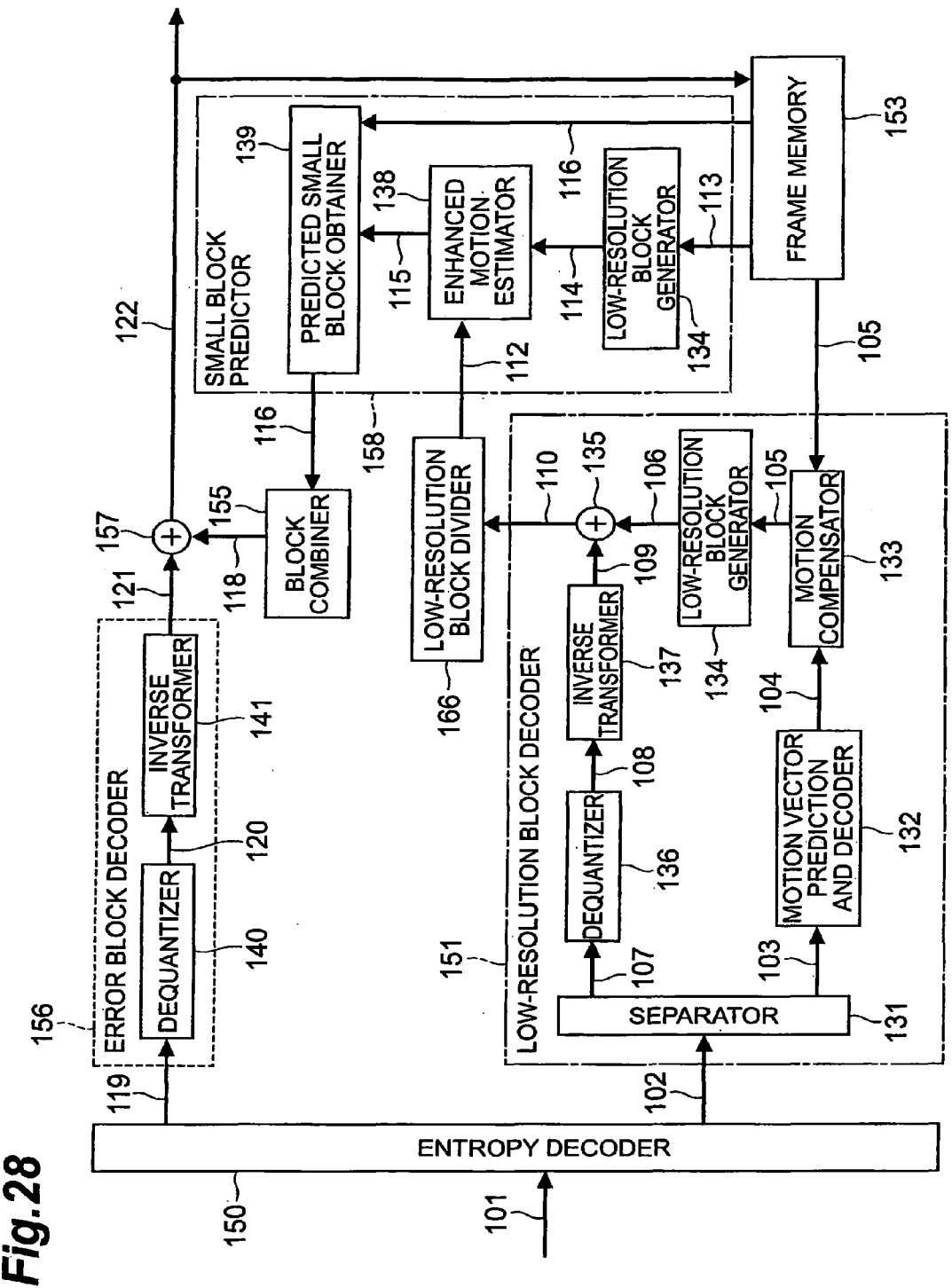
FIG. 28 is a view illustrating a motion image decoding apparatus according to a second embodiment.
Figure 29:
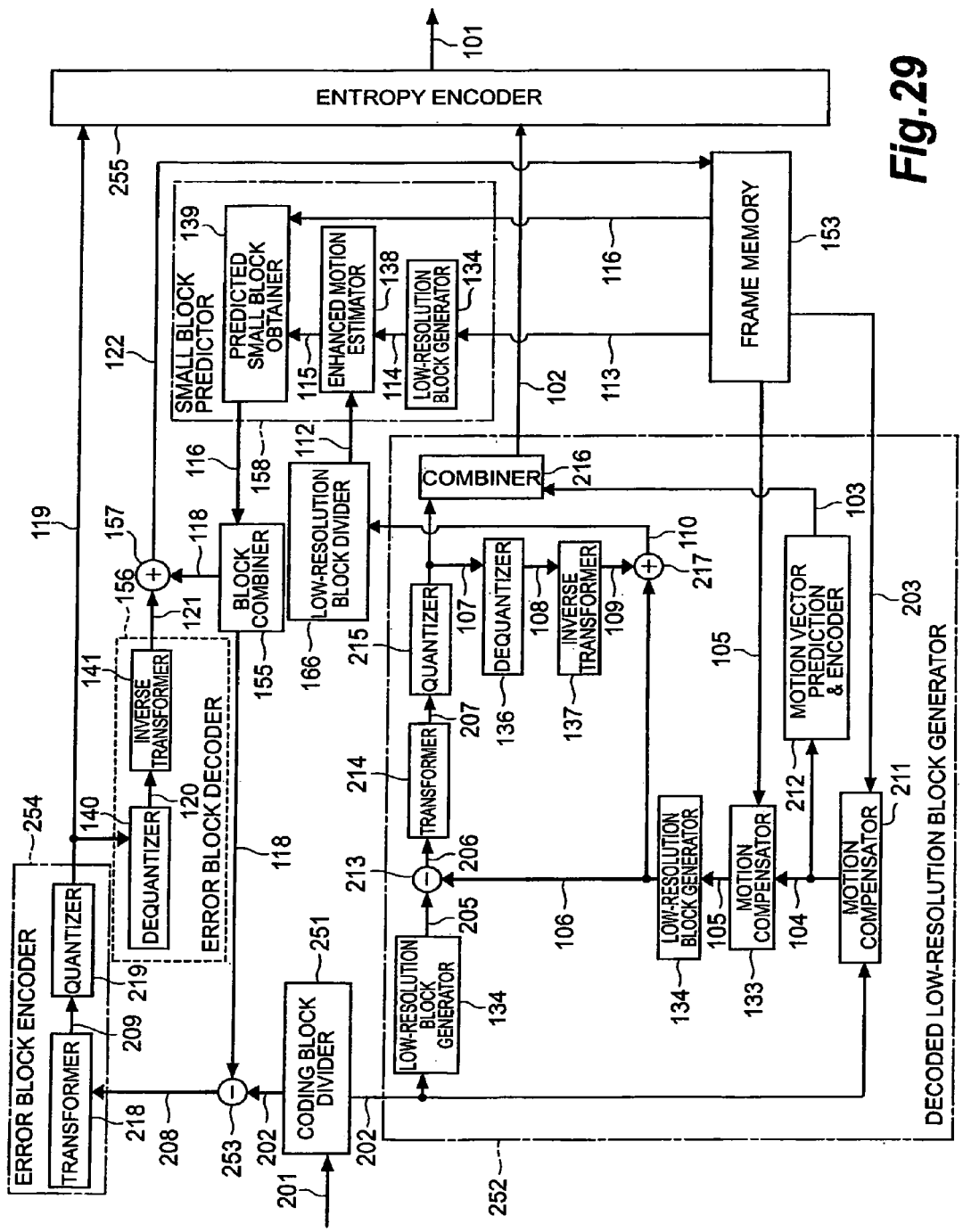
FIG. 29 is a view illustrating a motion image encoding apparatus according to the second embodiment.

FIG. 28 shows the configuration of a motion image decoding apparatus (hereinafter, referred to as "decoding apparatus") for carrying out prediction decoding according to the present invention. FIG. 29 shows the configuration of a motion image encoding apparatus (hereinafter, referred to as "encoding apparatus") for carrying out prediction encoding according to the present invention. Incidentally, in FIGS. 28 and 29, the processors given with the same reference numerals have the same function respectively.

[Configuration of Encoding Apparatus]

An encoding apparatus shown in FIG. 29 is an apparatus, which divides an input frame 201 into 8×8 target blocks to be encoded 202 with a coding block divider 251, and encodes plural target blocks to be encoded 202 obtained by dividing, in a raster scan order. Like the first embodiment, in this embodiment also, since the block size of the target block to be predicted and the block size of the target block to be encoded are identical to each other, the target block to be predicted agrees with the target block to be encoded. By the term "prediction block" is meant a block, which is generated from previously decoded pixels through a predicting process. Incidentally, the target block to be predicted may differ from the target block to be encoded in the block size. First the target block to be encoded 202 is input to a decoded low-resolution block generator 252.

Figure 36:
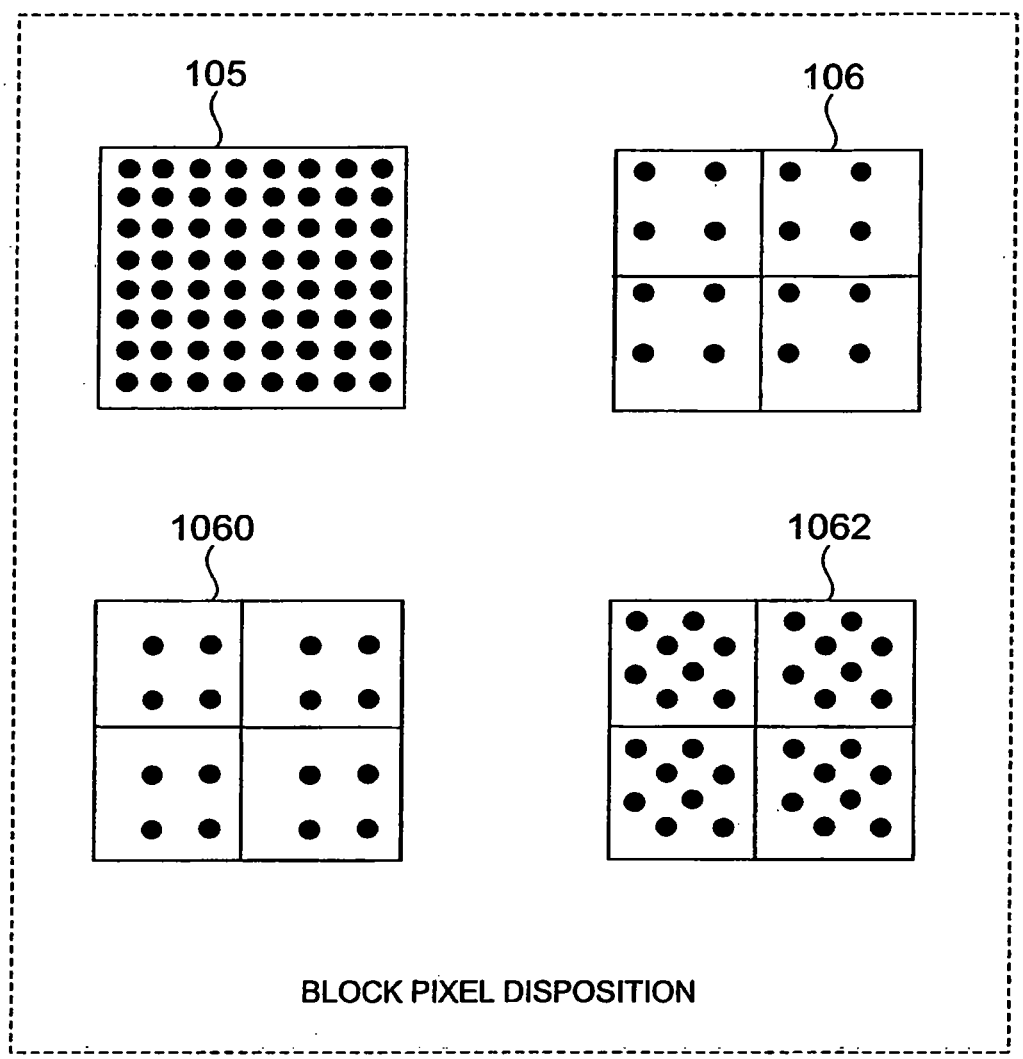
FIG. 36 is a view illustrating a block pixels arrangement.

The decoded low-resolution block generator 252 is a processor, which generates a "decoded low-resolution block 110 with a smaller number of pixels than that of a target block to be encoded (target block to be predicted) 202" and a "low-resolution block information 102." Here, the operation of the decoded low-resolution block generator 252 will be described. The target block to be encoded (target block to be predicted) 202 is input to a motion estimator 211 in a raster scan order. The motion estimator 211 performs a block matching between the input target block to be encoded (target block to be predicted) 202 and plural candidate prediction blocks 203 stored in a frame memory 153 to detect one motion vector 104. A motion vector predictor & encoder 212 inputs the detected motion vector 104 to calculate a difference motion vector 103 that is obtained in such a way that each component is subtracted by the value of each component of the prediction motion vector. The prediction motion vector is calculated in accordance with median prediction (on a component basis) with the motion vectors of the adjacent three blocks located on the left, immediately above and right-upper of the present block respectively (in case of the outside of frame, left-upper) as the candidates. The motion compensator 133 obtains a block 105 corresponding to the motion vector 104 from a decoded frame 520 stored in the frame memory 153. The block 105 is transformed into a low-resolution prediction block 106 in which pixels are extracted every other one line interval in the horizontal and vertical directions by the low-resolution block generator 134 as shown in FIG. 36. Further, likewise the target block to be encoded (target block to be predicted) 202 is also transformed to a low-resolution target block to be encoded (low-resolution target block to be predicted) 205, which have a smaller number of pixels than that of the target block to be encoded (target block to be predicted) 202, by a low-resolution block generator 134. Concerning the respective pixels of the low-resolution target block to be encoded (low-resolution target block to be predicted) 205, a subtracter 213 calculates difference values between the respective pixels and the pixels located at a position that spatially agrees with the low-resolution prediction block 106, to generate a low-resolution error block 206. The transformer 214 performs a 4×4 discrete cosine transform (DCT) on the low-resolution error block 206 to generate transformation coefficients 207 of sixteen low-resolution error blocks. The quantizer 215 quantizes transformation coefficients 207 to generate quantized transformation coefficients 107 of the low-resolution error block. A combiner 216 combines the difference motion vector 103 with the quantized transformation coefficients 107 of the low-resolution error block and outputs the same to entropy encoder 255 as low-resolution block information 102. A dequantizer 136 dequantizes the quantized transformation coefficients 107 to generate dequantized transformation coefficients 108 of the low-resolution error block. An inverse transformer 137 performs an inverse DCT transformation on the dequantized transformation coefficients 108 to generate a decoded low-resolution error block 109. An adder 217 calculates additional values between the pixels located at a position that spatially agrees with decoded low-resolution error block 109 and the respective pixels in the low-resolution prediction block 106, to generate a decoded low-resolution block 110.

Next, the low-resolution block divider 166 divides the decoded low-resolution block 110 into 2×2 low-resolution divided blocks 112 like the blocks 106 shown in FIG. 36. The respective low-resolution divided blocks 112 are input to a small block predictor 158 (corresponding to 152 in FIGS. 1 and 2).

The small block predictor 158 is a processor for generating 4×4 predicted small blocks 116 for each of the low-resolution divided blocks 112 using decoded images stored in the frame memory 153. Since the process of the small block predictor 158 is carried out using the decoded images only as the input, the same process can be carried out also in the decoding apparatus. Here, the operation of the small block predictor 158 is described. The 4×4 blocks 113 (referred to "candidate predicted small block") input to the small block predictor 158 are transformed to a candidate predicted small block 114 with a smaller number of pixels by the low-resolution block generator 134 and outputted to enhanced motion estimator 138. The enhanced motion estimator 138 performs a block matching between the 2×2 low-resolution divided blocks 112 (112a to 112d) and 4 pixels (candidate predicted small block 114) spatially corresponding to 4 pixels in the low-resolution divided block shown in FIG. 35 to detect motion vectors 115 (115a to 115d) for the low-resolution divided block. Here, the estimated difference value is the sum of absolute difference values between the "4 pixels in the low-resolution divided block" and "4 pixels (candidate predicted small blocks 114) spatially corresponding 4 pixels in the low-resolution divided block out of 16 pixels in the 4×4 blocks to be searched (candidate prediction small block 113), (which will be described later in detail with reference to FIG. 32)." Since the estimated difference value, which uses the decoded image only as the input value, can be calculated also in the decoding apparatus, the decoding apparatus also can detect the same motion vectors as those in the encoding apparatus. A predicted small block obtainer 139 obtains 4×4 predicted small blocks 116 (116a to 116d) corresponding to the motion vectors 115 (115a to 115d) in the low-resolution divided blocks from the decoded frames 520 in the frame memory 153.

Figure 35:
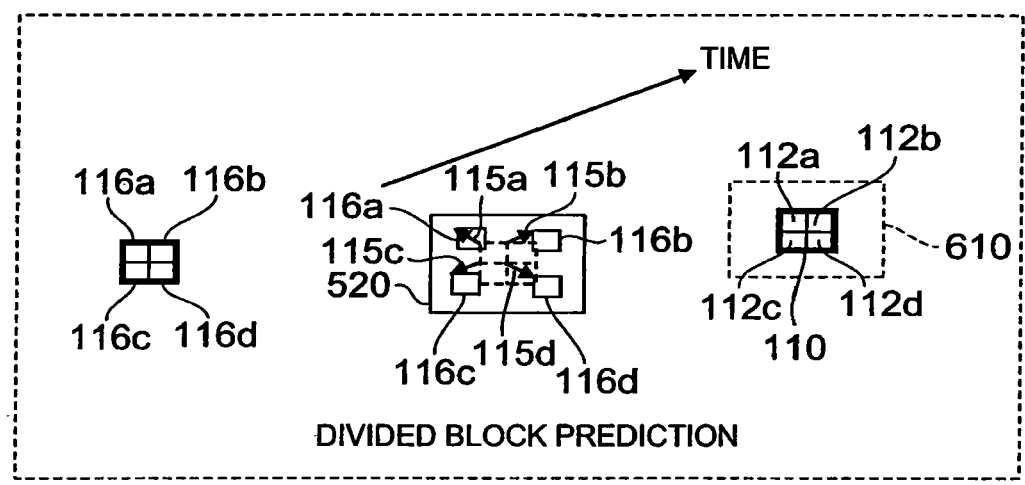
FIG. 35 is a view illustrating a divided block predicting process.

Next, the block combiner 155 combines four predicted small blocks 116a to 116d as shown on the left in FIG. 35 to generate an 8×8 prediction blocks 118 (FIG. 29). The subtracter 253 calculates difference values between the pixels located at a position that spatially agrees with the prediction block 118 and the pixels in the target block to be encoded 202 to generate an error block 208.

An error block encoder 254 is a processor for encoding the error block 208 and generating error block information 119 to output the same to the entropy encoder 255. Here, the operation of the error block encoder 254 is described. A transformer 218 performs an 8×8 discrete cosine transform (DCT) on the error block 208 to generate sixty-four transformation coefficients 209. The quantizer 219 quantizes the transformation coefficients 209 to generate the error block information 119 (quantized transformation coefficients).

The error block decoder 156 is a processor for decoding the error block information 119 to generate a decoded error block 121. Here, the operation of the error block decoder 156 will be described. A dequantizer 140 dequantizes the error block information 119 to generate a dequantized transformation coefficient 120. The inverse transformer 141 performs an inverse DCT transformation on the dequantized transformation coefficient 120 to generate the decoded error block 121.

Next, concerning the respective pixels in the prediction block 118, an adder 157 calculates additional values between the pixels located at a position that spatially agrees with the decoded error block 121 and the respective pixels to generate a decoded block 122. The generated decoded block 122 is stored in the present decoded frame 610 within the frame memory 153. Finally, the entropy encoder 255 performs entropy encoding on the low-resolution block information 102 and the error block information 119 to be multiplexed into encoded data 101.

[Configuration of Decoding Apparatus]

A decoding apparatus shown in FIG. 28 is an apparatus for decoding encoded data 101 to reproduce an 8×8 decoded blocks 122 in a raster scan order. First the encoded data 101 corresponding to one 8×8 decoded blocks is input to an entropy decoder 150. The entropy decoder 150 performs entropy decoding to generate low-resolution block information 102 and error block information 119.

A low-resolution block decoder 151 is a processor for decoding the low-resolution block information 102 to generate a decoded low-resolution block 110 with a smaller number of pixels than that of the decoded block. Here, the operation of the low-resolution block decoder 151 will be described. A separator 131 separates the low-resolution block information 102 into a difference motion vector 103 and low-resolution error block information 107 (quantized transformation coefficient of the low-resolution error block). A motion vector predictor and decoder 132 adds the value of the respective components of the difference motion vector 103 to the value of the respective components of the prediction motion vector, thereby calculates the motion vectors 104. The prediction motion vector is calculated by carrying out a center value prediction (on each component) with motion vectors of adjacent three blocks located on the left, immediately above and upper-left of the present block (in the case outside of the frame, left-upper) as the candidates. A motion compensator 133 obtains a block 105 corresponding to the motion vector 104 from the decoded frame 520 stored in the frame memory 153. The block 105 is transformed into a low-resolution prediction block 106 in which pixels are extracted every other one line interval in the horizontal and vertical directions as shown in FIG. 36 by the low-resolution block generator 134. The dequantizer 136 dequantizes the quantized transformation coefficient 107 of the low-resolution error block to generate dequantized transformation coefficient 108 of the low-resolution error block. The inverse transformer 137 performs an inverse DCT transformation on the dequantized transformation coefficient 108 to generate the decoded low-resolution error block 109. With respect to the respective pixels of the low-resolution prediction block 106, an adder 135 calculates additional values between the pixels located at a position that spatially agree with the decoded low-resolution error block 109 and the respective pixels to generate the decoded low-resolution block 110.

Next, the low-resolution block divider 166 divides the decoded low-resolution block 110 into 2×2 low-resolution divided blocks 112 like the blocks 106 shown in FIG. 36. The respective low-resolution divided blocks 112 are input to the small block predictor 158.

The small block predictor 158 (corresponding to 152 in FIGS. 1 and 2) is a processor for generating 4×4 predicted small blocks 116 for each low-resolution divided block 112 using a decoded image stored in the frame memory 153. Here, the operation of the small block predictor 158 will be described. The enhanced motion estimator 138 performs a block matching between the 2×2 low-resolution divided blocks 112 (112a to 112d) shown in FIG. 35 and 4 pixels (candidate predicted small blocks 114) spatially corresponding to the 4 pixels in the low-resolution divided block to detect motion vectors 115 (115a to 115d) of the low-resolution divided blocks. Here, the estimated difference value is the sum of absolute difference values between the "4 pixels of the low-resolution divided block" and the "4 pixels (candidate predicted small block 114) spatially corresponding to the 4 pixels in the low-resolution divided block out of 16 pixels in the 4×4 blocks (candidate prediction small blocks 113) to be searched (detailed description will be given with reference to FIG. 32)." Since the estimated difference value using a decoded image only as the input value as described above can be calculated in the decoding apparatus also, the same motion vector as that in the encoding apparatus can be detected. The predicted small block obtainer 139 obtains the 4×4 predicted small blocks 116 (116a to 116d) corresponding to the motion vectors 115 (115a to 115d) of the low-resolution divided block from the decoded frame 520 in the frame memory 153.

Next, the block combiner 155 combines four predicted small blocks 116a to 116d as shown on the left in FIG. 35 to generate an 8×8 prediction blocks 118 (FIG. 28).

The error block decoder 156 is a processor for decoding the error block information 119 (quantized transformation coefficient) to generate the decoded error block 121. Here, the operation of the error block decoder 156 will be described. The dequantizer 140 dequantizes the quantized transformation coefficient 119 to generate the dequantized transformation coefficient 120. The inverse transformer 141 performs an inverse DCT transformation on the dequantized transformation coefficient 120 to generate decoded error block 121.

Next, concerning the respective pixels in the prediction block 118, the adder 157 calculates additional values between the pixels at a position that spatially agrees with the decoded error block 121 and the respective pixels to generate a decoded block 122. The decoded block 122 is stored in the present decoded frame 610 in the frame memory 153.

[Description of Process Flow]

Figure 30:
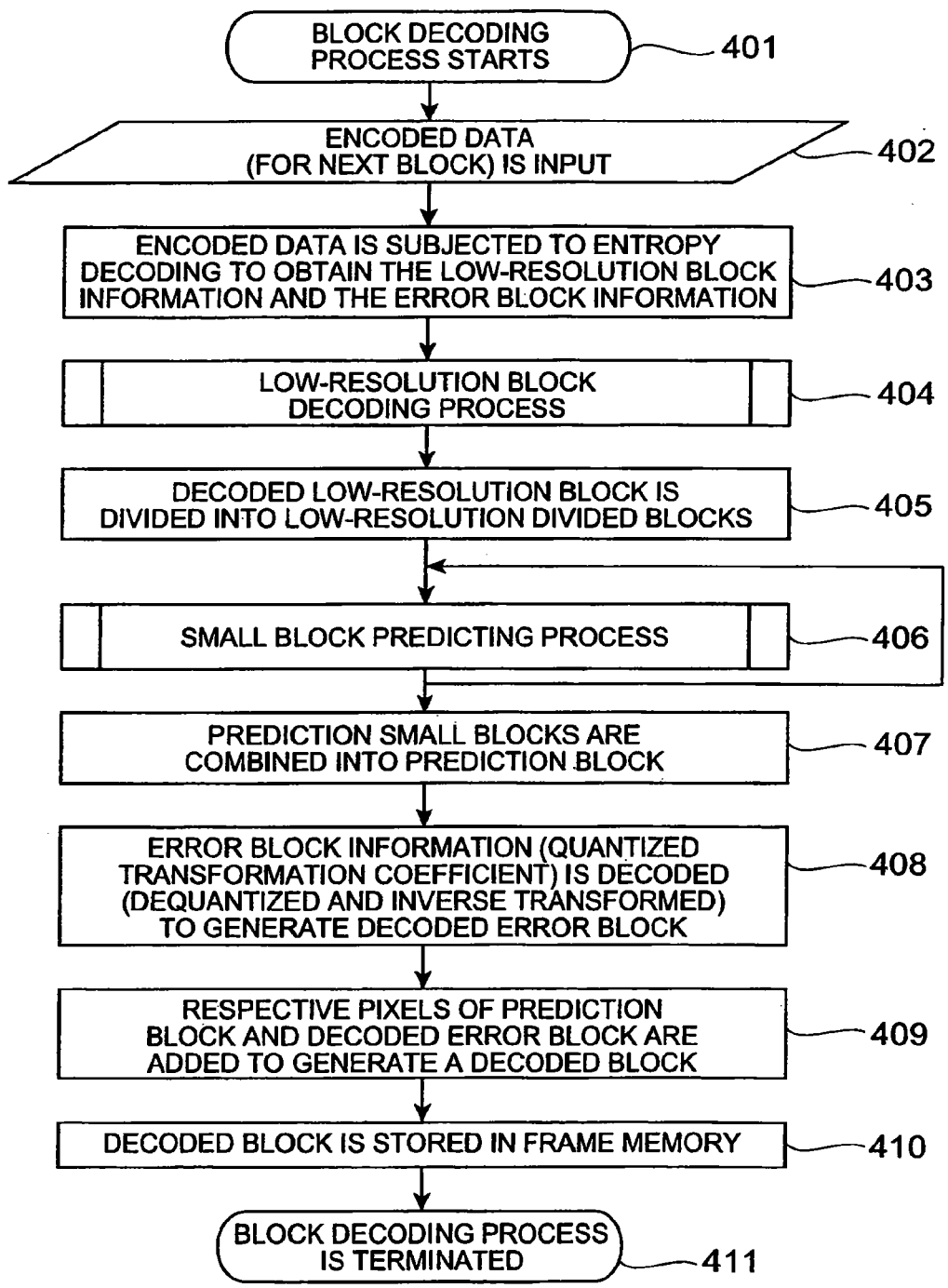
FIG. 30 is a view showing a flow of a block decoding process according to the second embodiment.
Figure 33:
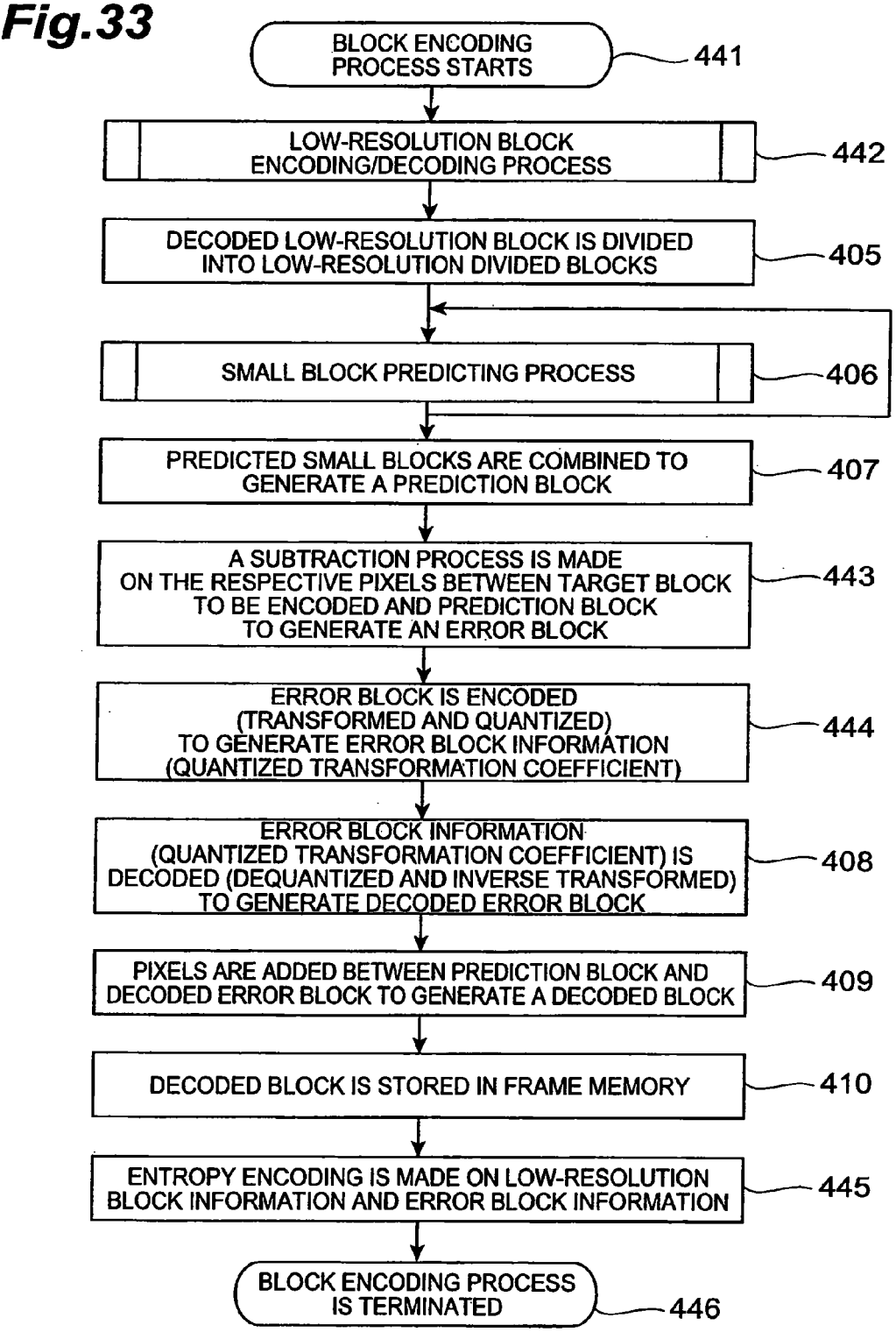
FIG. 33 is a view showing a flow of a block encoding process according to the second embodiment.

FIG. 30 shows a flow of the motion image decoding process for carrying out the prediction decoding according to the present invention. FIG. 33 shows a flow of the motion image encoding process for carrying out the prediction encoding according to the present invention. Incidentally, in FIGS. 30 and 33, the processes given with the same reference numeral provide the same processing result.

[Flow of the Motion Image Decoding Process]

Referring to FIG. 30, the flow of the motion image decoding process for carrying out the prediction encoding according to the present invention will be described. When the decoding process of a next block to be decoded (process 401) is started, first, in the process 402, encoded data for one block required for decoding of the next decoded block is input to the entropy decoder 150 in FIG. 28. The input encoded data is subjected to entropy decoding by the entropy decoder 150 to obtain the low-resolution block information and the error block information in the process 403. The low-resolution block information out of the above information is subjected to a low-resolution block decoding process by the low-resolution block decoder 151 to generate the decoded low-resolution block in the process 404.

Figure 31:
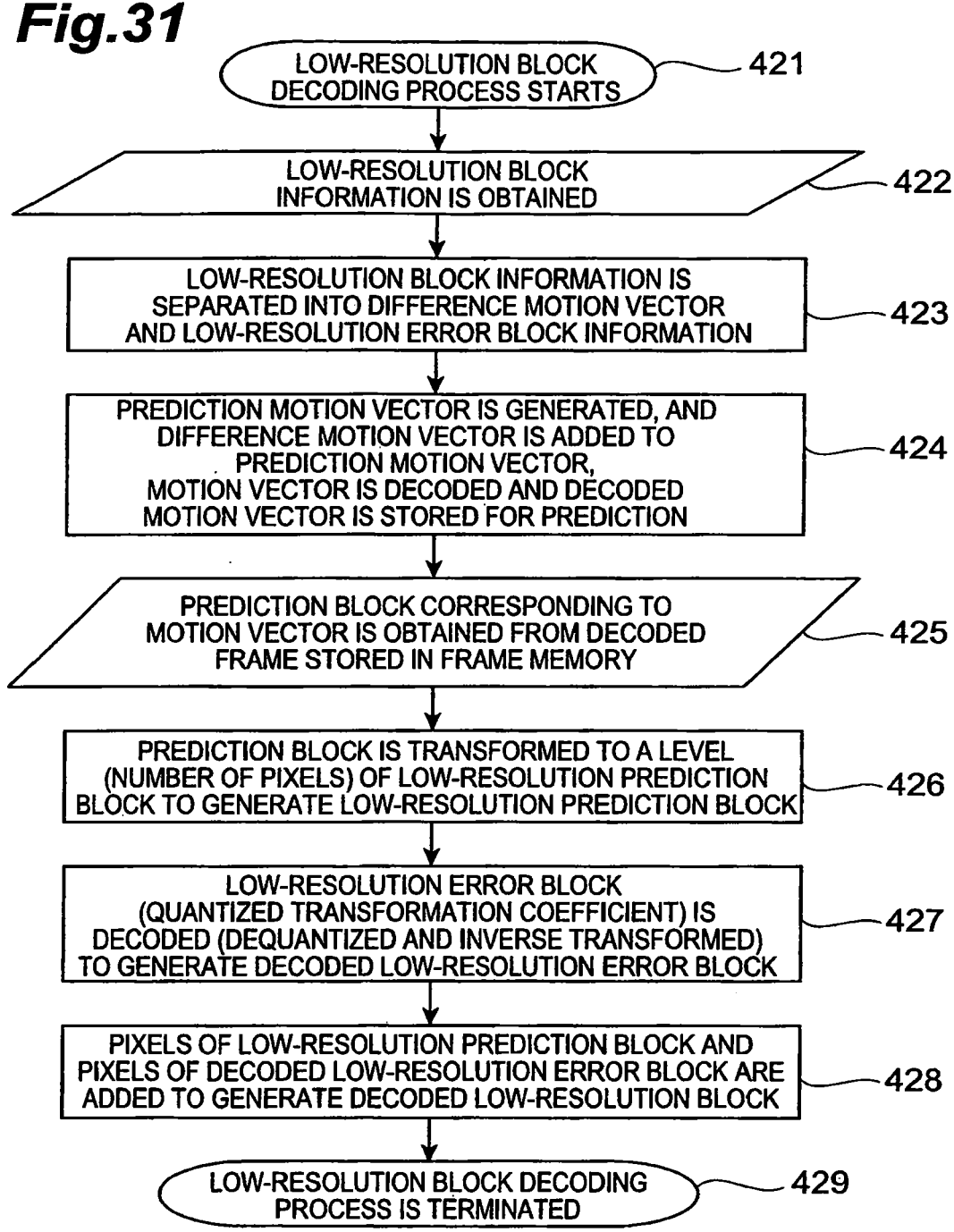
FIG. 31 is a view showing a flow of a low-resolution block decoding process according to the second embodiment.

Here, referring to FIG. 31, the low-resolution block decoding process flow in the process 404 will be described. When the low-resolution block decoding process (process 421) is started, first the separator 131 obtains the low-resolution block information (process 422), the low-resolution block information is separated into the difference motion vector and the low-resolution error block information (process 423). In the process 424, the motion vector predictor and decoder 132 adds values of the respective components of the prediction motion vector to values of the respective components of the difference motion vector 103; whereby, the motion vector 104 is calculated (decoded). The prediction motion vector is calculated depending on a median prediction (on each component) with the motion vectors of the adjacent three blocks located, for example, on the left, immediately above and right-upper (left-upper in the case of outside of the frame) as the candidates. The obtained motion vector is stored for following motion vector prediction process for decoding of the decoded block.

In the next process 425, the motion compensator 133 obtains a block 105 corresponding to the motion vector 104 from the decoded frame 520 stored in the frame memory 153. In the next process 426, the obtained block 105 is transformed into the low-resolution prediction block 106, in which pixels are extracted every other one line interval in the vertical and horizontal directions as shown in FIG. 36, by the low-resolution block generator 134.

In the next process 427, the dequantizer 136 dequantizes the quantized transformation coefficient 107 of the low-resolution error block to generate dequantized transformation coefficient 108 of the low-resolution error block. Then, the inverse transformer 137 performs an inverse DCT transformation on the dequantized transformation coefficient 108 to generate the decoded low-resolution error block 109. Then, in the process 428, concerning the respective pixels in the low-resolution prediction block 106, the adder 135 calculates additional values between the pixels located at position that spatially agree with the decoded low-resolution error block 109 and the respective pixels to generate decoded low-resolution block 110, and the low-resolution block decoding process is terminated (process 429).

Returning to FIG. 30, in the process 405, the low-resolution block divider 166 divides the decoded low-resolution block 110 into the 2×2 low-resolution divided blocks 112. In the process 406, the small block predictor 158 performs a small block predicting process on the four low-resolution divided blocks 112.

Figure 32:
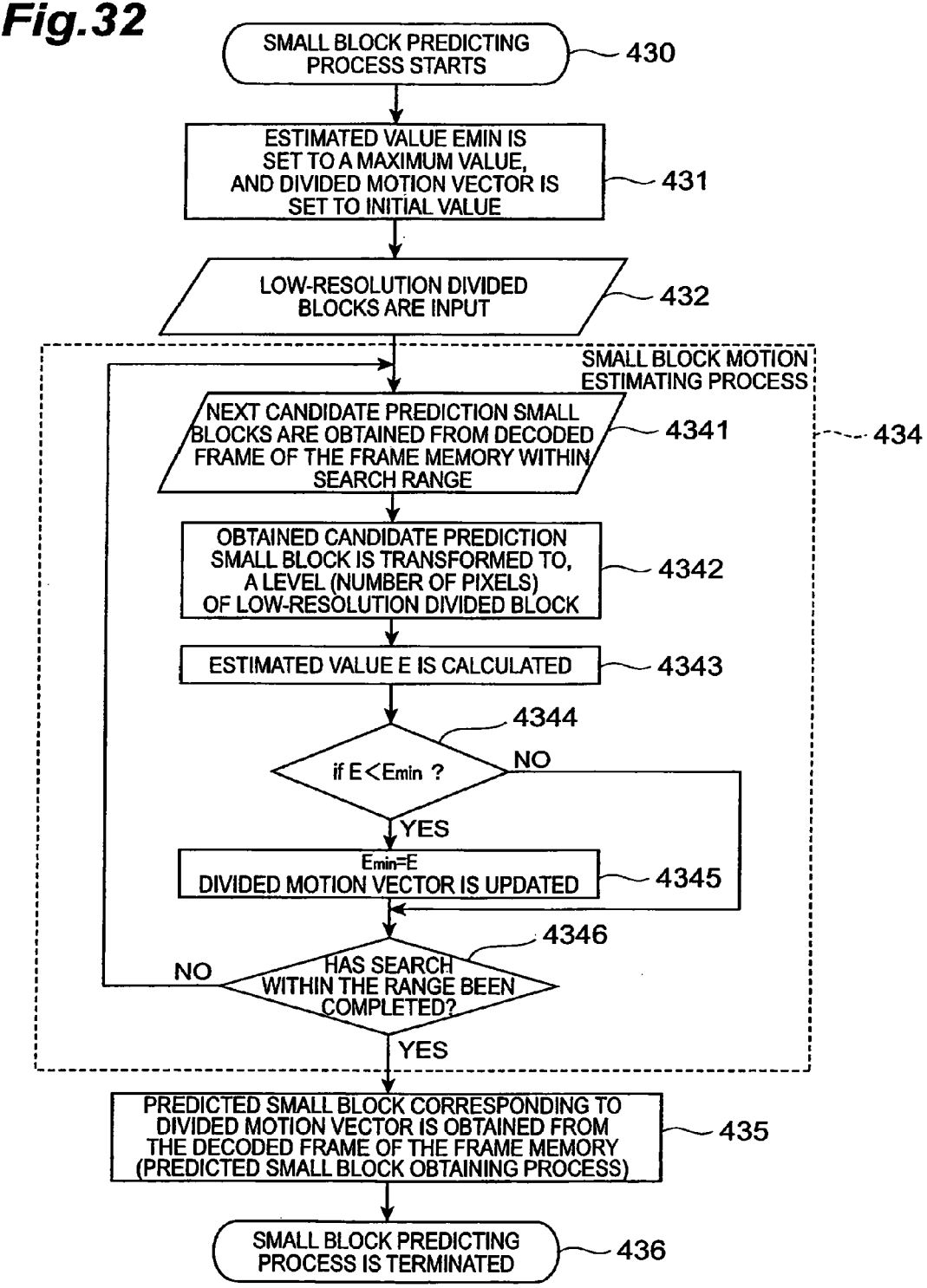
FIG. 32 is a view showing a flow of a small block predicting process according to the second embodiment.

Here, referring to FIG. 32, the small block predicting process flow will be described. When the small block predicting process (process 430) is started, first, in the process 431, estimated value Emin is set to a maximum integer value as the initial value; and the divided motion vector is set to 0 vector. Next, in the process 432, the low-resolution divided blocks 112 are input to the small block predictor 158. Succeedingly, in the enhanced motion estimating process of the process 434, the enhanced motion estimator 138 detects a motion vector of the low-resolution divided block.

In the enhanced motion estimating process, candidate prediction small blocks are extracted in a spiral order from the center (0 vector) of search range (±16 pixels in the vertical and horizontal direction) in the decoded frame in the frame memory 153, and a predicted small block position with minimum estimated value Emin is thus detected. More specifically, in the process 4341, a next candidate predicted small block is obtained from the decoded frame in the frame memory 153. In the process 4342, the obtained candidate prediction small block is transformed to, for example, the low-resolution prediction block like the block 106 in FIG. 36 with level (number of pixels) thereof. In the process 4343, an estimated value E (sum of absolute values of difference between "4 pixels of the low-resolution divided block" and "4 pixels spatially corresponding to 4 pixels in the low-resolution divided block out of the 16 pixels of 4×4 blocks to be searched") is calculated. In the process 4344, it is determined whether or not the estimated value E is smaller than the estimated value Emin. Here, if the estimated value E is smaller than the estimated value Emin, in the process 4345, the estimated value Emin is updated to the estimated value E, and the divided motion vector is updated to the divided motion vector corresponding to the estimated value E. After that, the processes 4341 to 4345 are repeated until the search of all candidate prediction small blocks in the search range is completed. Finally, in the process 435, the predicted small block obtainer 139 obtains the predicted small block corresponding to the divided motion vector of which estimated value E is the minimum from the decoded frame in the frame memory 153; then the small block predicting process is terminated (process 436). Through the above small block predicting process, four predicted small blocks are generated.

Returning to FIG. 30, the four predicted small blocks generated in the process 406 are combined into a prediction block by the block combiner 155 in the process 407. In the next process 408, the error block decoder 156 decodes (dequantizes and inverse transforms) the error block information (quantized transformation coefficient) to generate a decoded error block. In the next process 409, the adder 157 adds the respective pixels of the prediction block and the decoded error block to generate a decoded block. Finally, in the process 410, the decoded block is stored in the present decoded frame in the frame memory 153, and the block decoding process is terminated (process 411).

[Flow of Motion Image Encoding Process]

Next, referring to FIG. 33, the flow of the encoding process of a target block to be encoded for carrying out the prediction encoding according to the present invention will be described. First, when the coding block divider 251 shown in FIG. 29 divides an input frame 201, the target block to be encoded 202 is obtained. When the encoding process of the target block to be encoded 202 (process 441) is started, the decoded low-resolution block generator 252 performs a low-resolution block encoding/decoding process shown in FIG. 34 in the process 442.

Figure 34:
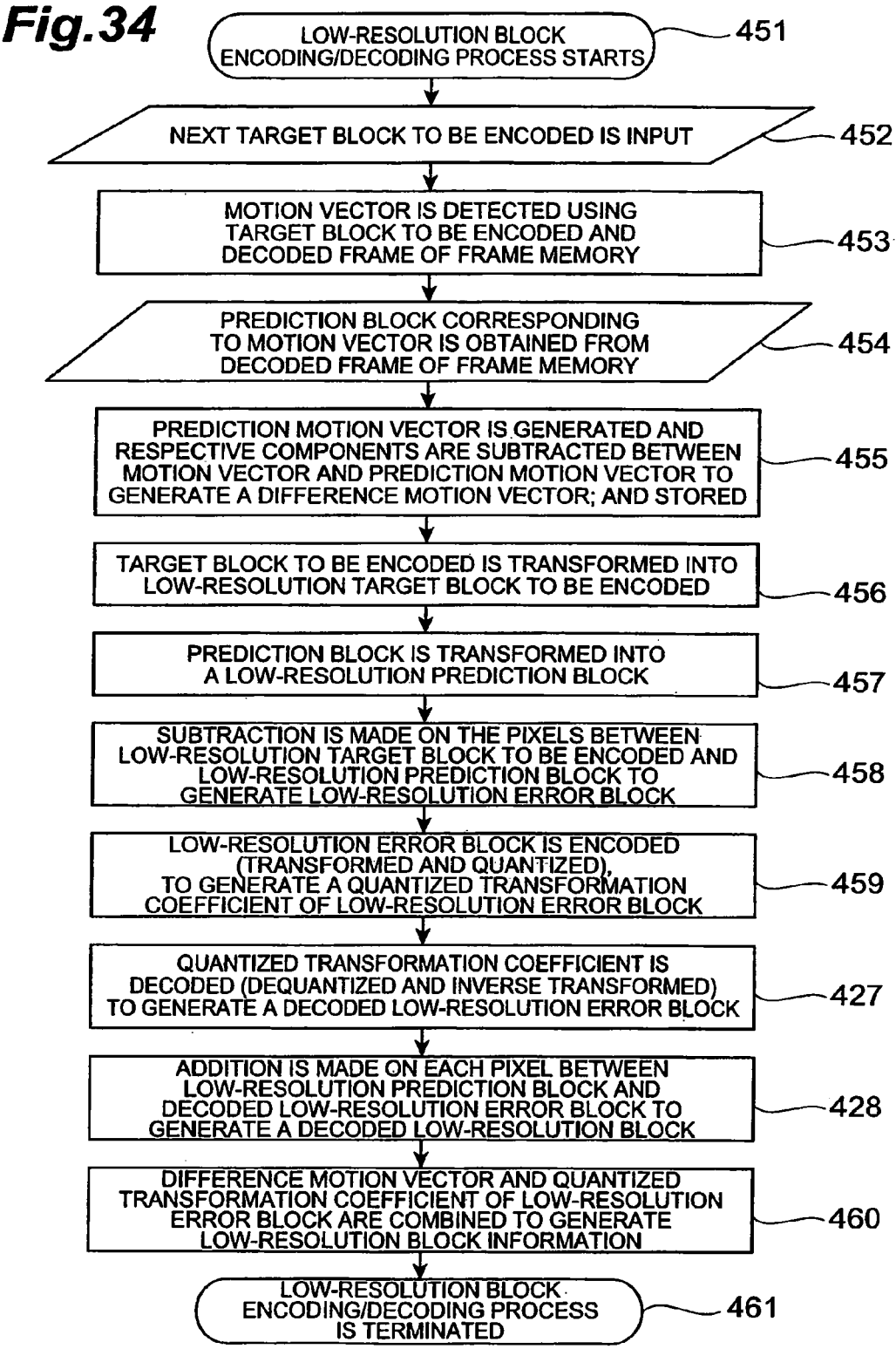
FIG. 34 is a view showing a flow of a low-resolution block encoding/decoding process according to the second embodiment.

Hereinafter, referring to FIG. 34, the low-resolution block encoding/decoding process will be described. When the low-resolution block encoding/decoding process (process 451) is started, a next target block to be encoded is input in the process 452. In the process 453, a motion vector is detected using the target block to be encoded and the decoded frame of the frame memory. Incidentally, since the detecting method of the motion vector has been described in the configuration description of the decoded low-resolution block generator 252 in FIG. 29, the description thereof is omitted. In the next process 454, a block corresponding to the motion vector is obtained from the decoded frame of the frame memory. In the next process 455, after the prediction motion vector is generated, a subtraction process is made on the respective components between the motion vector and the prediction motion vector to generate a difference motion vector. The motion vector and the generated difference motion vector are stored for the following prediction of the motion vector in the target block to be encoded. Incidentally, since the generating method of the prediction motion vector has been described in the configuration description of the motion vector predictor & encoder 212 in FIG. 29, the description thereof is omitted here. In the next process 456, the target block to be encoded (target block to be predicted) is transformed into a low-resolution target block to be encoded (low-resolution target block to be predicted) like, for example, the block 106 in FIG. 36. Further, in the process 457, the block corresponding to the motion vector is transformed into a low-resolution prediction block like the above described target block to be encoded (target block to be predicted).

In the process 458, a subtraction is made on the respective pixels between the low-resolution target block to be encoded (low-resolution target block to be predicted) and the low-resolution prediction block to generate a low-resolution error block. In the next process 459, the low-resolution error block is encoded (transformed and quantized), to generate a quantized transformation coefficient of the low-resolution error block. In the next process 427, the quantized transformation coefficient is decoded (dequantized and inverse transformed) to generate a decoded low-resolution error block. In the next process 428, an addition is made on respective pixels between the low-resolution prediction block and the decoded low-resolution error block to generate a decoded low-resolution block. Finally, in the process 460 the difference motion vector and the quantized transformation coefficient are combined to generate low-resolution block information, and the low-resolution block encoding/decoding process is terminated (process 461).

Returning to FIG. 33, in the process 405, the low-resolution block divider 166 divides the generated decoded low-resolution block into low-resolution divided blocks. In the process 406, the small block predictor 158 performs a small block predicting process on the divided low-resolution divided block to generate a predicted small block. Incidentally, since the small block predicting process (FIG. 32) has been described, the description thereof is omitted.

In the process 407, the block combiner 155 combines the generated predicted small block into a prediction block. In the next process 443, the subtracter 253 performs a subtraction process on the respective pixels between the target block to be encoded and the prediction block to generate an error block. In the next process 444, the error block encoder 254 encodes (transforms and quantizes) the error block to generate error block information (quantized transformation coefficient). In the next process 408, the error block decoder 156 decodes (dequantizes and inverse transforms) the error block information (quantized transformation coefficient) to generate a decoded error block. In the next process 409, the adder 157 performs addition of the respective pixels between the prediction block and the decoded error block to generate a decoded block. After the generated decoded block is stored in the present decoded frame of the frame memory 153 in the process 410, in the process 445, the entropy encoder 255 performs entropy encoding on the low-resolution block information and the error block information, and the block encoding process is terminated (process 446).

[Configuration Example of Computer System]

FIG. 16 is a view illustrating a computer system for carrying out the image decoding process of the above embodiment using a recording medium such as a flexible disk or the like storing a motion image encoding program on the image encoding process and a motion image decoding program on the image decoding process.

FIG. 16(b) shows an appearance viewed from the front of a flexible disk, a sectional structure thereof and a flexible disk. FIG. 16(a) shows an example of a physical format of the flexible disk as the recording medium body. A flexible disk FD is contained within a case F, on the surface of the disk, plural tracks Tr are formed concentrically from the periphery toward the inside thereof, and each of the tracks is divided into 16 sectors Se in the angular direction. The above-described programs are stored as the data in the regions allotted on the flexible disk FD. Therefore, in the flexible disk storing the program, data as the program are recorded in the allotted regions on the flexible disk FD.

Also, FIG. 16(c) shows a configuration for recording and reproducing the program on the flexible disk FD. When recording the program on the flexible disk FD, the data as the program are written from the computer system Cs via a flexible disk drive. When establishing the encoding apparatus or the decoding apparatus in the computer system in accordance with the program in the flexible disk FD, the flexible disk drive FDD reads and transfers the program from the flexible disk FD to the computer system.

Additionally, in the above description, the description has been made using a flexible disk as the data-recording medium. An optical disk also is applicable. Additionally, the recording medium is not limited to the above, but any of IC card, ROM cassette, and the like, which are capable of recording the program, is also applicable. As the computer, a DVD player, set-top box, mobile phone and the like, which are equipped with a CPU to execute process and control using software, are included.

Next, description will be made about the configuration of the motion image decoding program and the motion image encoding program.

Figure 37:
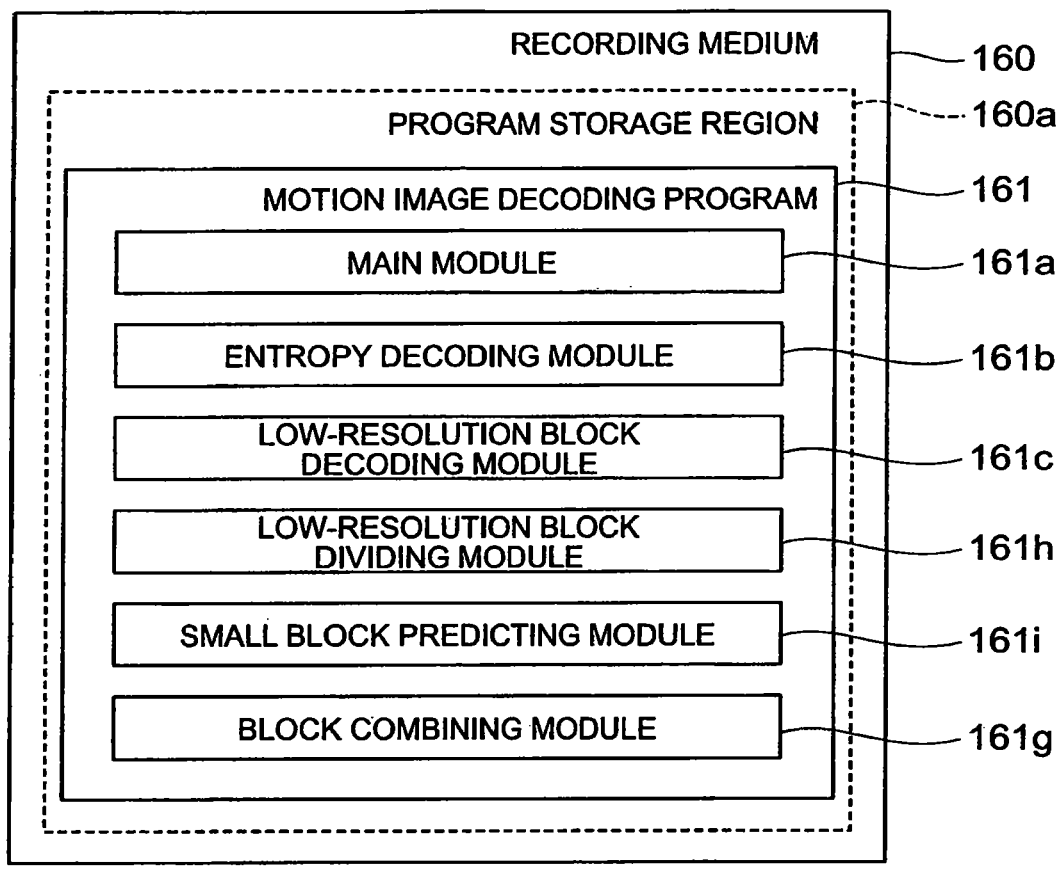
FIG. 37 is a configuration view of a motion image decoding program according to the second embodiment.

As shown in FIG. 37, a motion image decoding program 161 is stored in a program storage region 160a formed on a recording medium 160. The motion image decoding program 161 is constituted by including: a main module 161a for totally controlling the motion image decoding process; an entropy decoding module 161b for executing the operation of the entropy decoder 150 shown in FIG. 28; a low-resolution block decoding module 161c for executing the operation of the low-resolution block decoder 151 shown in FIG. 28; a low-resolution block dividing module 161h for executing the operation of the low-resolution block divider 166 shown in FIG. 28; a small block predicting module 161i for executing the operation of the small block predictor 158 in FIG. 28; and a block combining module 161g for executing the operation of the block combiner 155 shown in FIG. 28.

Figure 38:
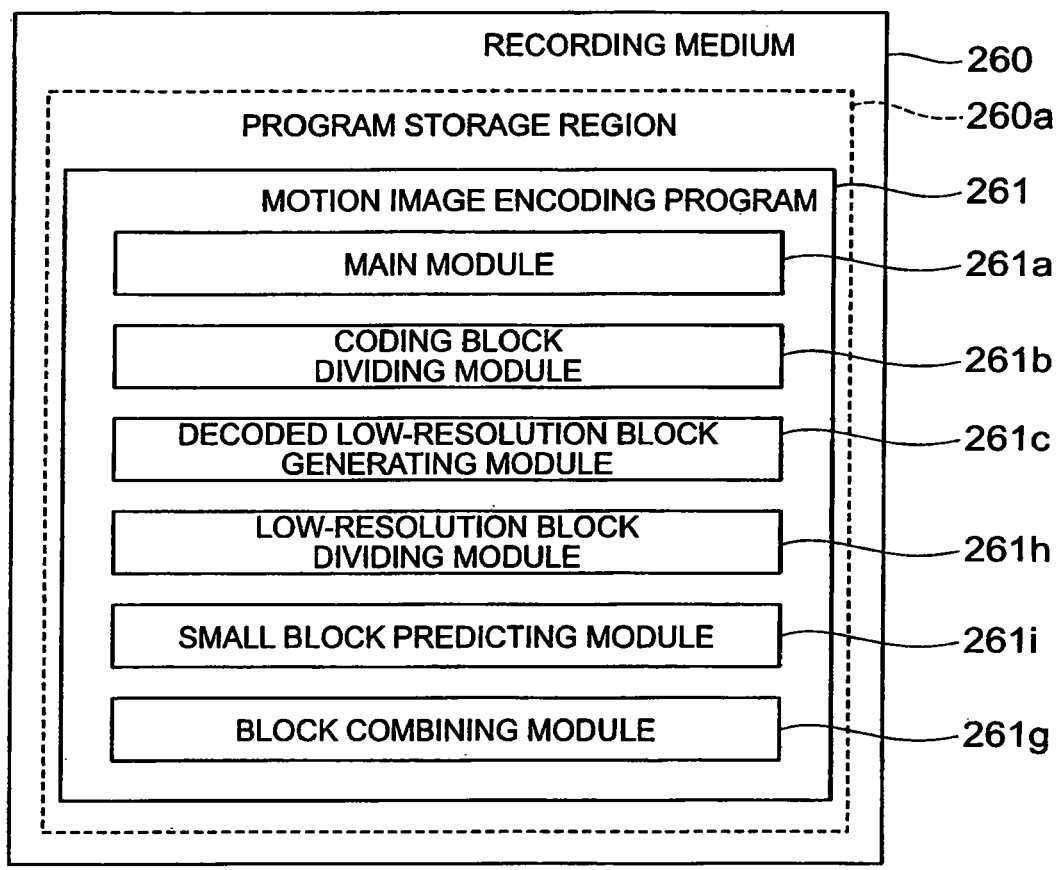
FIG. 38 is a configuration view of a motion image encoding program according to the second embodiment.

As show in FIG. 38, the motion image encoding program 261 is stored in a program storage region 260a formed on a recording medium 260. The motion image encoding program 261 is constituted by including: a main module 261a for totally controlling the motion image encoding process; a coding block dividing module 261b for executing the operation of the coding block divider 251 shown in FIG. 29; a decoded low-resolution block generating module 261c for executing the operation of the decoded low-resolution block generator 252 shown in FIG. 29; a low-resolution block dividing module 261h for executing the operation of the low-resolution block divider 166 shown in FIG. 29; a small block predicting module 261i for executing the operation of the small block predictor 158 shown in FIG. 29; and a block combining module 261g for executing the operation of the block combiner 155 shown in FIG. 29.

Additionally, the above motion image decoding program 161 may be configured such that a part or all thereof is transmitted via a transmission medium such as a communication line or the like, received by another equipment and recorded therein (including installation). Likewise, the motion image encoding program 261 also may be configured such that a part or all thereof is transmitted via a transmission medium such as a communication line or the like, received by another equipment and recorded therein (including installation).

[Description of Various Modifications]

The embodiments of the present invention have been described above. However, the following modifications are possible and any of the modifications are included in the present invention.

(1) Modification Regarding Prediction Method

The above description of the prediction method has been made while being limited to the prediction of the time direction. However, the same method is applicable to the prediction of the space direction using a target block to be encoded (target block to be predicted) or a decoded image, which has been decoded in the same frame as the decoded block. The following cases are also included in the present invention. That is, there is determined an optimum mode from, for example, plural Intra prediction modes such as H.264 ("Text of ISO/IEC 14496-10 Advanced Video Coding 3rd Edition", September 2004.) using adjacent decoded pixels in the same frame with respect to a low-resolution divided block obtained in such a way that the decoded low-resolution block is divided again, based on the above-described decoded low-resolution block, after that, a block of high resolution signal corresponding to the decoded low-resolution block is predicted. In this case, since it is not necessary to transmit explicitly the prediction mode of the respective low-resolution divided blocks, a superior effect such that the target block can be predicted precisely with less additional information is obtained. Also, there may be performed a precise prediction by combining the above-described temporal and spatial prediction.

(2) Modification on Encoding of Error Block

The encoding of error block between the prediction block and the target block to be encoded is not indispensable. That is, the process of the error block encoder 254 (FIG. 29) and the error block decoder 156 (FIGS. 28 and 29) may be omitted. Also, It may be determined whether or not the encoding should be carried out for each of the target block to be encoded or decoded block. Further, concrete encoding and decoding method of the error block and the low-resolution error block is not limited to the above-described method.

(3) Modification on Encoding of Plural Prediction Modes

In the above embodiment, the prediction method applied to the encoding process of the target block to be encoded is limited to the prediction method according to the present invention only. However, the prediction method according to the present invention may be applied to the conventional encoding method, in which pixels of the target block to be encoded is not reduced.

(4) Modification on Block Size

In the above description, the size of the target block to be encoded (target block to be predicted) and the decoded block is 8×8, the size of the low-resolution block is 4×4, and the size of the low-resolution divided block is 2×2. However, the prediction encoding according to the present invention is not limited to those sizes. The present invention is effective when the low-resolution block is further divided into a size smaller than that divided into four such that, for example, the size of the target block to be encoded and the decoded block is divided into 16×16 identical to the case of H.264; the low-resolution block into 8×8 and the low-resolution divided block to 2×2. Likewise, the block size to be transformed and quantized is not limited. For example, like the case of H.264, the error block may be divided into 4×4 blocks and transformed and quantized on a basis of 4×4 blocks.

(5) Modification on Low-Resolution Block Generating Method

In the above description, the low-resolution block generating process is carried out in such manner that pixels are extracted every other one line in the vertical and horizontal directions as shown in FIG. 36. However, the low-resolution block generating process is not limited to the above method. For example, when being predetermined between the encoding apparatus and the decoding apparatus, the low-resolution block may have an arbitrary configuration with a smaller number of pixels than that of the decoded block (target block to be encoded, target block to be predicted). A block in which the pixels are displaced by one pixel in the vertical and horizontal directions like the block 106 shown in FIG. 36 (block 1060 in FIG. 36); and a block 1062 which has the pixels of both of the block 106 and block 1060 shown in FIG. 36 are included. Various methods, which are applied for reducing the pixels in image such as a method in which, after carrying out a low-pass filtering process on the block, a down sampling is carried out in the vertical and horizontal directions; a method in which four adjacent pixels are averaged and transformed into one pixel, are applicable.

(6) Modification on Executing Step of Low-Resolution Block Generating Process

The low-resolution block generator may be omitted. For example, when the function of the low-resolution block generator is included in the motion compensator or enhanced motion estimator, or when pixels, which do not belong to a low-resolution block, can be processed excluding from the estimation, the low-resolution block generator is not necessary. Further, the method of the low-resolution block generating process with the low-resolution block decoder may be different from the method of the low-resolution block generating process with low-resolution prediction block generator, if prescription of the both processes is made beforehand between the decoding apparatus and the encoding apparatus.

(7) Modification on Enhanced Motion Estimation

The search range, search step and search start point in the enhanced motion estimating process are not limited to the above-described method. If prescription is made beforehand between the encoding apparatus and the decoding apparatus, the search range may be set in an arbitrarily range. Likewise about the search step also, for example, in addition to the spiral search from the center, such a method that the search is carried out from the left-upper toward the right bottom in the search range in a raster scan order is applicable. About the search start point also, not limited to 0 vector only but, for example, the search range may be set with the prediction vector as the center. Further, about the motion estimation and motion compensation method also, the present invention is applicable to, not limited to the block matching in which the motion vector is detected, a method such that estimation value of pixels within a block is calculated using motion parameter such as affine parameter or perspective projection transformation parameter. In this case also, it is not necessary for the motion parameter detected by the small block predictor to be transmitted. Likewise, the small block prediction of the first embodiment is not limited to the block matching.

(8) Modification on Separator and Combiner

The separator 131 shown in FIG. 28 and the combiner 216 shown in FIG. 29 are not always necessary. For example, in FIG. 28, the motion vector predictor and decoder 132 and the dequantizer 136 may receive the data directly from the entropy decoder 150. In FIG. 29, the data may be directly outputted from the motion vector predictor & encoder 212 and the quantizer 215 to entropy encoder 255.

The disclosure of Japanese Patent Application No. 2005-002992 filed Jan. 7, 2005 including specification, drawings and claims, the disclosure of Japanese Patent Application No. 2005-126461 filed Apr. 25, 2005 including specification, drawings and claims, and the disclosure of Japanese Patent Application No. 2005-375721 filed Dec. 27, 2005 including specification, drawings and claims are incorporated herein by reference in its entirety.

What is claimed is:

1. A motion image decoding apparatus, comprising:
    a memory that stores previously decoded blocks of original resolution including a previously decoded reference block of original resolution;
    a low-resolution block decoder that generates a low-resolution block, whose resolution is lower than the original resolution, from low-resolution block information received from an encoder and the previously decoded reference block of original resolution;
    a divider that divides the low-resolution block into low-resolution small blocks;
    a small block predictor that generates small prediction blocks of original resolution from the low-resolution small blocks and the previously decoded reference block of original resolution; and
    a block combiner that combines the small prediction blocks of original resolution to generate a prediction block of original resolution.

2. The motion image decoding apparatus according to claim 1, further comprising:
    an error block decoder that decodes error block information received from the encoder to generate an error block of original resolution; and
    an adder that adds the prediction block of original resolution and the error block of original resolution to generate a decoded block of original resolution.

3. A motion image encoding apparatus, comprising:
    a memory that stores previously decoded blocks of original resolution including a previously decoded reference block of original resolution;
    a first divider that divides an inputted image into plural target blocks of original resolution to be encoded;
    a low-resolution block generator that generates a low-resolution prediction block, whose resolution is lower than the original resolution, from a target block of original resolution and the previously decoded reference block of original resolution and generates a decoded low-resolution block from the low-resolution prediction block;
    a second divider that divides the decoded low-resolution block into low-resolution small blocks;
    a small block predictor that generates small prediction blocks of original resolution from the low-resolution small blocks and the previously decoded reference block of original resolution; and
    a block combiner that combines the small prediction blocks of original resolution to generate a prediction block of original resolution.

4. The motion image encoding apparatus according to claim 3, further comprising:
    a subtracter that derives an error block of original resolution between the target block of original resolution and the prediction block of original resolution;
    an error block encoder that encodes the error block of original resolution;
    an error block decoder that decodes the encoded error block of original resolution; and
    an adder that adds the prediction block of original resolution and the decoded error block of original resolution to generate a decoded block of original resolution to be stored in the memory.

5. A motion image decoding method comprising computer executable steps executable by an image decoder to implement:
    storing previously decoded blocks of original resolution including a previously decoded reference block of original resolution;
    generating a low-resolution block, whose resolution is lower than the original resolution, from low-resolution block information received from an encoder and the previously decoded reference block of original resolution;
    dividing the low-resolution block into low-resolution small blocks;
    generating small prediction blocks of original resolution from the low-resolution small blocks and the previously decoded reference block of original resolution; and
    combining the small prediction blocks of original resolution to generate a prediction block of original resolution.

6. A motion image encoding method comprising computer executable steps executed by an image encoder to implement:
    storing previously decoded blocks of original resolution including a previously decoded reference block of original resolution;
    dividing a target image to be encoded into plural target blocks of original resolution to be encoded;
    generating a low-resolution prediction block, whose resolution is lower than the original resolution, from a target block of original resolution and the previously decoded reference block of original resolution and generating a decoded low-resolution block from the low-resolution prediction block;
    dividing the decoded low-resolution block into low-resolution small blocks;
    generating small prediction blocks of original resolution from the low-resolution small blocks and the previously decoded reference block of original resolution; and
    combining the small prediction blocks of original resolution to generate a prediction block of original resolution.

7. A non-transitory recording medium storing motion image decoding programs executable by an image decoder to:
    store previously decoded blocks of original resolution including a previously decoded reference block of original resolution;
    generate a low-resolution block, whose resolution is lower than the original resolution, from low-resolution block information received from an encoder and the previously decoded reference block of original resolution;
    divide the low-resolution block into low-resolution small blocks;
    generate small prediction blocks of original resolution from the low-resolution small blocks and the previously decoded reference block of original resolution; and
    combine the small prediction blocks of original resolution to generate a prediction block of original resolution.

8. A non-transitory recoding medium storing motion image encoding programs executable by an image encoder to:
    store previously decoded blocks of original resolution including a previously decoded reference block of original resolution;
    divide an inputted image to be encoded into plural target blocks of original resolution to be encoded;

generate a low-resolution prediction block from a target block of original resolution and the previously decoded reference block of original resolution and generate a decoded low-resolution block from the low-resolution prediction block;
dividing the decoded low-resolution block into low-resolution small blocks;
generate small prediction blocks of original resolution from the low-resolution small blocks and the previously decoded reference block of original resolution; and
combining the small prediction blocks to generate a prediction block of original resolution.

* * * * *